(12) United States Patent
Shibatani et al.

(10) Patent No.: US 8,017,669 B2
(45) Date of Patent: Sep. 13, 2011

(54) COLOR FILTER INK, COLOR FILTER INK SET, COLOR FILTER, IMAGE DISPLAY DEVICE, AND ELECTRONIC DEVICE

(75) Inventors: Masaya Shibatani, Nagano (JP); Hidekazu Moriyama, Nagano (JP); Hiroshi Takiguchi, Nagano (JP); Mitsuhiro Isobe, Yamanashi (JP); Homare Kuribayashi, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 107 days.

(21) Appl. No.: 12/502,625

(22) Filed: Jul. 14, 2009

(65) Prior Publication Data

US 2010/0022700 A1 Jan. 28, 2010

(30) Foreign Application Priority Data

Jul. 25, 2008 (JP) .................................. 2008-191796
Oct. 1, 2008 (JP) ................................. 2008-256081

(51) Int. Cl.
*C09D 11/00* (2006.01)

(52) U.S. Cl. ............. 523/160; 523/161; 430/7; 347/106

(58) Field of Classification Search .................. 523/160, 523/161
See application file for complete search history.

(56) References Cited

U.S. PATENT DOCUMENTS

2009/0073356 A1 * 3/2009 Moriyama et al. ............ 349/106

FOREIGN PATENT DOCUMENTS

JP 2002-372613 A 12/2002

* cited by examiner

*Primary Examiner* — Vasu Jagannathan
*Assistant Examiner* — Doris Lee
(74) *Attorney, Agent, or Firm* — Global IP Counselors, LLP

(57) ABSTRACT

A color filter ink is adapted to be used to manufacture a color filter by an inkjet method. The color filter ink includes a colorant, a liquid medium that dissolves and/or disperses the colorant, and a resin material. The resin material includes a polymer X and a polymer Y. The polymer X has a monomer component x1 represented by a prescribed chemical formula, a monomer component x2 represented by a prescribed chemical formula, a monomer component x3 represented by a prescribed chemical formula, and a monomer component x4 represented by a prescribed chemical formula. The polymer Y has a monomer component y1 represented by a prescribed chemical formula and a monomer component y2 represented by a prescribed chemical formula.

14 Claims, 10 Drawing Sheets

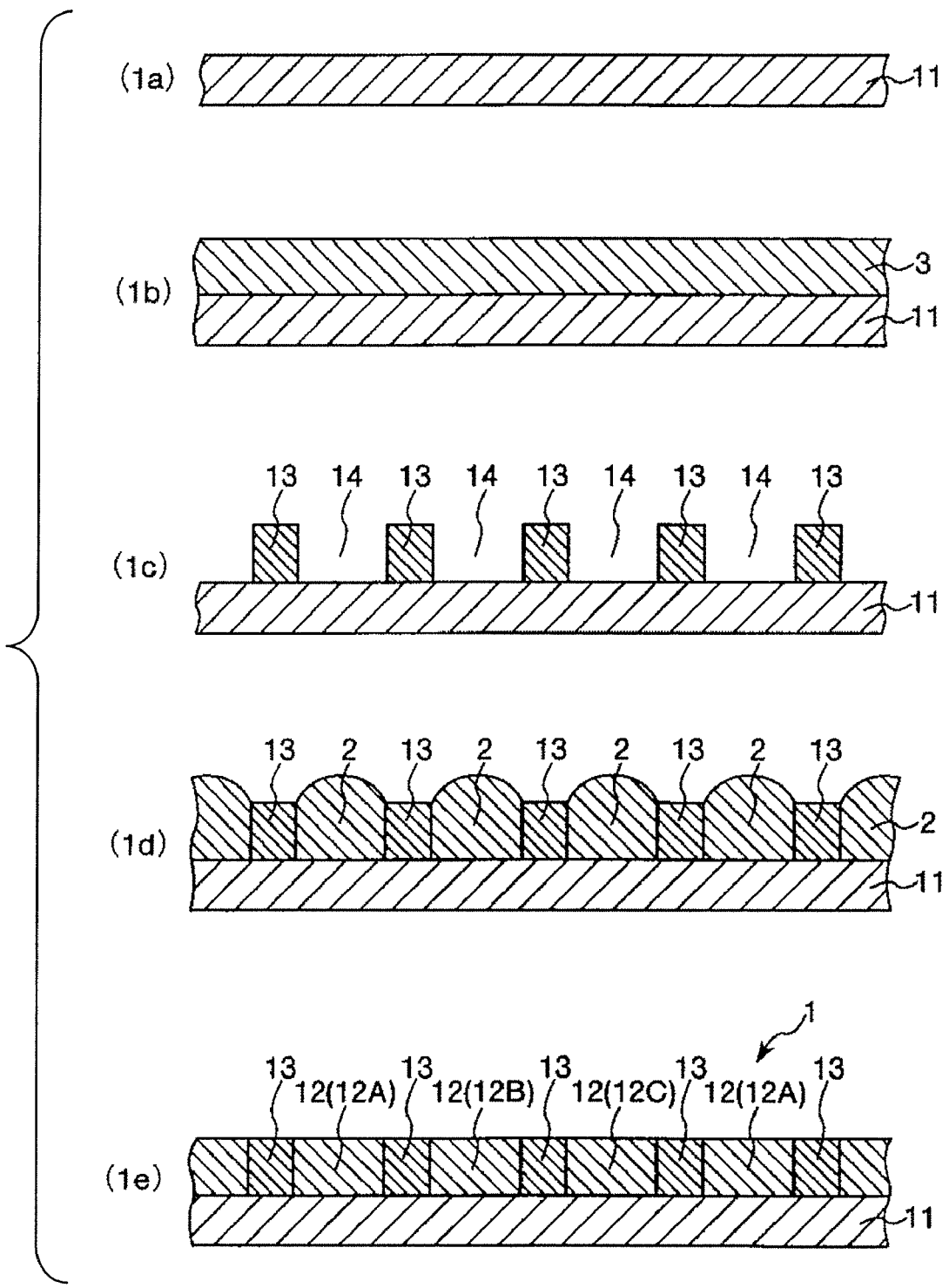
F I G. 2

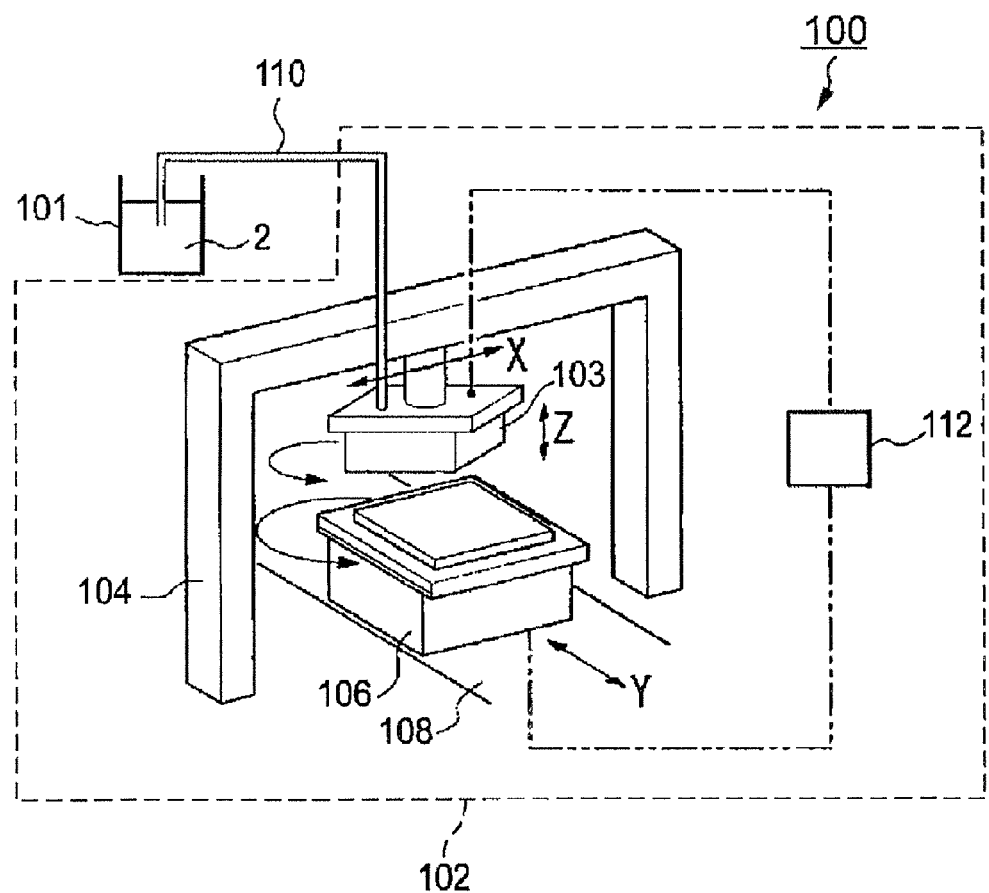
F I G. 3

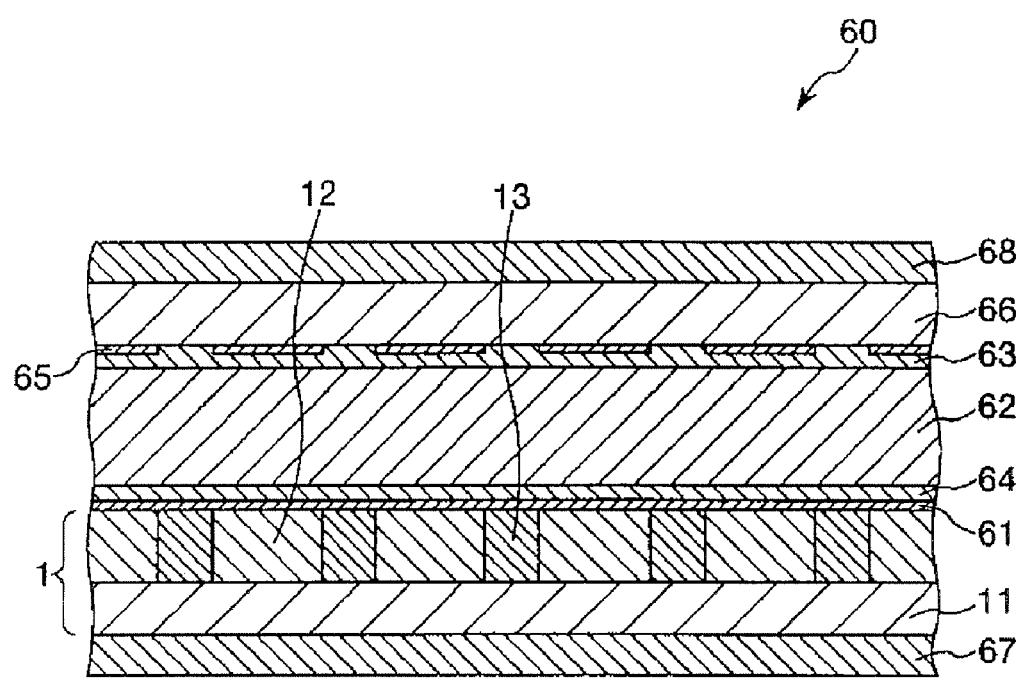
F I G. 7

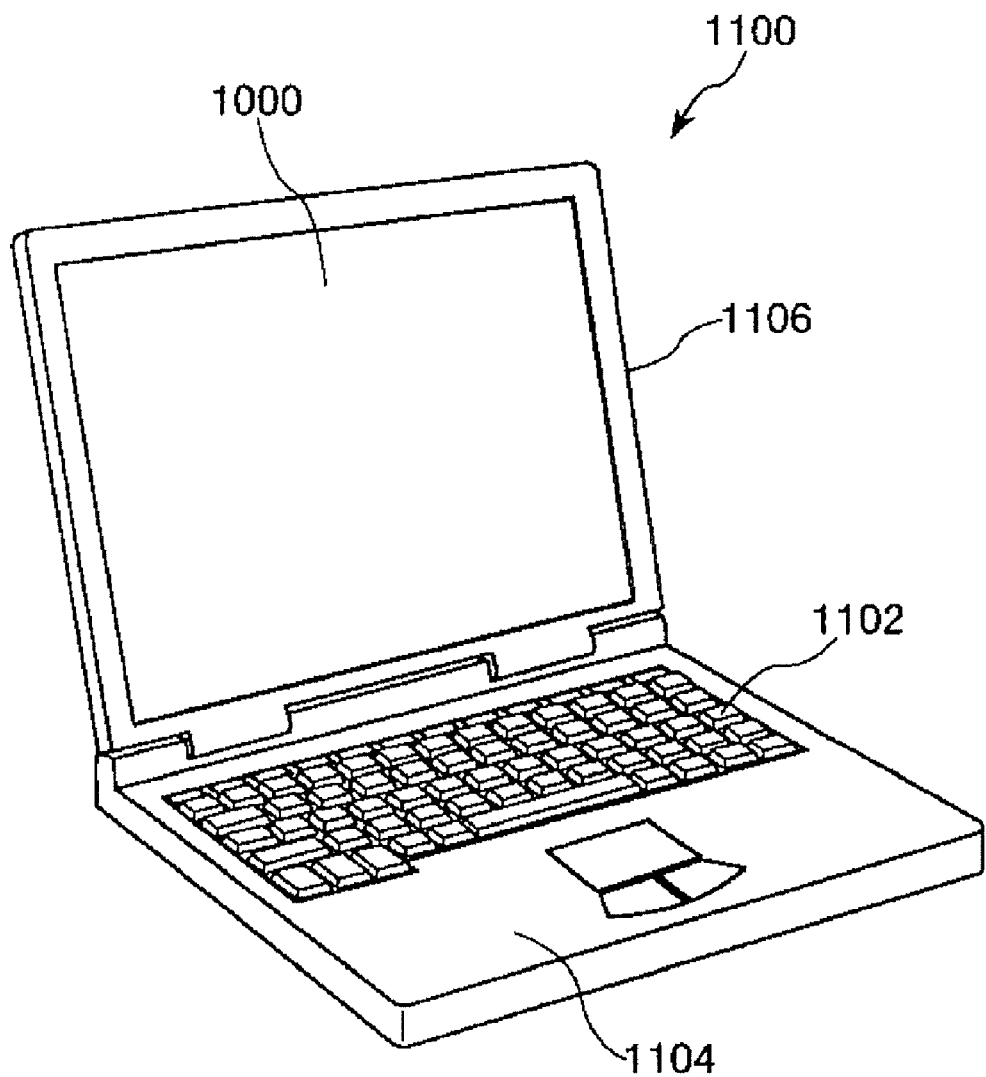
F I G. 8

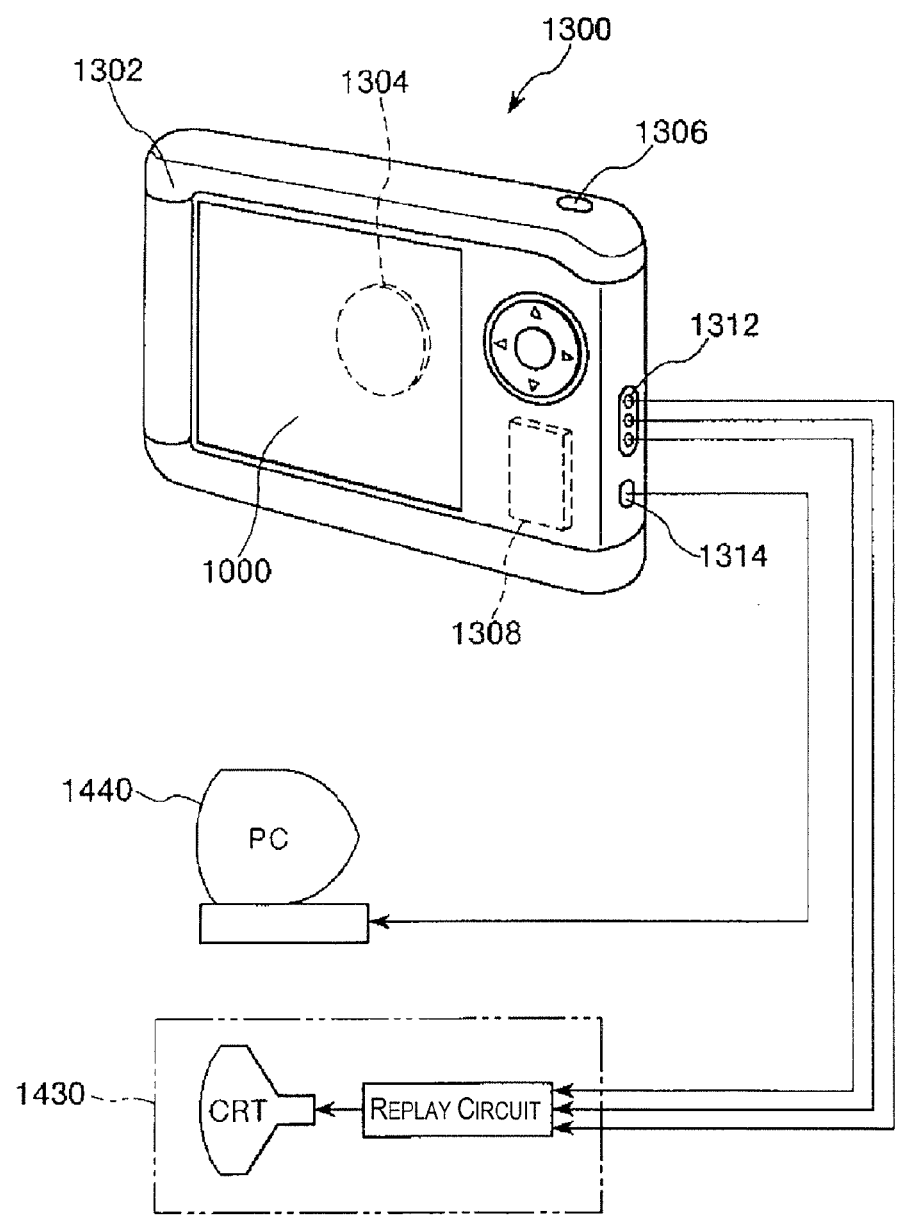
F I G. 10

COLOR FILTER INK, COLOR FILTER INK SET, COLOR FILTER, IMAGE DISPLAY DEVICE, AND ELECTRONIC DEVICE

CROSS-REFERENCE TO RELATED APPLICATIONS

This application claims priority to Japanese Patent Application No. 2008-191796 filed on Jul. 25, 2008 and Japanese Patent Application No. 2008-256081 filed on Oct. 1, 2008. The entire disclosures of Japanese Patent Application Nos. 2008-191796 and 2008-256081 are hereby incorporated herein by reference.

BACKGROUND

1. Technical Field

The present invention relates to a color filter ink, a color filter ink set, a color filter, an image display device, and an electronic device.

2. Related Art

Color filters are generally used in liquid crystal display devices (LCD) and the like that display color.

Color filters have conventionally been manufactured using a so-called photolithography method in which a color photoresist composed of a material (color layer formation composition) that includes a colorant, a photosensitive resin, a functional monomer, a polymerization initiator, and other components is formed on a substrate; whereupon photosensitive processing for radiating light via a photomask, development processing, and the like are performed. In such a method, the color filters are usually manufactured by repeating a process in which a color photoresist corresponding to each color is formed on substantially the entire surface of the substrate, only a portion of the color photoresist is cured, and most of the film other than the cured portion is removed, so that there is no color overlap. Therefore, only a portion of the color photoresist formed in color filter manufacturing remains as a color layer in the finished color filter, and most of the color photoresist is removed in the manufacturing process. Accordingly, not only does the manufacturing cost of the color filter increase, but the process is also undesirable from the perspective of resource saving.

Methods have recently been proposed for forming the color layer of a color filter through the use of an inkjet head (droplet discharge head) (see Japanese Laid-Open Patent Application No. 2002-372613, for example). In such a method, because the discharge position and other attributes associated with droplets of the material (color layer formation composition) used to form the color layer are easily controlled, and waste of the color layer formation composition can be reduced, the environmental impact can be reduced, and manufacturing cost can also be minimized.

However, in a method for manufacturing a color filter using an inkjet head, when droplets are discharged for long periods of time, the droplet discharge quantity becomes unstable, the trajectory of the discharged droplets changes (so-called flight deflection occurs), it becomes impossible to land the droplets in the desired region, and other problems occur. When such problems occur, the color saturation fluctuates between the plurality of colored portions that are originally supposed to have the same color saturation, and on the substrate or the like onto which the droplets are to be discharged, the plurality of types of ink used to form different colored portions mixes together (colors mix), and as a result, uneven color between regions of the same color filter, uneven saturation, and the like occur, fluctuation occurs in the characteristics (particularly contrast ratio, color reproduction range, and other color characteristics) between numerous color filters, and the reliability of the color filters is reduced. Such problems are particularly severe when a material that includes a pigment is used as the material for forming the color layer. Since the droplet discharge device (industrial) used for color filter manufacturing is entirely different from what is used for a printer (consumer-level), and the droplet discharge device is used for mass production and droplet discharge onto large-scale workpieces (substrates), for example, there is a need to discharge large quantities of droplets for long periods of time. Because the droplet discharge device is used under such harsh conditions, the droplet discharge quantity is more prone to vary than in a consumer printer, but when such variation in the discharge quantity occurs, fluctuation occurs in the characteristics between the numerous manufactured color filters, fluctuation occurs in the color saturation between regions of the same color filter, and the reliability of the color filter as a product is severely reduced.

Inks having a high colorant content have recently been used as color filter inks in order to ensure a higher color reproduction range and higher contrast ratio in a color filter, but such problems as those described above become more severe the higher the content ratio of the colorant (particularly pigment) becomes.

There has also been a recent trend of increasing the luminance of the displayed image in liquid crystal display devices (LCD) and the like for color display in order to achieve even higher picture quality. Such increased luminance creates a need for enhanced color filter durability.

SUMMARY

One object of the present invention is to provide an inkjet-type color filter ink and ink set capable of maintaining excellent discharge stability for a long time, that can be suitably used to manufacture a color filter having excellent durability and excellent uniformity of characteristics between units, in which unevenness of color and saturation among regions is suppressed, and whereby an image having an excellent contrast ratio can be displayed; to provide a color filter having excellent durability and excellent uniformity of characteristics between individual units, in which unevenness of color and saturation among regions is suppressed, and whereby an image having an excellent contrast ratio can be displayed; and to provide an image display device and electronic device provided with the color filter.

A color filter ink according to one aspect of the present invention is adapted to be used to manufacture a color filter by an inkjet method. The color filter ink includes a colorant, a liquid medium that dissolves and/or disperses the colorant, and a resin material. The resin material includes a polymer X and a polymer Y. The polymer X has a monomer component x1 represented by a chemical formula (1) below, a monomer component x2 represented by a chemical formula (2) below, a monomer component x3 represented by a chemical formula (3) below, and a monomer component x4 represented by a chemical formula (4) below. The polymer Y has a monomer component y1 represented by a chemical formula (5) below and a monomer component y2 represented by a chemical formula (6) below.

Chemical Formula (1)

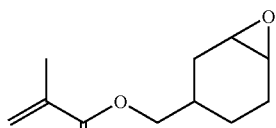

(1)

Chemical Formula (2)

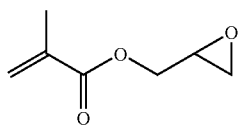

(2)

Chemical Formula (3)

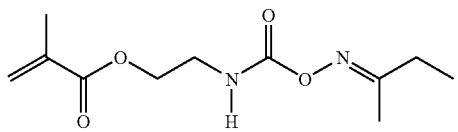

(3)

Chemical Formula (4)

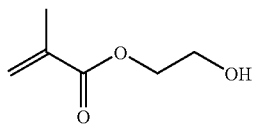

(4)

Chemical Formula (5)

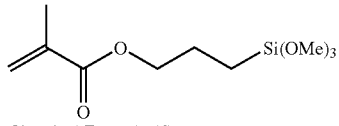

(5)

Chemical Formula (6)

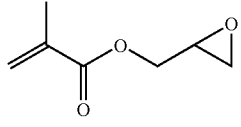

(6)

It is thereby possible to provide an inkjet-type color filter ink capable of maintaining excellent discharge stability for a long time, that can be suitably used to manufacture a color filter having excellent durability and excellent uniformity of characteristics between units, in which unevenness of color and saturation among regions is suppressed, and whereby an image having an excellent contrast ratio can be displayed.

In the color filter ink as described above, the content ratio of the monomer component x1 with respect to all components constituting the polymer X is preferably 30 to 90 wt %, the content ratio of the monomer component x2 with respect to all components constituting the polymer X is preferably 5 to 60 wt %, the content ratio of the monomer component x3 with respect to all components constituting the polymer X is preferably 2 to 20 wt %, and the content ratio of the monomer component x4 with respect to all components constituting the polymer X is preferably 2 to 20 wt %.

The color filter ink can thereby be provided with particularly excellent stability over time (long-term storability) and reactivity at high temperature. The colored portion (color layer) formed using the color filter ink can also be provided with a high degree of flatness, and uneven color and other undesirable effects can be more effectively prevented from occurring in the image displayed using the color filter. The colored portion (color layer) formed using the color filter ink can also be provided with particularly excellent solvent resistance, and particularly high reliability can be obtained in the manufactured color filter.

In the color filter ink as described above, the content ratio of the monomer component y1 with respect to all components constituting the polymer Y is preferably 30 to 90 wt %, and the content ratio of the monomer component y2 with respect to all components constituting the polymer Y is preferably 10 to 70 wt %.

It is thereby possible to provide the colored portion (color layer) formed using the color filter ink with particularly excellent adhesion to the substrate while providing the color filter ink with adequately excellent discharge stability, and to provide the color filter with particularly excellent durability and reliability.

In the color filter ink as described above, the relationship $0.9 \leq C_X/C_Y \leq 6.0$ is preferably satisfied, wherein $C_X$ (wt %) is the content ratio of the polymer X in the color filter ink, and $C_Y$ (wt %) is the content ratio of the polymer Y in the color filter ink.

It is thereby possible to provide the color filter ink with particularly excellent stability over time (long-term storability) and reactivity and high temperature, and the manufactured color filter with particularly excellent durability and reliability, and uneven color and the like can be more effectively prevented from occurring in the color filter manufactured using the color filter ink.

In the color filter ink as described above, the weight-average molecular weight of the polymer X is preferably 1,000 to 50,000.

It is thereby possible to obtain particularly excellent stability over time (long-term storability) of the color filter ink and discharge stability of the color filter ink, to provide the color filter with adequately excellent production properties, to more reliably provide the colored portion formed using the color filter ink with a high degree of flatness, and to more effectively prevent uneven color and the like from occurring in the image displayed using the color filter.

In the color filter ink as described above, the weight-average molecular weight of the polymer Y is preferably 1,000 to 50,000.

It is thereby possible to obtain particularly excellent stability over time (long-term storability) of the color filter ink and discharge stability of the color filter ink, to provide the color filter with adequately excellent production properties, to more reliably provide the colored portion formed using the color filter ink with a high degree of flatness, and to more effectively prevent uneven color and the like from occurring in the image displayed using the color filter.

In the color filter ink as described above, the liquid medium preferably includes one or more compounds selected from the group that includes 1,3-butylene glycol diacetate, bis(2-butoxyethyl)ether, 2-(2-methoxy-1-methylethoxy)-1-methylethyl acetate, and diethylene glycol monobutylether acetate.

The polymer X and polymer Y can thereby be more uniformly dissolved in the color filter ink, and the color filter ink can be provided with particularly excellent discharge stability. When the color filter ink includes a pigment as the colorant, the pigment particles can also be dispersed in the color filter ink with particularly excellent stability.

In the color filter ink as described above, the colorant preferably includes one or more types selected from the group that includes C. I. pigment red 254, C. I. pigment red 177, C.

I. pigment green 58, C. I. pigment blue 15:6, C. I. pigment violet 23, C. I. pigment yellow 138, C. I. pigment yellow 150, and their derivatives.

The effects of using the polymer X and polymer Y are thereby more significantly demonstrated. The manufactured color filter can also be provided with particularly excellent color reproduction range and lightfastness (light resistance).

A color filter ink set according to a second aspect includes a plurality of different types of color filter ink with at least one of the types being the color filter ink as described above.

It is thereby possible to provide an inkjet-type color filter ink set capable of maintaining excellent discharge stability for a long time, that can be suitably used to manufacture a color filter having excellent durability and excellent uniformity of characteristics between units, in which unevenness of color and saturation among regions is suppressed, and whereby an image having an excellent contrast ratio can be displayed.

A color filter according to a third aspect is manufactured using the color filter ink as described above.

It is thereby possible to provide a color filter having excellent durability and excellent uniformity of characteristics between units, in which unevenness of color and saturation among regions is suppressed, and whereby an image having an excellent contrast ratio can be displayed.

A color filter according to a fourth aspect is manufactured using the color filter ink set as described above.

It is thereby possible to provide a color filter having excellent durability and excellent uniformity of characteristics between units, in which unevenness of color and saturation among regions is suppressed, and whereby an image having an excellent contrast ratio can be displayed.

An image display device according to a fifth aspect has the color filter as described above.

It is thereby possible to provide an image display device having excellent durability and excellent uniformity of characteristics between units, in which unevenness of color and saturation among regions of the display portion is suppressed, and whereby an image having an excellent contrast ratio can be displayed.

The image display device as described above is preferably a liquid crystal panel.

It is thereby possible to provide an image display device having excellent durability and excellent uniformity of characteristics between units, in which unevenness of color and saturation among regions of the display portion is suppressed, and whereby an image having an excellent contrast ratio can be displayed.

An electronic device according to a sixth aspect has the image display device as described above.

It is thereby possible to provide an electronic device having excellent durability and excellent uniformity of characteristics between units, in which unevenness of color and saturation among regions of the display portion is suppressed, and whereby an image having an excellent contrast ratio can be displayed.

BRIEF DESCRIPTION OF THE DRAWINGS

Referring now to the attached drawings which form a part of this original disclosure:

FIG. 2 is a sectional view showing a method for manufacturing a color filter;

FIG. 3 is a perspective view showing the droplet discharge device used in the manufacture of the color filter;

FIG. 6 is a view showing the droplet discharge head in the droplet discharge device shown in FIG. 3, wherein FIG. 6(a) is a sectional perspective view and FIG. 6(b) is a sectional view;

FIG. 7 is a sectional view showing an embodiment of the liquid crystal display device;

FIG. 8 is a perspective view showing the configuration of a mobile (or laptop) personal computer to which the electronic equipment of the present invention has been applied;

FIG. 10 is a perspective view showing the configuration of a digital still camera in which the electronic device of the present invention has been applied.

DETAILED DESCRIPTION OF EXEMPLARY EMBODIMENTS

Figure 1:
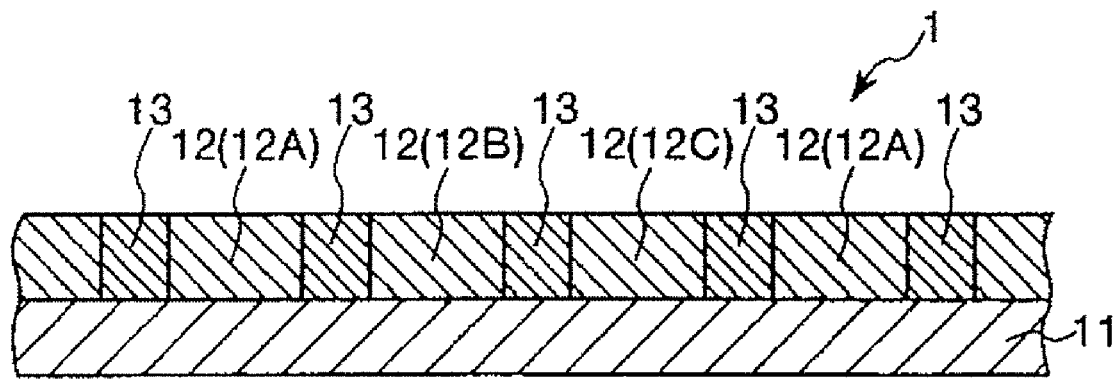
FIG. 1 is a sectional view showing a preferred embodiment of the color filter of the present invention.

Preferred embodiments of the present invention will be described in detail hereinafter.

Color Filter Ink

The color filter ink of the present invention is an ink used to manufacture (form the colored portion of) a color filter, and is used particularly in the manufacture of a color filter by an inkjet method.

The color filter ink includes a colorant, a resin material, and a liquid medium for dissolving and/or dispersing the colorant.

Colorant

A color filter usually has colored portions comprising a plurality of different colors (generally, colored portions comprising three colors corresponding to RGB). The colorant is usually selected according to the hue of the colored portion to be formed. Examples of colorants that can be used to form the color filter ink include various types of pigments and various types of dyes.

Examples of pigments include C. I. pigment red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48:1, 48:2, 48:3, 48:4, 49:1, 49:2, 50:1, 52:1, 53:1, 57, 57:1, 57:2, 58:2, 58:4, 60:1, 63:1, 63:2, 64:1, 81, 81:1, 83, 88, 90:1, 97, 101, 102, 104, 105, 106, 108, 108:1, 112, 113, 114, 122, 123, 144, 146, 149, 150, 151, 166, 168, 170, 171, 172, 174, 175, 176, 177, 178, 179, 180, 185, 187, 188, 190, 193, 194, 202, 206, 207, 208, 209, 215, 216, 220, 224, 226, 242, 243, 245, 254, 255, 264, and 265; C. I. pigment green 7, 36, 15, 17, 18, 19, 26, 50, and 58; C. I. pigment blue 1, 15, 15:1, 15:2, 15:3, 15:4, 15:6, 17:1, 18, 60, 27, 28, 29, 35, 36, 60, and 80; C. I. pigment yellow 1, 3, 12, 13, 14, 15, 16, 17, 20, 24, 31, 34, 35, 35:1, 37, 37:1, 42, 43, 53, 55, 60, 61, 65, 71, 73, 74, 81, 83, 93, 94, 95, 97, 98, 100, 101, 104, 106, 108, 109, 110, 113, 114, 116, 117, 119, 120, 126, 127, 128, 129, 138, 139, 150, 151, 152, 153, 154, 155, 156, 157, 166, 168, 175, 180, 184, and 185; C. I. pigment violet 1, 3, 14, 16, 19, 23, 29, 32, 36, 38, and 50; C. I. pigment orange 1, 5, 13, 14, 16, 17, 20, 20:1, 24, 34, 36, 38, 40, 43, 46, 49, 51, 61, 63, 64, 71, 73, and 104; C. I. pigment brown 7, 11, 23, 25, and 33; C. I. pigment black 1 and 7; and derivatives of these pigments and the like.

Including a pigment as the colorant in the color filter ink has the advantage of enhancing lightfastness and heat resistance of the formed color filter (colored portion). When the color filter ink includes a pigment as the colorant, although the problem of reduced droplet discharge stability occurs when the conventional technique is used, as described in detail hereinafter, such a problem can be reliably prevented in the present invention even when a pigment is included as the colorant. Specifically, the effects of the present invention are more significantly demonstrated when the color filter ink includes a pigment as the colorant.

When a pigment is included as the colorant in the conventional color filter ink, excellent dispersion of the colorant is difficult to maintain over a long period of time, and color filters having excellent contrast and other characteristics are difficult to stably manufacture over a long period of time. However, in the present invention, since a resin material such as the one described in detail hereinafter is used, the resin material and the colorant (pigment) can be mixed together with excellent stability over a long period of time, and color filters having excellent contrast and other characteristics can be stably manufactured for a long time. Since the color filter ink, once prepared, can be suitably used for a long time, the frequency of replacing the color filter ink and replacing the color filter ink in the droplet discharge device can be reduced. The color filter can therefore be manufactured with particularly excellent productivity, and the consistency of quality of the manufactured color filter is enhanced.

Among the colorants described above, the color filter ink preferably includes one or more types selected from the group that includes C. I. pigment red 254, C. I. pigment red 177, C. I. pigment green 58, C. I. pigment blue 15:6, C. I. pigment violet 23, C. I. pigment yellow 150, and derivatives thereof. The effects of using the polymer X and polymer Y are thereby more significantly demonstrated. The manufactured color filter can also be provided with particularly excellent color reproduction range and lightfastness.

Particularly when the color filter ink includes C. I. pigment red 177 and a derivative thereof and/or C. I. pigment red 254 and a derivative thereof as the pigment (red pigment), particularly excellent coloration properties of the color filter ink (red color filter ink) can be obtained. The effects of jointly using the resin material are also more significantly demonstrated, and particularly excellent dispersion stability of the pigment particles in the color filter ink can be obtained. As a result, thixotropy of the color filter ink can be prevented from increasing during formation of the colored portion, and the color filter ink can be provided with particularly excellent discharge stability when the ink is applied to cells.

Such effects as described above are even more significantly demonstrated when a compound (derivative) indicated by Formula (7) or Formula (8) below is included as the derivative of C. I. pigment red 177 and the derivative of C. I. pigment red 254.

Chemical Formula (7)

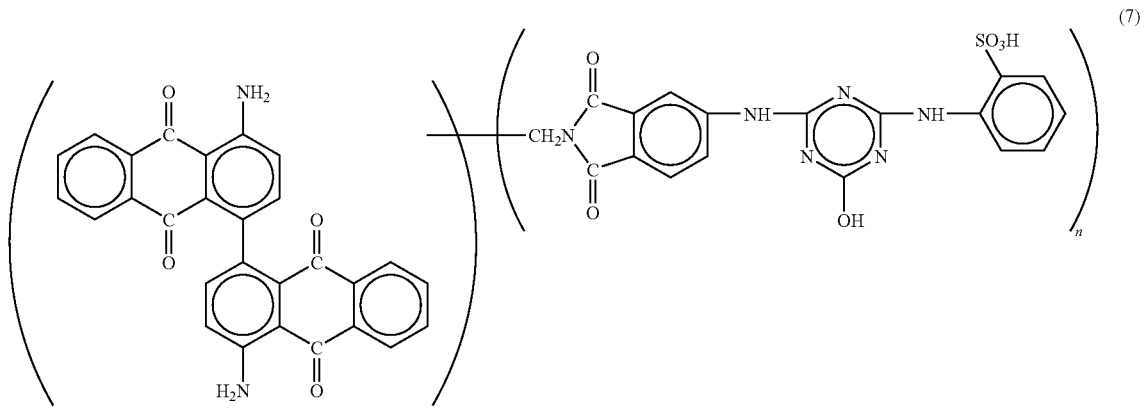

In Formula (7), n is an integer from 1 to 4.

Chemical Formula (8)

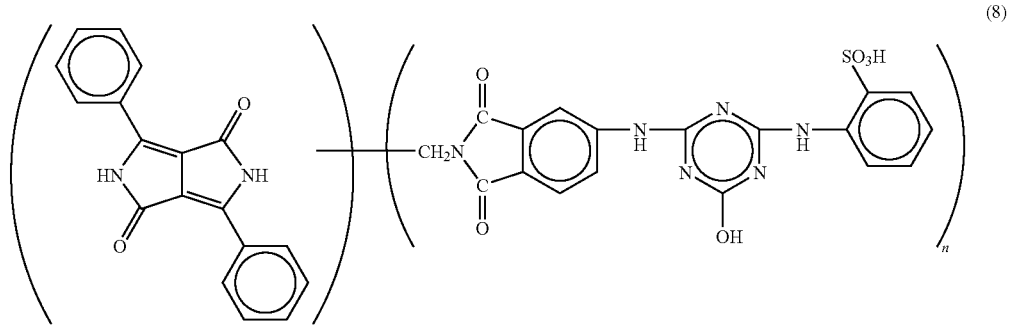

In Formula (8), n is an integer from 1 to 4.

Particularly excellent coloration properties of the color filter ink (green color filter ink) can be obtained particularly when the color filter ink includes C. I. pigment green 58 (brominated zinc phthalocyanine pigment) as the pigment (green pigment). Although C. I. pigment green 58 has the characteristics of excellent brightness, C. I. pigment green 58 is a material that is extremely difficult to stably disperse in the conventional technique.

However, the inventors have discovered that particularly excellent dispersion stability in the color filter ink can be obtained through the joint use of the resin material (polymer X, polymer Y) described in detail hereinafter, even when C. I. pigment green 58 is included. The color filter ink can thereby be provided with even more excellent coloration properties, and thixotropy of the color filter ink due to increased pigment concentration can be prevented from increasing during formation of the colored portion. It is also possible to obtain particularly excellent discharge stability of the color filter ink and long-term dispersion stability of the pigment in the color filter ink (storability of the color filter ink).

The inventors have also discovered that particularly excellent dispersion stability in the color filter ink can be obtained by simultaneously including a sulfonated pigment derivative as a secondary pigment, even when C. I. pigment green 58 is included. The color filter ink can thereby be provided with even more excellent coloration properties, and thixotropy of the color filter ink due to increased pigment concentration can be prevented from increasing during formation of the colored portion. It is also possible to obtain particularly excellent discharge stability of the color filter ink and long-term dispersion stability of the pigment in the color filter ink (storability of the color filter ink), and the color filter ink can be provided with even more excellent discharge stability.

When C. I. pigment green 58 and a sulfonated pigment derivative are included as pigments, a compound (derivative) indicated by Formula (9) below is preferably included as the sulfonated pigment derivative. Particularly excellent dispersion stability of the pigment particles in the color filter ink can thereby be obtained, and an image having more excellent contrast can be displayed in the manufactured color filter.

Chemical Formula (9)

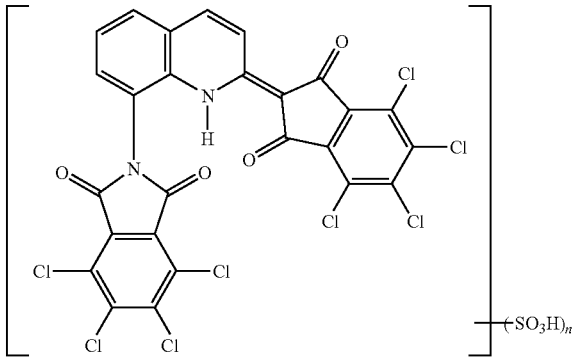

(9)

In Formula (9), n is an integer from 1 to 5.

When C. I. pigment green 58 and a pigment derivative (sulfonated pigment derivative) such as described above are included, the content ratio of the pigment derivative (sulfonated pigment derivative) in the color filter ink is not particularly limited, but is preferably 2 to 32 parts by weight, and more preferably 7 to 28 parts by weight with respect to 100 parts by weight of C. I. pigment green 58 (primary pigment). Particularly excellent dispersion stability of the pigment particles in the color filter ink can thereby be obtained. The manufactured color filter can also be provided with particularly excellent contrast ratio and brightness.

Particularly excellent coloration properties of the color filter ink (blue color filter ink) can be obtained particularly when the color filter ink includes C. I. pigment blue 15:6 and C. I. pigment violet 23 as pigments (blue pigments). Particularly excellent dispersion stability of pigment particles in the color filter ink can also be obtained.

When the color filter ink is an ink (pigment ink) that includes a pigment as the colorant, the average grain size of the pigment is preferably 10 to 200 nm, and more preferably 20 to 180 nm. The color filter manufactured using the color filter ink can thereby be provided with adequately excellent durability (lightfastness and other characteristics), and particularly excellent coloration properties, contrast, and other characteristics can be obtained in the color filter while adequately excellent dispersion stability of the pigment in the color filter ink and discharge stability of the color filter ink are obtained.

Examples of dyes include azo dyes, anthraquinone dyes, condensed multi-ring aromatic carbonyl dyes, indigoid dyes, carbonium dyes, phthalocyanine dyes, methines, polymethine dyes, and the like. Specific examples of dyes include C. I direct red 2, 4, 9, 23, 26, 28, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243, and 247; C. I. acid red 35, 42, 51, 52, 57, 62, 80, 82, 111, 114, 118, 119, 127, 128, 131, 143, 145, 151, 154, 157, 158, 211, 249, 254, 257, 261, 263, 266, 289, 299, 301, 305, 319, 336, 337, 361, 396, and 397; C. I. reactive red 3, 13, 17, 19, 21, 22, 23, 24, 29, 35, 37, 40, 41, 43, 45, 49, and 55; C. I. basic red 12, 13, 14, 15, 18, 22, 23, 24, 25, 27, 29, 35, 36, 38, 39, 45, and 46; C. I direct violet 7, 9, 47, 48, 51, 66, 90, 93, 94, 95, 98, 100, and 101; C. I acid violet 5, 9, 11, 34, 43, 47, 48, 51, 75, 90, 103, and 126; C. I reactive violet 1, 3, 4, 5, 6, 7, 8, 9, 16, 17, 22, 23, 24, 26, 27, 33, and 34; C. I. basic violet 1, 2, 3, 7, 10, 15, 16, 20, 21, 25, 27, 28, 35, 37, 39, 40, and 48; C. I. direct yellow 8, 9, 11, 12, 27, 28, 29, 33, 35, 39, 41, 44, 50, 53, 58, 59, 68, 87, 93, 95, 96, 98, 100, 106, 108, 109, 110, 130, 142, 144, 161, and 163; C. I. acid yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, and 227; C. I. reactive yellow 2, 3, 13, 14, 15, 17, 18, 23, 24, 25, 26, 27, 29, 35, 37, 41, and 42; C. I. basic yellow 1, 2, 4, 11, 13, 14, 15, 19, 21, 23, 24, 25, 28, 29, 32, 36, 39, and 40; C. I. acid green 16; C. I. acid blue 9, 45, 80, 83, 90 and 185; C. I. basic orange 21 and 23; and the like.

The content ratio of the colorant in the color filter ink is preferably 2 to 25 wt %, and more preferably 3 to 20 wt %. When the content ratio of the colorant is within the aforementioned range, higher color saturation can be ensured in the color filter manufactured using the color filter ink, and the color filter can be used for a clearer image display. When such a relatively high concentration of the colorant (particularly a pigment) is included in the conventional technique, the discharge stability is particularly low, and flight deflection, instability of the droplet discharge quantity, and other problems are particularly prone to occur during discharge of color filter ink droplets. Defects due to fluctuation in the droplet discharge quantity between regions of the same surface, and severely reduced productivity of color filters occur particularly when droplets are discharged onto a large substrate (e.g., G5 or larger) to form colored portions. In the present invention, however, even when the colorant is included at a relatively high concentration, such problems as described above can be reliably prevented, uneven color, saturation, and other characteristics between regions of a manufactured color filter, and fluctuation of characteristics between units can be reliably prevented, and color filters can be manufactured with excellent productivity, as described in detail hereinafter. Specifically, the effects of the present invention are more significantly demonstrated when the color filter ink includes a relatively high concentration of the colorant, as described above. The manufactured color filter can also be provided with particularly excellent durability.

Resin Material

The color filter ink generally includes a resin material (binder resin) for such purposes as enhancing adhesion of the formed colored portion to the substrate. Solvent resistance is needed in the resin material in order to prevent adverse effects due to chemical application or washing in steps subsequent to the ink application step in an inkjet method. In the conventional color filter ink, however, it is difficult to provide the color filter (colored portion) with adequately excellent durability. In the case of the conventional color filter ink, when droplets are discharged for long periods of time, the droplet discharge quantity becomes unstable, the trajectory of the discharged droplets changes (so-called flight deflection occurs), it becomes impossible to land the droplets in the desired region, and other problems occur. When such problems occur, the color saturation fluctuates between the plurality of colored portions that are originally supposed to have the same color saturation, and on the substrate or the like onto which the droplets are to be discharged, the plurality of types of ink used to form different colored portions mixes together (colors mix), and as a result, uneven color between regions of the same color filter, uneven saturation, and the like occur, fluctuation occurs in the characteristics (particularly contrast ratio, color reproduction range, and other color characteristics) between numerous color filters, and the reliability of the color filters is reduced. Such problems are severe particularly when a dispersed state must be maintained in the ink, and when ink is used that includes a pigment for which a change in the dispersion state has significant adverse effects on discharge properties.

A color filter is generally manufactured by an inkjet method in which droplets are discharged into a cell provided on a substrate, after which the liquid medium is removed, and the color filter ink is solidified. However, thixotropy and viscosity of the color filter ink increase as the solids concentration is increased due to removal of the liquid medium, and unwanted irregularities occur on the surface of the formed colored portion. Uneven color, saturation, and other characteristics thereby occur in the image displayed using the color filter, and the contrast ratio is reduced. This tendency is particularly apparent when a pigment is included as the colorant, and the content ratio of the pigment with respect to the resin material is high. The reason for this may be that an increase in the solids concentration is accompanied by aggregation of the pigment particles in the ink.

The inventors conducted a concentrated investigation aimed at overcoming such problems as those described above. As a result, the inventors discovered that such problems as those described above can be overcome by including a resin material such as the one described in detail hereinafter in the color filter ink.

The resin material (curable resin material) constituting the color filter ink of the present invention will be described in detail hereinafter.

The resin material in the color filter ink of the present invention comprises a polymer X that includes a monomer component x1 indicated by Formula (1) below, a monomer component x2 indicated by Formula (2) below, a monomer component x3 indicated by Formula (3) below, and a monomer component x4 indicated by Formula (4) below; and a polymer Y that includes a monomer component y1 indicated by Formula (5) below and a monomer component y2 indicated by Formula (6) below.

Chemical Formula (1)

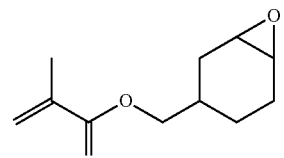

(1)

Chemical Formula (2)

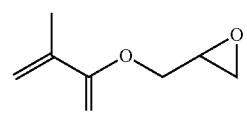

(2)

Chemical Formula (3)

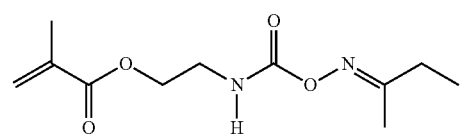

(3)

Chemical Formula (4)

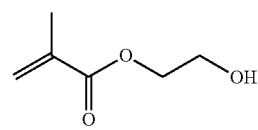

(4)

Chemical Formula (5)

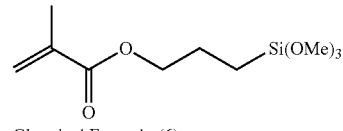

(5)

Chemical Formula (6)

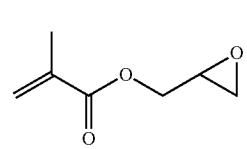

(6)

Polymer X

The polymer X is indicated by Formula (10) below, and includes a monomer component x1 indicated by Formula (1) above, a monomer component x2 indicated by Formula (2) above, a monomer component x3 indicated by Formula (3) above, and a monomer component x4 indicated by Formula (4) above. The polymer X may be composed of essentially a single compound or may be a mixture of a plurality of types of compounds. However, when the polymer X is a mixture of a plurality of types of compounds, the compounds contain the monomer components x1, x2, x3, and x4.

Chemical Formula (10)

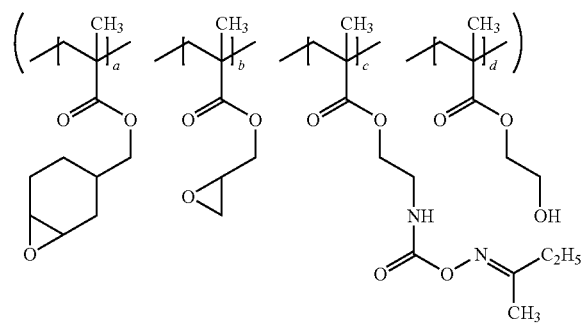

(10)

In Formula (10), a, b, c, and d are each independently an integer equal to 1 or higher.

Monomer Component x1

The polymer X contains a monomer component x1 indicated by Formula (1) above as a monomer component.

Including such a monomer component x1 as a monomer component enables curing (polymerization) of the resin material to proceed optimally in the colored portion formation step (curing step) performed in a heated environment, while unwanted reaction (polymerization) of the resin material can be reliably prevented from occurring during storage of the color filter ink or in the ink application step and other steps described hereinafter. Specifically, including the monomer component x1 makes it possible to obtain excellent characteristics (also referred to as "curing reaction switching characteristics" hereinafter) whereby curing of the resin material is essentially prevented from progressing at or below a predetermined temperature, and curing can be efficiently advanced at higher temperatures. By including the monomer component x1 as a monomer component, the pigment particles can be dispersed in the color filter ink with excellent stability when the color filter ink includes a pigment as the colorant, and the color filter ink can be provided with excellent long-term storability and discharge stability. Including the monomer component x1 as a monomer component also enables the formed colored portion to be provided with excellent hardness and other characteristics.

The content ratio (calculated in terms of the weight of the monomer used to synthesize the polymer) of the monomer component x1 in the polymer X is preferably 30 to 90 wt %, and more preferably 40 to 80 wt %. When the content ratio of the monomer component x1 in the polymer X is within this range, such effects as those described above can be significantly demonstrated without impeding the functions of the monomer components x2, x3, and x4 described in detail hereinafter. In contrast, when the content ratio of the monomer component x1 in the polymer X is less than the lower limit of the aforementioned range, the effects of including the monomer component x1 may not be adequately demonstrated. When the content ratio of the monomer component x1 in the polymer X exceeds the upper limit of the aforementioned range, the relative content ratios of the monomer components x2, x3, and x4 decrease, and the functions of these monomer components may not be adequately demonstrated. The reaction rate of the polymer X at high temperature also decreases, and it becomes difficult to manufacture color filters with adequately excellent productivity. When the polymer X is a mixture of a plurality of types of compounds, the weighted average value (weighted average value based on weight ratio) of the mixed compounds may be used as the content ratio of the monomer component x1. When the polymer X is a mixture of a plurality of types of compounds, all of the compounds preferably contain the monomer component x1 in a content ratio such as described above.

Monomer Component x2

The polymer X contains a monomer component x2 indicated by Formula (2) above as a monomer component.

Including such a monomer component x2 as a monomer component (particularly with the monomer component x1 described above and the monomer component x3 described in detail hereinafter) enables curing (polymerization) of the resin material to proceed optimally in the colored portion formation step (curing step) performed in a heated environment, while unwanted reaction (polymerization) of the resin material can be reliably prevented from occurring during storage of the color filter ink or in the ink application step and other steps described hereinafter. Particularly in the colored portion formation step (curing step) performed in a heated environment, polymerization of the resin material can be initiated satisfactorily, and polymerization can be made to progress continuously. Including the monomer component x2 as a monomer component also enables the formed colored portion to be provided with excellent hardness and other characteristics. In contrast, such effects as those described above are not obtained when the monomer component x2 is not included as a monomer component. More specifically, even when the monomer components x1, x3 are included, when the monomer component x2 is not included, continuous polymerization is difficult to maintain even in a heated environment, and the ability to produce color filters is severely reduced. It is also difficult to adequately advance curing of the resin material, and the durability of the color filter is reduced. The increased amount of time required to cure the resin material can also lead to degradation of the constituent materials of the colored portion to be formed.

The content ratio (calculated in terms of the weight of the monomer used to synthesize the polymer) of the monomer component x2 in the polymer X is preferably 5 to 60 wt %, and more preferably 10 to 50 wt %. When the content ratio of the monomer component x2 in the polymer X is within this range, such effects as those described above can be significantly demonstrated without impeding the functions of the aforementioned monomer component x1 and the monomer components x3 and x4 described in detail hereinafter. In contrast, when the content ratio of the monomer component x2 in the polymer X is less than the lower limit of the aforementioned range, the effects of including the monomer component x2 may not be adequately demonstrated. When the content ratio of the monomer component x2 in the polymer X exceeds the upper limit of the aforementioned range, the relative content ratios of the monomer components x1, x3, and x4 decrease, and the functions of these monomer components may not be adequately demonstrated. The reactivity of the polymer X at relatively low temperatures also increases, and the storage stability of the color filter ink tends to decrease. When the polymer X is a mixture of a plurality of types of compounds, the weighted average value (weighted average value based on weight ratio) of the mixed compounds may be used as the content ratio of the monomer component x2. When the polymer X is a mixture of a plurality of types of compounds, all of the compounds preferably contain the monomer component x2 in a content ratio such as described above.

Monomer Component x3

The polymer X contains a monomer component x3 indicated by Formula (3) above as a monomer component.

Including the monomer component x3 as a monomer component enables the formed colored portion to be provided with excellent chemical resistance, solvent resistance, and other characteristics. It is thereby possible to reliably prevent adverse effects from occurring when chemical application, rinsing (particularly rinsing using N-methyl-2-pyrrolidone or γ-butyrolactone), and other processing after the colored portion formation step (curing step).

The monomer component x3 has adequately low reactivity at relatively low temperatures (100° C. or lower, for example) in the polymer X, as with the monomer component x1, but exhibits adequate reactivity in a heated environment such as that of the heat treatment performed in the colored portion formation step (curing step). Curing (polymerization) of the resin material can therefore be made to progress optimally in the colored portion formation step (curing step) performed in a heated environment, while unwanted reaction (polymerization) of the resin material can be reliably prevented from occurring during storage of the color filter ink or in the ink application step and other steps.

By including the monomer component x3 as a monomer component, the pigment particles can be dispersed in the color filter ink with excellent stability when the color filter ink includes a pigment as the colorant, for example, and the color filter ink can be provided with excellent long-term storability and discharge stability.

The content ratio (calculated in terms of the weight of the monomer used to synthesize the polymer) of the monomer component x3 in the polymer X is preferably 2 to 20 wt %, and more preferably 3 to 15 wt %. When the content ratio of the monomer component x3 in the polymer X is within this range, such effects as those described above can be significantly demonstrated without impeding the functions of the aforementioned monomer components x1, x2 and the monomer component x4 described in detail hereinafter. In contrast, when the content ratio of the monomer component x3 in the polymer X is less than the lower limit of the aforementioned range, the effects of including the monomer component x3 may not be adequately demonstrated. When the content ratio of the monomer component x3 in the polymer X exceeds the upper limit of the aforementioned range, the relative content ratios of the monomer components x1, x2, and x4 decrease, and the functions of these monomer components may not be adequately demonstrated. The colored portion formed using the color filter ink also tends to become too hard, and the conformity thereof to deformation of the substrate or the like due to temperature variation is reduced. When the polymer X is a mixture of a plurality of types of compounds, the weighted average value (weighted average value based on weight ratio) of the mixed compounds may be used as the content ratio of the monomer component x3. When the polymer X is a mixture of a plurality of types of compounds, all of the compounds preferably contain the monomer component x3 in a content ratio such as described above.

Monomer Component x4

The polymer X contains a monomer component x4 indicated by Formula (3) above as a monomer component.

Including such a monomer component x4 as a monomer component makes it possible to reliably prevent thixotropy and viscosity of the color filter ink from increasing as the solids concentration increases when the liquid medium is removed from the color filter ink that has been applied to a substrate during formation of a colored portion, and to prevent unwanted irregularities from forming on the surface of the formed colored portion. The problem of unwanted irregularities occurring on the surface of the formed colored portion is particularly severe in the conventional technique when a pigment is included as the colorant, but the present invention makes it possible to reliably prevent such problem even when a pigment is included as the colorant.

The monomer component x4 has a hydroxyl group at a terminal end thereof. Having such a structure enables reactivity in a heated environment such as that of the heat treatment performed in the colored portion formation step (curing step) to be increased while the reactivity at relatively low temperatures (100° C. or lower, for example) is kept adequately low. Curing (polymerization) of the resin material can thereby be made to progress optimally in the colored portion formation step (curing step) performed in a heated environment, while unwanted reaction (polymerization) of the resin material can be reliably prevented from occurring during storage of the color filter ink or in the ink application step and other steps.

By including the monomer component x4 as a monomer component, the pigment particles can be dispersed in the color filter ink with excellent stability when the color filter ink includes a pigment as the colorant, for example, and the color filter ink can be provided with excellent long-term storability and discharge stability.

The content ratio (calculated in terms of the weight of the monomer used to synthesize the polymer) of the monomer component x4 in the polymer X is preferably 2 to 20 wt %, and more preferably 3 to 15 wt %. When the content ratio of the monomer component x4 in the polymer X is within this range, such effects as those described above can be significantly demonstrated without impeding the functions of the aforementioned monomer components x1, x2, and x3. In contrast, when the content ratio of the monomer component x4 in the polymer X is less than the lower limit of the aforementioned range, the effects of including the monomer component x4 may not be adequately demonstrated. When the content ratio of the monomer component x4 in the polymer X exceeds the upper limit of the aforementioned range, the relative content ratios of the monomer components x1, x2, and x3 decrease, and the functions of these monomer components may not be adequately demonstrated. The hardness of the colored portion formed using the color filter ink also tends to decrease. When the polymer X is a mixture of a plurality of types of compounds, the weighted average value (weighted average value based on weight ratio) of the mixed compounds may be used as the content ratio of the monomer component x4. When the polymer X is a mixture of a plurality of types of compounds, all of the compounds preferably contain the monomer component x4 in a content ratio such as described above.

The weight-average molecular weight of the polymer X is preferably 1,000 to 50,000, more preferably 1,200 to 10,000, and more preferably 1,500 to 5,000. It is thereby possible to obtain particularly excellent stability over time (long-term storability) of the color filter ink and discharge stability of the color filter ink, to provide the color filter with adequately excellent production properties, to more reliably provide the colored portion formed using the color filter ink with a high degree of flatness, and to more effectively prevent uneven color or other adverse effects from occurring in the image displayed using the color filter.

The degree of dispersion (Weight-average molecular weight Mw/Number-average molecular weight Mn) of the polymer X is preferably 1 to 3.

Polymer Y

The polymer Y is indicated by Formula (11) below, and includes a monomer component y1 indicated by Formula (5) above, and a monomer component y2 indicated by Formula (6) above. The polymer Y may be composed of essentially a single compound or may be a mixture of a plurality of types of compounds. However, when the polymer Y is a mixture of a plurality of types of compounds, the compounds contain the monomer components y1 and y2.

Chemical Formula (11)

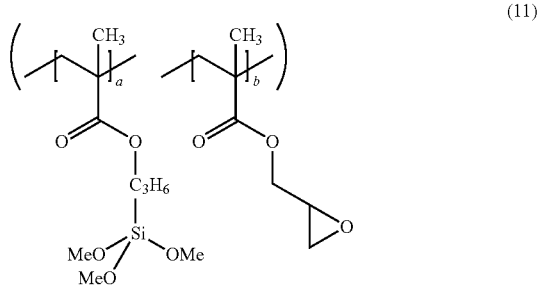

(11)

In Formula (11), a and b are each independently an integer equal to 1 or higher.

Monomer Component y1

The polymer Y contains the monomer component y1 indicated by Formula (5) above as a monomer component.

Including such a monomer component y1 as a monomer component enables the formed colored portion to be provided with particularly excellent adhesion to a substrate. As a result, the color filter can be provided with particularly excellent durability.

The content ratio (calculated in terms of the weight of the monomer used to synthesize the polymer) of the monomer component y1 in the polymer Y is preferably 30 to 90 wt %, and more preferably 40 to 80 wt %. When the content ratio of the monomer component y1 in the polymer Y is within this range, such effects as those described above can be significantly demonstrated without impeding the functions of the monomer component y2 described in detail hereinafter. In contrast, when the content ratio of the monomer component y1 in the polymer Y is less than the lower limit of the aforementioned range, the effects of including the monomer component y1 may not be adequately demonstrated. When the content ratio of the monomer component y1 in the polymer Y exceeds the upper limit of the aforementioned range, the relative content ratio of the monomer component y2 decreases, and the function of the monomer component y2 may not be adequately demonstrated. The viscosity of the color filter ink also tends to increase in conjunction with an increase in solids concentration when the liquid medium is removed from the color filter ink applied to the substrate during formation of the colored portion, and unwanted irregularities are prone to occur on the surface of the formed colored portion. When the polymer Y is a mixture of a plurality of types of compounds, the weighted average value (weighted average value based on weight ratio) of the mixed compounds may be used as the content ratio of the monomer component y1. When the polymer Y is a mixture of a plurality of types of compounds, all of the compounds preferably contain the monomer component y1 in a content ratio such as described above.

Monomer Component y2

The polymer Y contains the monomer component y2 indicated by Formula (6) above as a monomer component.

Including such a monomer component y2 as a monomer component (particularly with the monomer component y1 described above) enables curing (polymerization) of the resin material to proceed optimally in the colored portion formation step (curing step) performed in a heated environment, while unwanted reaction (polymerization) of the resin material can be reliably prevented from occurring during storage of the color filter ink or in the ink application step and other steps described hereinafter. Particularly in the colored portion formation step (curing step) performed in a heated environment, polymerization of the resin material can be initiated satisfactorily, and polymerization can be made to progress continuously. Including the monomer component y2 as a monomer component also enables the formed colored portion to be provided with excellent hardness and other characteristics.

Including the monomer component y2 in the polymer Y also enables the polymer X and polymer Y to have adequately excellent affinity and compatibility. As a result, the color filter ink can be provided with excellent discharge stability, and the colored portion formed using the color filter ink can be provided with excellent transparency (reduction of light transmittance by non-transparency of the resin material is prevented) and particularly excellent adhesion to a substrate, and the potential for cracking and other problems is reduced. In contrast, when the monomer component y2 is not included as a monomer component, the polymer X and polymer Y cannot be provided with adequately excellent affinity and compatibility with each other, the color filter ink has inferior discharge stability, the manufactured color filter is prone to have uneven color and saturation, and contrast, durability, reliability, and other characteristics are adversely affected.

The content ratio (calculated in terms of the weight of the monomer used to synthesize the polymer) of the monomer component y2 in the polymer Y is preferably 10 to 70 wt %, and more preferably 20 to 60 wt %. When the content ratio of the monomer component y2 in the polymer Y is within this range, such effects as those described above can be significantly demonstrated without impeding the functions of the aforementioned monomer component y1. In contrast, when the content ratio of the monomer component y2 in the polymer Y is less than the lower limit of the aforementioned range, the effects of including the monomer component y2 may not be adequately demonstrated. When the content ratio of the monomer component y2 in the polymer Y exceeds the upper limit of the aforementioned range, the relative content ratio of the monomer component y1 decreases, and the function of the monomer component y1 may not be adequately demonstrated. The reactivity of the polymer Y at relatively low temperature also increases, and the storage stability of the color filter ink tends to decrease. When the polymer Y is a mixture of a plurality of types of compounds, the weighted average value (weighted average value based on weight ratio) of the mixed compounds may be used as the content ratio of the monomer component y2. When the polymer Y is a mixture of a plurality of types of compounds, all of the compounds preferably contain the monomer component y2 in a content ratio such as described above.

The weight-average molecular weight of the polymer Y is preferably 1,000 to 50,000, more preferably 1,200 to 10,000, and more preferably 1,500 to 5,000. It is thereby possible to obtain particularly excellent stability over time (long-term storability) of the color filter ink and discharge stability of the color filter ink, to provide the color filter with adequately excellent production properties, to more reliably provide the colored portion formed using the color filter ink with a high degree of flatness, and to more effectively prevent uneven color and the like from occurring in the image displayed using the color filter.

The degree of dispersion (Weight-average molecular weight Mw/Number-average molecular weight Mn) of the polymer Y is preferably 1 to 3.

As described above, the color filter ink in the present invention is characterized in comprising the polymer X that includes the monomer components x1, x2, x3, and x4; and the polymer Y that includes the monomer components y1 and y2. Such excellent effects as those described above are thereby obtained. In contrast, such effects as those described above are not obtained when at least one of the polymer X and the polymer Y is missing, one or more types of monomer components among the monomer components x1, x2, x3, x4 that constitute the polymer X is not used, or one or more types of monomer components among the monomer components y1, y2 that constitute the polymer Y is not used. In the same manner, such excellent effects as those described above are not obtained when a polymer that includes a monomer component of the polymer X and a monomer component of the polymer Y in the same molecule is used instead of jointly using the polymer X and the polymer Y.

The relationship $0.9 \leq C_X/C_Y \leq 6.0$ is preferably satisfied, and the relationship $1.0 \leq C_X/C_Y \leq 5.0$ is more preferably satisfied, wherein $C_X$ (wt %) is the content ratio of the polymer X in the color filter ink, and $C_Y$ (wt %) is the content ratio of the polymer Y in the color filter ink. By satisfying such a relationship, it is possible to provide the color filter ink with particularly excellent stability over time (long-term storability) and reactivity and high temperature, and the manufactured color filter with particularly excellent durability and reliability, and uneven color and the like can be more effectively prevented from occurring in the color filter manufactured using the color filter ink.

The sum of the content ratio ($C_X$ (wt %)) of the polymer X and the content ratio ($C_Y$ (wt %)) of the polymer Y in the color filter ink is preferably 0.3 to 12 wt %, and more preferably 0.9 to 8.5 wt %.

As described above, the resin material in the present invention includes the polymer X and the polymer Y, but the resin material may also include another resin component (polymer).

A polymer Z and a polymer W such as described below may be included as such a resin component (polymer).

Polymer Z

The polymer Z is indicated by Formula (15) below, and includes a monomer component z1 indicated by Formula (12) below, a monomer component z2 indicated by Formula (13) below, and a monomer component z3 indicated by Formula (14) below.

Chemical Formula (12)

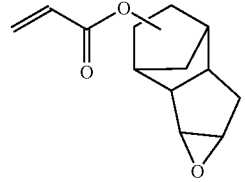

(12)

Chemical Formula (13)

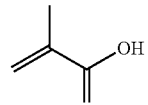

(13)

Chemical Formula (14)

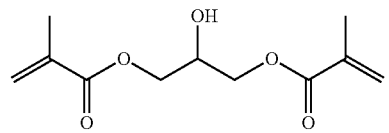

(14)

Chemical Formula (15)

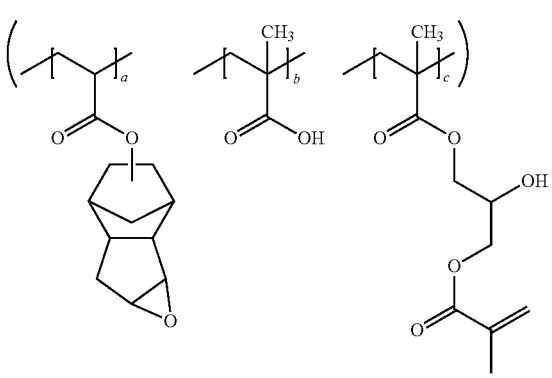

(15)

In Formula (15), a, b, and c are each independently an integer equal to 1 or higher.

Including such a polymer Z makes it possible to obtain excellent curing reaction switching characteristics of the resin material, discharge stability of the color filter ink, and hardness and other characteristics of the formed colored portion, and to disperse the pigment in the color filter ink with particularly excellent stability when a pigment is included as the colorant. Including the polymer Z also makes it possible to effectively prevent unwanted irregularities from occurring on the surface of the colored portion formed using the color filter ink, and to more effectively prevent uneven color and saturation, or reduced contrast ratio in the image displayed using the color filter. The reason for this may be that the pigment particles can be effectively prevented from aggregating when the liquid medium is removed from the color filter ink applied to the substrate, and the colored portion is formed. Including the polymer Z also makes it possible to easily form microparticles (break up) from aggregates of the pigment particles used as a starting material, and to enhance productivity of the color filter ink when a manufacturing method such as described hereinafter is used to manufacture the color filter ink (in the fine-dispersion step described hereinafter). Since the polymer Z has extremely high stability with respect to mechanical forces, even when the polymer Z is subjected to the fine-dispersion step described hereinafter along with the pigment, denaturation and degradation are prevented from occurring in the fine-dispersion step. Consequently, by using the polymer Z, a color filter ink having excellent dispersion properties of the pigment can be efficiently prepared while degradation and the like of the resin material is reliably prevented.

The polymer Z may be composed of essentially a single compound or may be a mixture of a plurality of types of compounds. However, when the polymer Z is a mixture of a plurality of types of compounds, the compounds contain the monomer components z1, z2, and z3.

Monomer Component z1

The polymer Z contains the monomer component z1 indicated by Formula (12) above as a monomer component.

Including such a monomer component z1 as a monomer component enables curing (polymerization) of the resin material to proceed optimally in the colored portion formation step (curing step) performed in a heated environment, while unwanted reaction (polymerization) of the resin material can be reliably prevented from occurring during storage of the color filter ink or in the ink application step and other steps described hereinafter. Specifically, the resin material can be provided with excellent curing reaction switching characteristics. By including the monomer component z1 as a monomer component, the pigment particles can be dispersed in the color filter ink with particularly excellent stability, and the color filter ink can be provided with excellent long-term storability and discharge stability. The monomer component z1 has excellent reactivity in high-temperature environments, as well as extremely high stability with respect to mechanical force in the polymer Z. Therefore, even when the monomer component z1 is subjected to the fine-dispersion step described hereinafter along with the pigment, denaturation and degradation of the polymer Z in this step are prevented, and the function of the polymer Z can be reliably demonstrated in the color filter ink. Including the monomer component z1 as a monomer component also enables the formed colored portion to be provided with excellent hardness and other characteristics.

Including the monomer component z1 in the polymer Z also enables the polymer X and polymer Z to have adequately excellent affinity and compatibility. As a result, the color filter ink can be provided with excellent discharge stability, and the colored portion formed using the color filter ink can be provided with excellent transparency (reduction of light transmittance by non-transparency of the resin material is prevented) and particularly excellent adhesion to a substrate, and the potential for cracking and other problems is reduced.

The content ratio (calculated in terms of the weight of the monomer used to synthesize the polymer) of the monomer component z1 in the polymer Z is preferably 50 to 95 wt %, and more preferably 60 to 85 wt %. When the content ratio of the monomer component z1 in the polymer Z is within this range, such effects as those described above can be significantly demonstrated without impeding the functions of the monomer components z2 and z3 described in detail hereinafter. When the polymer Z is a mixture of a plurality of types of compounds, the weighted average value (weighted average value based on weight ratio) of the mixed compounds may be used as the content ratio of the monomer component z1.

When the polymer Z is a mixture of a plurality of types of compounds, all of the compounds preferably contain the monomer component z1 in a content ratio such as described above.

Monomer Component z2

The polymer Z contains the monomer component z2 indicated by Formula (13) above as a monomer component.

Including such a monomer component z2 as a monomer component makes it possible for the color filter ink to spread satisfactorily on the substrate, and makes it possible to reliably prevent the entrainment of bubbles and other adverse events and satisfactorily form a colored portion that has excellent adhesion to the substrate. When the color filter ink includes a pigment and a dispersing agent, including the monomer component z2 as a monomer component makes it possible to provide the dispersing agent with particularly excellent dispersion stability, and as a result, particularly excellent dispersion stability of the pigment and long-term storability of the color filter ink can be obtained.

The content ratio (calculated in terms of the weight of the monomer used to synthesize the polymer) of the monomer component z2 in the polymer Z is preferably 3 to 35 wt %, and more preferably 10 to 25 wt %. When the content ratio of the monomer component z2 in the polymer Z is within this range, such effects as those described above can be significantly demonstrated without impeding the functions of the aforementioned monomer component z1 and the monomer component z3 described in detail hereinafter. When the polymer Z is a mixture of a plurality of types of compounds, the weighted average value (weighted average value based on weight ratio) of the mixed compounds may be used as the content ratio of the monomer component z2. When the polymer Z is a mixture of a plurality of types of compounds, all of the compounds preferably contain the monomer component z2 in a content ratio such as described above.

Monomer Component z3

The polymer Z contains the monomer component z3 indicated by Formula (14) above as a monomer component.

Such a monomer component z3 is a component that contributes to curing of the resin material in the colored portion formation step (curing step) described hereinafter, in the same manner as the aforementioned monomer components x1, x2, z1, and other components, but the monomer components x1, x2, z1 have the function of providing the formed colored portion with a high degree of hardness, whereas the monomer component z3 has the functions of imparting an appropriate degree of flexibility to the formed colored portion and enabling the colored portion to conform to deformation of the substrate and maintain adhesion to the substrate or the like even when deformation (thermal expansion, thermal contraction, and the like) occurs in the substrate or the like to which the colored portion is provided. Satisfactory adhesion can thereby be maintained even when the manufactured color filter is repeatedly exposed to sudden temperature changes that accompany image display, for example, and light leakage (white spots, luminescent spots) and other problems can be more reliably prevented. Specifically, the color filter can be provided with particularly excellent durability.

The monomer component z3 has adequately low reactivity at relatively low temperatures (100° C. or lower, for example) in the polymer Z, as with the monomer components x1, z1, but exhibits adequate reactivity in a heated environment such as that of the heat treatment performed in the colored portion formation step (curing step). Curing (polymerization) of the resin material can therefore be made to progress optimally in the colored portion formation step (curing step) performed in a heated environment, while unwanted reaction (polymerization) of the resin material can be reliably prevented from occurring during storage of the color filter ink or in the ink application step and other steps.

Including such a monomer component z3 as a monomer component makes it possible to reliably prevent thixotropy and viscosity of the color filter ink from increasing as the solids concentration increases when the liquid medium is removed from the color filter ink that has been applied to a substrate during formation of a colored portion, and to reliably prevent unwanted irregularities from forming on the surface of the formed colored portion.

The content ratio (calculated in terms of the weight of the monomer used to synthesize the polymer) of the monomer component z3 in the polymer Z is preferably 2 to 30 wt %, and more preferably 5 to 20 wt %. When the content ratio of the monomer component z3 in the polymer Z is within this range, such effects as those described above can be significantly demonstrated without impeding the functions of the aforementioned monomer components z1, z2. When the polymer Z is a mixture of a plurality of types of compounds, the weighted average value (weighted average value based on weight ratio) of the mixed compounds may be used as the content ratio of the monomer component z3. When the polymer Z is a mixture of a plurality of types of compounds, all of the compounds preferably contain the monomer component z3 in a content ratio such as described above.

The weight-average molecular weight of the polymer Z is preferably 5,000 to 50,000, and more preferably 6,000 to 15,000. It is thereby possible to obtain particularly excellent stability over time (long-term storability) of the color filter ink and discharge stability of the color filter ink, to provide the color filter with adequately excellent production properties, to more reliably provide the colored portion formed using the color filter ink with a high degree of flatness, and to more effectively prevent uneven color and other adverse events from occurring in the image displayed using the color filter.

The degree of dispersion (Weight-average molecular weight Mw/Number-average molecular weight Mn) of the polymer Z is preferably 1 to 3.

Polymer W

The polymer W is indicated by Formula (20) below, and includes a monomer component w1 indicated by Formula (16) below, a monomer component w2 indicated by Formula (17) below, a monomer component w3 indicated by Formula (18) below, and a monomer component w4 indicated by Formula (19) below.

Chemical Formula (16)

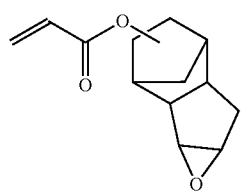

(16)

Chemical Formula (17)

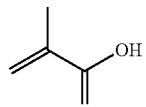

(17)

Chemical Formula (18)

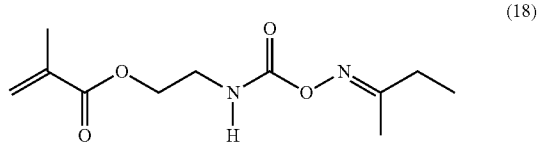

(18)

Chemical Formula (19)

(19)

Chemical Formula (20)

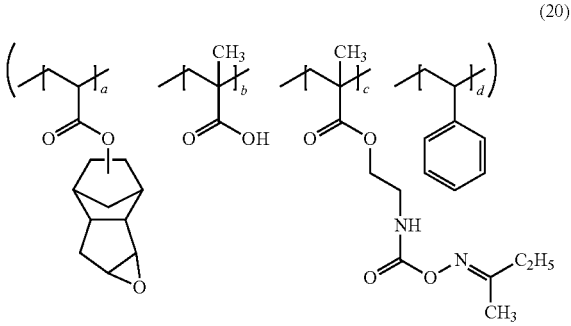

(20)

In Formula (20), a, b, c, and d are each independently an integer equal to 1 or higher.

Including such a polymer W makes it possible to obtain excellent curing reaction switching characteristics of the resin material, discharge stability of the color filter ink, and hardness and other characteristics of the formed colored portion; and to disperse the pigment in the color filter ink with particularly excellent stability when a pigment is included as the colorant. Including the polymer W also makes it possible to effectively prevent unwanted irregularities from occurring on the surface of the colored portion formed using the color filter ink, and to more effectively prevent uneven color and saturation, or reduced contrast ratio in the image displayed using the color filter. The reason for this may be that the pigment particles can be effectively prevented from aggregating when the liquid medium is removed from the color filter ink applied to the substrate, and the colored portion is formed. Including the polymer W also makes it possible to easily form microparticles (break up) from aggregates of the pigment particles used as a starting material, and to enhance productivity of the color filter ink when a manufacturing method such as described hereinafter is used to manufacture the color filter ink (in the fine-dispersion step described hereinafter). Since the polymer W has extremely high stability with respect to mechanical forces, even when the polymer W is subjected to the fine-dispersion step described hereinafter along with the pigment, denaturation and degradation are prevented from occurring in the fine-dispersion step. Consequently, by using the polymer W, a color filter ink having excellent dispersion properties of the pigment can be efficiently prepared while degradation and the like of the resin material is reliably prevented.

The polymer W may be composed of essentially a single compound or may be a mixture of a plurality of types of compounds. However, when the polymer W is a mixture of a plurality of types of compounds, the compounds contain the monomer components w1, w2, w3, and w4.

Monomer Component w1

The polymer W contains the monomer component w1 indicated by Formula (16) above as a monomer component.

Including such a monomer component w1 as a monomer component enables curing (polymerization) of the resin material to proceed optimally in the colored portion formation step (curing step) performed in a heated environment, while unwanted reaction (polymerization) of the resin material can be reliably prevented from occurring during storage of the color filter ink or in the ink application step and other steps described hereinafter. Specifically, the resin material can be provided with excellent curing reaction switching characteristics. By including the monomer component w1 as a monomer component, the pigment particles can be dispersed in the color filter ink with particularly excellent stability, and the color filter ink can be provided with excellent long-term storability and discharge stability. The monomer component w1 has excellent reactivity in high-temperature environments, as well as extremely high stability with respect to mechanical force in the polymer W. Therefore, even when the monomer component w1 is subjected to the fine-dispersion step described hereinafter along with the pigment, denaturation and degradation of the polymer W in this step are prevented, and the function of the polymer W can be reliably demonstrated in the color filter ink. Including the monomer component w1 as a monomer component also enables the formed colored portion to be provided with excellent hardness and other characteristics.

Including the monomer component w1 in the polymer W also enables the polymer X and polymer W to have adequately excellent affinity and compatibility. As a result, the color filter ink can be provided with excellent discharge stability, and the colored portion formed using the color filter ink can be provided with excellent transparency (reduction of light transmittance by non-transparency of the resin material is prevented) and particularly excellent adhesion to a substrate, and the potential for cracking and other problems is reduced.

The content ratio (calculated in terms of the weight of the monomer used to synthesize the polymer) of the monomer component w1 in the polymer W is preferably 25 to 75 wt %, and more preferably 40 to 60 wt %. When the content ratio of the monomer component w1 in the polymer W is within this range, such effects as those described above can be significantly demonstrated without impeding the functions of the monomer components w2, w3, and w4 described in detail hereinafter. When the polymer W is a mixture of a plurality of types of compounds, the weighted average value of the mixed compounds (weighted average value based on weight ratio) may be used as the content ratio of the monomer component w1. When the polymer W is a mixture of a plurality of types of compounds, all of the compounds preferably contain the monomer component w1 in a content ratio such as described above.

Monomer Component w2

The polymer W contains the monomer component w2 indicated by Formula (17) above as a monomer component.

Including such a monomer component w2 as a monomer component makes it possible for the color filter ink to spread satisfactorily on the substrate, and makes it possible to reliably prevent the entrainment of bubbles and other adverse effects, and satisfactorily form a colored portion that has excellent adhesion to the substrate. When the color filter ink includes a pigment and a dispersing agent, including the monomer component w2 as a monomer component makes it possible to provide the dispersing agent with particularly excellent dispersion stability, and as a result, particularly excellent dispersion stability of the pigment and long-term storability of the color filter ink can be obtained.

The content ratio (calculated in terms of the weight of the monomer used to synthesize the polymer) of the monomer component w2 in the polymer W is preferably 2 to 25 wt %, and more preferably 5 to 15 wt %. When the content ratio of the monomer component w2 in the polymer W is within this range, such effects as those described above can be significantly demonstrated without impeding the functions of the aforementioned monomer component w1 and the monomer components w3, w4 described in detail hereinafter. When the polymer W is a mixture of a plurality of types of compounds, the weighted average value (weighted average value based on weight ratio) of the mixed compounds may be used as the content ratio of the monomer component w2. When the polymer W is a mixture of a plurality of types of compounds, all of the compounds preferably contain the monomer component w2 in a content ratio such as described above.

Monomer Component w3

The polymer W contains the monomer component w3 indicated by Formula (18) above as a monomer component.

Including the monomer component w3 as a monomer component enables the formed colored portion to be provided with excellent chemical resistance, solvent resistance, and other characteristics. It is thereby possible to reliably prevent adverse effects from occurring when chemical application, rinsing (particularly rinsing using N-methyl-2-pyrrolidone or γ-butyrolactone), and other processing is performed after the colored portion formation step (curing step).

The monomer component w3 has adequately low reactivity at relatively low temperatures (100° C. or lower, for example) in the polymer (polymer W), as with the monomer component w1 and other components, but has adequate reactivity in a heated environment such as that of the heat treatment performed in the colored portion formation step (curing step). Curing (polymerization) of the resin material can therefore be made to progress optimally in the colored portion formation step (curing step) performed in a heated environment, while unwanted reaction (polymerization) of the resin material can be reliably prevented from occurring during storage of the color filter ink or in the ink application step and other steps.

By including the monomer component w3 as a monomer component, the pigment particles can be dispersed in the color filter ink with excellent stability when the color filter ink includes a pigment as the colorant, for example, and the color filter ink can be provided with excellent long-term storability and discharge stability.

The content ratio (calculated in terms of the weight of the monomer used to synthesize the polymer) of the monomer component w3 in the polymer W is preferably 5 to 50 wt %, and more preferably 10 to 40 wt %. When the content ratio of the monomer component w3 in the polymer W is within this range, such effects as those described above can be significantly demonstrated without impeding the functions of the aforementioned monomer components w1, w2 and the monomer component w4 described in detail hereinafter. When the polymer W is a mixture of a plurality of types of compounds, the weighted average value (weighted average value based on weight ratio) of the mixed compounds may be used as the content ratio of the monomer component w3. When the polymer W is a mixture of a plurality of types of compounds, all of the compounds preferably contain the monomer component w3 in a content ratio such as described above.

Monomer Component w4

The polymer W contains a monomer component w4 indicated by Formula (19) above as a monomer component.

Including such a monomer component w4 as a monomer component makes it possible to reliably prevent thixotropy and viscosity of the color filter ink from increasing as the solids concentration increases when the liquid medium is removed from the color filter ink that has been applied to a substrate during formation of a colored portion, and to prevent unwanted irregularities from forming on the surface of the formed colored portion.

Including the monomer component w4 as a monomer component enables the hydrophobic properties of the resin overall to be satisfactorily adjusted, and for particularly excellent affinity and compatibility to be obtained in the polymers that constitute the resin material. As a result, the color filter ink can be provided with excellent discharge stability, and the colored portion formed using the color filter ink can be provided with excellent transparency (reduction of light transmittance by non-transparency of the resin material is prevented) and particularly excellent adhesion to a substrate, and the potential for cracking and other problems is reduced.

The content ratio (calculated in terms of the weight of the monomer used to synthesize the polymer) of the monomer component w4 in the polymer W is preferably 3 to 40 wt %, and more preferably 5 to 30 wt %. When the content ratio of the monomer component w4 in the polymer W is within this range, such effects as those described above can be significantly demonstrated without impeding the functions of the aforementioned monomer components w1, w2, and w3. When the polymer W is a mixture of a plurality of types of compounds, the weighted average value (weighted average value based on weight ratio) of the mixed compounds may be used as the content ratio of the monomer component w4. When the polymer W is a mixture of a plurality of types of compounds, all of the compounds preferably contain the monomer component w4 in a content ratio such as described above.

The weight-average molecular weight of the polymer W is preferably 5,000 to 50,000, more preferably 6,000 to 15,000. It is thereby possible to obtain particularly excellent stability of the color filter ink over time (long-term storability) and discharge stability of the color filter ink, to provide the color filter with adequately excellent production properties, to more reliably provide the colored portion formed using the color filter ink with a high degree of flatness, and to more effectively prevent uneven color and the like from occurring in the image displayed using the color filter.

The degree of dispersion (Weight-average molecular weight Mw/Number-average molecular weight Mn) of the polymer W is preferably 1 to 3.

It is sufficient insofar as the polymers described above ultimately have a structure such as described above (partial structure corresponding to the monomer components), and the polymers described above may be synthesized using the monomer components as such described above, or may be synthesized using different components (precursors, derivatives, and the like) than the monomer components described above.

The content ratio of the resin material in the color filter ink is preferably 0.5 to 18 wt %, more preferably 1 to 15 wt %, and more preferably 3 to 10 wt %.

The relationship $0.2 \leq C_R/C_C \leq 9.0$ is preferably satisfied, the relationship $0.3 \leq C_R/C_C \leq 5.0$ is more preferably satisfied, and the relationship $0.4 \leq C_R/C_C \leq 3.5$ is even more preferably satisfied, wherein $C_R$ (wt %) is the content ratio of the resin material in the color filter ink, and $C_C$ (wt %) is the content ratio of the colorant in the color filter ink. Satisfying such a relationship enables the manufactured color filter to be provided with more excellent contrast and other characteristics, and adequate contrast to be maintained even when the thickness of the colored portion is reduced. In the conventional color filter ink, unwanted irregularities and other defects on the surface of the formed colored portion are prone to occur when the content ratio of the resin material is low with respect to the content ratio of the colorant (particularly when a pigment is used as the colorant), but in the present invention, unwanted irregularities can be reliably prevented from occurring on the surface of the formed colored portion even when the content ratio of the resin material is low with respect to the content ratio of the colorant, as described above. Specifically, satisfying a relationship such as described above causes the effects of the present invention to be more significantly demonstrated.

The resin material constituting the color filter ink may also include a polymer other than those described above (e.g., a thermoplastic polymer or a curable polymer other than the polymers X, Y, Z, and W described above).

Liquid Medium

The liquid medium (liquid vehicle) has the function of dissolving and/or dispersing the colorant and other components such as described above. Specifically, the liquid medium functions as a solvent and/or dispersion medium. Most of the liquid medium is usually removed in the process of manufacturing the color filter.

Ester compounds, ether compounds, hydroxyketones, carbonic diesters, cyclic amide compounds, and the like, for example, may be used as the liquid medium that constitutes the color filter ink, preferred among which are (1) ethers (polyalcohol ethers) as condensates of polyalcohols (e.g., ethylene glycol, propylene glycol, butylene glycol, glycerin, and the like); alkyl ethers (e.g., methyl ether, ethyl ether, butyl ether, hexyl ether, and the like) of polyalcohols or polyalcohol ethers; and esters (e.g., formate, acetate, propionate, and the like); (2) esters (e.g., methyl esters and the like) of polycarboxylic acids (e.g., succinic acid, glutamic acid, and the like); (3) ethers, esters, and the like of compounds (hydroxy acids) having at least one hydroxyl group and at least one carboxyl group in the molecule thereof; and (4) carbonic diesters having a chemical structure such as that obtained by reaction of a polyalcohol and a phosgene. Examples of compounds that can be used as the liquid medium include 2-(2-methoxy-1-methylethoxy)-1-methyl ethyl acetate, triethylene glycol dimethyl ether, triethylene glycol diacetate, diethylene glycol monoethyl ether acetate, 4-methyl-1,3-dioxolan-2-one, bis(2-butoxyethyl)ether, dimethyl glutarate, ethylene glycol di-n-butyrate, 1,3-butylene glycol diacetate, diethylene glycol monobutyl ether acetate, tetraethylene glycol dimethyl ether, 1,6-diacetoxyhexane, tripropylene glycol monomethyl ether, butoxypropanol, diethylene glycol methyl ethyl ether, diethylene glycol methyl butyl ether, triethylene glycol methyl ethyl ether, triethylene glycol methyl butyl ether, dipropylene glycol monomethyl ether acetate, diethylene glycol dimethyl ether, ethyl 3-ethoxy propionate, diethylene glycol ethyl methyl ether, 3-methoxybutyl acetate, diethylene glycol diethyl ether, ethyl octanoate, ethylene glycol monobutyl ether acetate, ethylene glycol monobutyl ether, cyclohexyl acetate, diethyl succinate, ethylene glycol diacetate, propylene glycol diacetate, 4-hydroxy-4-methyl-2-pentanone, dimethyl succinate, 1-butoxy-2-propanol, diethylene glycol monoethyl ether, diethylene glycol monomethyl ether, dipropylene glycol monomethyl ether, 3-methoxy-n-butyl acetate, diacetin, dipropylene glycol mono n-propyl ether, polyethylene glycol monomethyl ether, butyl glycolate, ethylene glycol monohexyl ether, dipropylene glycol mono n-butyl ether, N-methyl-2-pyrrolidone, triethylene glycol butyl methyl ether, bis(2-propoxyethyl)ether, diethylene glycol diacetate, diethylene glycol butyl methyl ether, diethylene glycol butyl ethyl ether, diethylene glycol butyl propyl ether, diethylene glycol ethyl propyl ether, diethylene glycol methyl propyl ether, diethylene glycol propyl ether acetate, triethylene glycol methyl ether acetate, triethylene glycol ethyl ether acetate, triethylene glycol propyl ether acetate, triethylene glycol butyl ether acetate, triethylene glycol butyl ethyl ether, triethylene glycol ethyl methyl ether, triethylene glycol ethyl propyl ether, triethylene glycol methyl propyl ether, dipropylene glycol methyl ether acetate, n-nonyl alcohol, diethylene glycol monobutyl ether, triethylene glycol monomethyl ether, ethylene glycol 2-ethylhexyl ether, triethylene glycol monoethyl ether, diethylene glycol monohexyl ether, triethylene glycol monobutyl ether, diethylene glycol mono-2-ethylhexyl ether, tripropylene glycol mono n-butyl ether, butyl cellosolve acetate, and the like, and one or more types of compounds selected from the above examples may be combined and used.

Among these examples, the liquid medium preferably includes one or more types of compounds selected from the group that includes 1,3-butylene glycol diacetate, bis(2-butoxyethyl)ether, 2-(2-methoxy-1-methylethoxy)-1-methylethyl acetate, and diethylene glycol monobutyl ether acetate. The polymer X and the polymer Y can thereby be more uniformly dissolved in the color filter ink, and the ink can be provided with particularly excellent discharge stability. When the color filter ink includes a pigment as the colorant, the pigment particles can be dispersed with particularly excellent stability in the color filter ink. As a result, it is possible to more effectively suppress the occurrence of uneven color, saturation, and other characteristics between regions of a manufactured color filter, and to provide the color filter with particularly excellent uniformity of characteristics between units. There is also relatively minimal variation in the physical properties of the color filter ink even when the color filter ink includes relatively large quantities of the colorant, the resin material, and other components. Adequately excellent long-term dispersion stability of the pigment can also be obtained even when the content ratio of the pigment is high. When the liquid medium is composed of such compounds as described above, the color filter ink can be reliably made to spread into the entire cell in the method for manufacturing a color filter such as described hereinafter.

When the liquid medium includes diethylene glycol monobutyl ether acetate among the examples given above, the color filter ink can be provided with a particularly low viscosity and particularly excellent discharge stability of droplets of the color filter ink. Since the color filter ink instantly spreads into the corners on the substrate, the thickness of the formed colored portion can be made more uniform, and particularly excellent color reproduction properties and depolarization properties (contrast ratio) can be obtained.

Suitable solubility of water in the liquid medium can be obtained when the liquid medium includes diethylene glycol monobutyl ether acetate. The liquid medium that constitutes the color filter ink can therefore be reliably prevented from absorbing moisture from the outside. Water can also be suitably dissolved and removed even when water penetrates into the flow path or the like of the color filter ink in the droplet discharge device. As a result, particularly excellent discharge stability (e.g., uniformity of the droplet discharge quantity) of droplets of the color filter ink from the droplet discharge head can be obtained over a longer period of time.

When the liquid medium includes bis(2-butoxyethyl)ether and 1,3-butylene glycol diacetate among the examples described above, the color filter ink is extremely resistant to drying in the vicinity of the nozzles, and flight deflection in the ink application step is more effectively suppressed. In the flushing step performed to periodically discharge a small quantity of color filter ink to prevent nozzle blockage, the color filter ink can be prevented from drying in the vicinity of the nozzles during long-distance head movement, and dummy pixels or other waste areas provided in the substrate are no longer necessary. Since the ink does not easily dry, degradation, aggregation, and segregation of the colorant, resin, and other components can also be more reliably prevented.

Suitable solubility of water in the liquid medium can be obtained particularly when the liquid medium includes 1,3-butylene glycol diacetate. Water can therefore be suitably dissolved, and the color filter ink can move within the flow path while fluidity and dispersion stability are maintained, even when some moisture has penetrated into the inside of the flow path or the like of color filter ink in the droplet discharge device, while the liquid medium constituting the color filter ink is reliably prevented from absorbing excessive amounts of moisture from the outside.

Among examples (1) through (4) above, a compound of (1) is preferred, and a compound having a propylene glycol backbone and alkoxy groups at both terminal ends thereof is particularly suitable for use as the liquid medium. Through the use of such a compound, the color filter ink can be provided with particularly excellent discharge stability of droplets; unevenness of color, saturation, and the like in regions of the manufactured color filter can be more effectively suppressed, and the color filter can be provided with particularly excellent uniformity of characteristics between individual units. Particularly when the color filter ink includes a pigment as the colorant, because of the chemical structural interaction between the aforementioned compounds and the resin material such as previously described, the resin material can be unevenly distributed on the surfaces of the pigment particles in the color filter ink, particularly excellent discharge stability of droplets can be obtained, the dispersion stability of the pigment particles in the color filter ink can be made particularly excellent, and the color filter ink can be provided with particularly excellent long-term storage properties while the dissolving properties of the resin material such as previously described are made adequately excellent. The color filter can also be manufactured with particularly excellent productivity. The color filter can also be provided with particularly excellent durability. Even when the content ratio of the pigment in the color filter ink is relatively high, the dispersion stability of the pigment can be adequately excellent, and the color filter ink can be provided with excellent stability (long-term storage properties). Including a compound having a propylene glycol backbone and alkoxy groups at both terminal ends thereof as the liquid medium makes it possible to effectively prevent degradation of the droplet discharge head used for droplet discharge. The frequency of replacement, repair, and other maintenance of the droplet discharge head can therefore be reduced even when a large number of color filters are manufactured, and the color filter can be manufactured with excellent productivity.

The compound having the chemical structure such as described above (compound having a propylene glycol backbone and alkoxy groups at both terminal ends thereof) can be indicated by the general formula (21) below.

Chemical Formula (21)

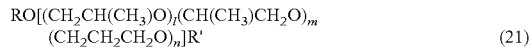

$$RO[(CH_2CH(CH_3)O)_l(CH(CH_3)CH_2O)_m(CH_2CH_2CH_2O)_n]R' \quad (21)$$

In Formula (21), R and R' are each independently an alkyl group having a carbon number of 1 or higher; l, m, and n are integers 0 or higher; and l+m+n is 1 or higher.

Specific examples of R and R' in Formula (21) include such groups as the following: methyl($CH_3$), ethyl($CH_3CH_2$), propyl($CH_3CH_2CH_2$), isopropyl($CH_3CH(CH_3)$), butyl ($CH_3CH_2CH_2CH_2$), isobutyl($CH_3CH(CH_3)CH_2$), sec-butyl ($CH_3CH_2CH(CH_3)$), t-butyl($(CH_3)_3C$), pentyl ($CH_3CH_2CH_2CH_2CH_2$), hexyl($CH_3CH_2CH_2CH_2CH_2$), heptyl ($CH_3CH_2CH_2CH_2CH_2CH_2$), and octyl ($CH_3CH_2CH_2CH_2CH_2CH_2CH_2$), but $C_{1-4}$ alkyl groups are preferred.

As described above, l+m+n may be an integer of 1 or higher, but an integer of 2 to 5 is preferred, and an integer of 2 to 3 is more preferred. Such effects as those described above can thereby be more significantly demonstrated, the color filter ink can be provided with particularly excellent discharge stability and long-term storage properties (storage stability), and the manufactured color filter can be provided with particularly excellent durability. Unevenness of color, saturation, and the like in different regions of the color filter can also be more effectively suppressed, and particularly excellent uniformity of characteristics between individual units can be obtained.

Specific examples of compounds that can be used as the liquid medium that have a chemical structure such as described above include $CH_3OCH_2CH(CH_3)OCH_3$, $CH_3O(CH_2CH(CH_3)O)_2CH_3$, $CH_3O(CH_2CH(CH_3)O)_3CH_3$, $CH_3O(CH_2CH(CH_3)O)_4CH_3$, $CH_3O(CH_2CH(CH_3)O)_5CH_3$, $CH_3OCH_2CH_2CH_2OCH_3$, $CH_3O(CH_2CH_2CH_2O)_2CH_3$, $CH_3O(CH_2CH_2CH_2O)_3CH_3$, $CH_3O(CH_2CH_2CH_2O)_4CH_3$, $CH_3O(CH_2CH_2CH_2O)_5CH_3$, $CH_3O[(CH_2CH(CH_3)O)(CH(CH_3)CH_2O)]CH_3$, $CH_3O[(CH_2CH(CH_3)O)(CH_2CH_2CH_2O)]CH_3$, $CH_3O[(CH_2CH(CH_3)O)(CH(CH_3)CH_2O)(CH_2CH_2CH_2O)]CH_3$, $CH_3CH_2OCH_2CH(CH_3)OCH_3$, $CH_3CH_2O(CH_2CH(CH_3)O)_2CH_3$, $CH_3CH_2O(CH_2CH(CH_3)O)_3CH_3$, $CH_3CH_2O(CH_2CH(CH_3)O)_4CH_3$, $CH_3CH_2O(CH_2CH(CH_3)O)_5CH_3$, $CH_3CH_2OCH(CH_3)CH_2OCH_3$, $CH_3CH_2OCH((CH_3)CH_2O)_2CH_3$, $CH_3CH_2O(CH(CH_3)CH_2O)_3CH_3$, $CH_3CH_2O(CH(CH_3)CH_2O)_4CH_3$, $CH_3CH_2OCH((CH_3)CH_2O)_5CH_3$, $CH_3CH_2OCH_2CH_2CH_2OCH_3$, $CH_3CH_2O(CH_2CH_2CH_2O)_2CH_3$, $CH_3CH_2O(CH_2CH_2CH_2O)_3CH_3$, $CH_3CH_2O(CH_2CH_2CH_2O)_4CH_3$, $CH_3CH_2O(CH_2CH_2CH_2O)_5CH_3$, $CH_3CH_2O[(CH_2CH(CH_3)O)(CH(CH_3)CH_2O)]CH_3$, $CH_3CH_2O[(CH_2CH(CH_3)O)(CH_2CH_2CH_2O)]CH_3$, $CH_3CH_2O[(CH_2CH(CH_3)O)(CH(CH_3)CH_2O)(CH_2CH_2CH_2O)]CH_3$, $CH_3CH_2OCH_2CH(CH_3)OCH_2CH_3$, $CH_3CH_2O(CH_2CH(CH_3)O)_2CH_2CH_3$, $CH_3CH_2O(CH_2CH(CH_3)O)_3CH_2CH_3$, $CH_3CH_2O(CH_2CH(CH_3)O)_4CH_2CH_3$, $CH_3CH_2O(CH_2CH(CH_3)O)_5CH_2CH_3$, $CH_3CH_2OCH_2CH_2CH_2OCH_2CH_3$, $CH_3CH_2O(CH_2CH_2CH_2O)_2CH_2CH_3$, $CH_3CH_2O(CH_2CH_2CH_2O)_3CH_2CH_3$, $CH_3CH_2O(CH_2CH_2CH_2O)_4CH_2CH_3$, $CH_3CH_2O(CH_2CH_2CH_2O)_5CH_2CH_3$, $CH_3CH_2O[(CH_2CH(CH_3)O)(CH(CH_3)CH_2O)]CH_2CH_3$, $CH_3CH_2O[(CH_2CH(CH_3)O)(CH_2CH_2CH_2O)]CH_2CH_3$, $CH_3CH_2O[(CH_2CH(CH_3)O)(CH(CH_3)CH_2O)(CH_2CH_2CH_2O)]CH_2CH_3$, $CH_3OCH_2CH(CH_3)OCH_2CH_2CH_2CH_3$, $CH_3O(CH(CH_3)CH_2O)_2CH_2CH_2CH_2CH_3$, $CH_3O(CH(CH_3)CH_2O)_3CH_2CH_2CH_2CH_3$, $CH_3O(CH(CH_3)CH_2O)_4CH_2CH_2CH_2CH_3$, $CH_3O(CH(CH_3)CH_2O)_5CH_2CH_2CH_2CH_3$, $CH_3OCH_2CH_2OCH_2CH_2CH_2CH_3$, $CH_3O(CH_2CH_2CH_2O)_2CH_2CH_2CH_2CH_3$, $CH_3O(CH_2CH_2CH_2O)_3CH_2CH_2CH_2CH_3$, $CH_3O(CH_2CH_2CH_2O)_4CH_2CH_2CH_2CH_3$, $CH_3O(CH_2CH_2CH_2O)_5CH_2CH_2CH_2CH_3$, $CH_3O[(CH_2CH(CH_3)O)(CH(CH_3)CH_2O)]CH_2CH_2CH_2CH_3$, $CH_3O[(CH_2CH(CH_3)O)(CH_2CH_2CH_2O)]CH_2CH_2CH_2CH_3$, $CH_3O[(CH_2CH(CH_3)O)(CH(CH_3)CH_2O)(CH_2CH_2CH_2O)]CH_2CH_2CH_2CH_3$, and the like, and one or more types of compounds selected from the above examples may be combined and used.

Compounds such as those described above include compounds having a propylene glycol backbone and alkoxy groups at both terminal ends thereof, but the propylene glycol backbone preferably has a structure in which a plurality of 1,2-propylene glycols is condensed (i.e., a compound in which l in Formula (21) is 2 or greater). Such effects as those described above can thereby be more significantly demonstrated, the color filter ink can be provided with particularly excellent discharge stability and long-term storage properties (storage stability), and the manufactured color filter can be provided with particularly excellent durability. Unevenness of color, saturation, and the like in different regions of the color filter can also be more effectively suppressed, and particularly excellent uniformity of characteristics between individual units can be obtained. Examples of compounds (liquid media) having a structure in which a plurality of 1,2-propylene glycols is condensed in this manner include $CH_3O(CH_2CH(CH_3)O)_2CH_3$, $CH_3O(CH_2CH(CH_3)O)_3CH_3$, $CH_3O(CH_2CH(CH_3)O)_4CH_3$, $CH_3O(CH_2CH(CH_3)O)_5CH_3$, $CH_3O[(CH_2CH(CH_3)O)(CH(CH_3)CH_2O)]CH_3$, $CH_3O[(CH_2CH(CH_3)O)(CH(CH_3)CH_2O)(CH_2CH_2CH_2O)]CH_3$, $CH_3CH_2O(CH_2CH(CH_3)O)_2CH_3$, $CH_3CH_2O(CH_2CH(CH_3)O)_3CH_3$, $CH_3CH_2O(CH_2CH(CH_3)O)_4CH_3$, $CH_3CH_2O(CH_2CH(CH_3)O)_5CH_3$, $CH_3CH_2O(CH(CH_3)CH_2O)_2CH_3$, $CH_3CH_2OCH((CH_3)CH_2O)_3CH_3$, $CH_3CH_2O(CH(CH_3)CH_2O)_4CH_3$, $CH_3CH_2O(CH(CH_3)CH_2O)_5CH_3$, $CH_3CH_2O[(CH_2CH(CH_3)O)(CH(CH_3)CH_2O)]CH_3$, $CH_3CH_2O[(CH_2CH(CH_3)O)(CH(CH_3)CH_2O)(CH_2CH_2CH_2O)]CH_3$, $CH_3CH_2O(CH_2CH(CH_3)O)_2CH_2CH_3$, $CH_3CH_2O(CH_2CH(CH_3)O)_3CH_2CH_3$, $CH_3CH_2O(CH_2CH(CH_3)O)_4CH_2CH_3$, $CH_3CH_2O(CH_2CH(CH_3)O)_5CH_2CH_3$, $CH_3CH_2O[(CH_2CH(CH_3)O)(CH(CH_3)CH_2O)]CH_2CH_3$, $CH_3CH_2O[(CH_2CH(CH_3)O)(CH(CH_3)CH_2O)(CH_2CH_2CH_2O)]CH_2CH_3$, $CH_3O(CH_2CH(CH_3)O)_2CH_2CH_2CH_2CH_3$, $CH_3O(CH_2CH(CH_3)O)_3CH_2CH_2CH_2CH_3$, $CH_3O(CH_2CH(CH_3)O)_4CH_2CH_2CH_2CH_3$, $CH_3O(CH_2CH(CH_3)O)_5CH_2CH_2CH_2CH_3$, $CH_3O(CH(CH_3)CH_2O)_2CH_2CH_2CH_2CH_3$, $CH_3O(CH(CH_3)CH_2O)_3CH_2CH_2CH_2CH_3$, $CH_3O(CH(CH_3)CH_2O)_4CH_2CH_2CH_2CH_3$, $CH_3O(CH(CH_3)CH_2O)_5CH_2CH_2CH_2CH_3$, $CH_3O[(CH_2CH(CH_3)O)(CH(CH_3)$ $CH_2O)]CH_2CH_2CH_2CH_3$, $CH_3O[(CH_2CH(CH_3)O)(CH(CH_3)CH_2O)(CH_2CH_2CH_2O)]CH_2CH_2CH_2CH_3$, and the like.

The propylene glycol backbone constituting the aforementioned compound preferably has a structure in which two to three propylene glycols are condensed (i.e., "1+m+n" in Formula (21) is 2 to 3). Such effects as those described above can thereby be more significantly demonstrated, the color filter ink can be provided with particularly excellent discharge stability and long-term storage properties (storage stability), and the manufactured color filter can be provided with particularly excellent durability. Unevenness of color, saturation, and the like in different regions of the color filter can also be more effectively suppressed, and particularly excellent uniformity of characteristics between individual units can be obtained. Examples of compounds (liquid media) having a structure in which two to three propylene glycols are condensed in this manner include $CH_3O(CH_2CH(CH_3)O)_2CH_3$, $CH_3O(CH_2CH(CH_3)O)_3CH_3$, $CH_3O(CH_2CH_2CH_2O)_2CH_3$, $CH_3O(CH_2CH_2CH_2O)_3CH_3$, $CH_3O[(CH_2CH(CH_3)O)(CH(CH_3)CH_2O)]CH_3$, $CH_3O[(CH_2CH(CH_3)O)(CH_2CH_2CH_2O)]CH_3$, $CH_3O[(CH_2CH(CH_3)O)(CH(CH_3)CH_2O)(CH_2CH_2CH_2O)]CH_3$, $CH_3CH_2O(CH_2CH(CH_3)O)_2CH_3$, $CH_3CH_2O(CH_2CH(CH_3)O)_3CH_3$, $CH_3CH_2O(CH_2CH_2CH_2O)_2CH_3$, $CH_3CH_2O(CH_2CH_2CH_2O)_3CH_3$, $CH_3CH_2O[(CH_2CH(CH_3)O)(CH(CH_3)CH_2O)]CH_3$, $CH_3CH_2O[(CH_2CH(CH_3)O)(CH_2CH_2CH_2O)]CH_3$, $CH_3CH_2O[(CH_2CH(CH_3)O)(CH(CH_3)CH_2O)(CH_2CH_2CH_2O)]CH_3$, $CH_3CH_2O(CH_2CH(CH_3)O)_2CH_2CH_3$, $CH_3CH_2O(CH_2CH(CH_3)O)_3CH_2CH_3$, $CH_3CH_2O(CH_2CH_2CH_2O)_2CH_2CH_3$, $CH_3CH_2O(CH_2CH_2CH_2O)_3CH_2CH_3$, $CH_3CH_2O[(CH_2CH(CH_3)O)(CH(CH_3)CH_2O)]CH_2CH_3$, $CH_3CH_2O[(CH_2CH(CH_3)O)(CH_2CH_2CH_2O)]CH_2CH_3$, $CH_3CH_2O[(CH_2CH(CH_3)O)(CH(CH_3)CH_2O)(CH_2CH_2CH_2O)]CH_2CH_3$, $CH_3O(CH_2CH(CH_3)O)_2CH_2CH_2CH_2CH_3$, $CH_3O(CH_2CH(CH_3)O)_3CH_2CH_2CH_2CH_3$, $CH_3OCH((CH_3)CH_2O)_2CH_2CH_2CH_2CH_3$, $CH_3O(CH(CH_3)CH_2O)_3CH_2CH_2CH_2CH_3$, $CH_3O(CH_2CH_2CH_2O)_2CH_2CH_2CH_2CH_3$, $CH_3O(CH_2CH_2CH_2O)_3CH_2CH_2CH_2CH_3$, $CH_3O[(CH_2CH(CH_3)O)(CH(CH_3)CH_2O)]CH_2CH_2CH_2CH_3$, $CH_3O[(CH_2CH(CH_3)O)(CH_2CH_2CH_2O)]CH_2CH_2CH_2CH_3$, $CH_3O[(CH_2CH(CH_3)O)(CH(CH_3)CH_2O)(CH_2CH_2CH_2O)]CH_2CH_2CH_2CH_3$, and the like.

The boiling point of the liquid medium at atmospheric pressure (1 atm) is preferably 160 to 300° C., more preferably 180 to 290° C., and even more preferably 200 to 280° C. When the boiling point of the liquid medium at atmospheric pressure is within this range, blockage and other adverse events in the droplet discharge head for discharging the color filter ink can be more effectively prevented, and the color filter can be manufactured with particularly excellent productivity.

The vapor pressure of the liquid medium at 25° C. is preferably 0.7 mmHg or lower, and more preferably 0.1 mmHg or lower. When the vapor pressure of the liquid medium is within this range, blockage and the like in the droplet discharge head for discharging the color filter ink can be more effectively prevented, and the color filter can be manufactured with particularly excellent productivity.

The content ratio of the liquid medium in the color filter ink is preferably 50 to 98 wt %, more preferably 60 to 95 wt %, and even more preferably 65 to 93 wt %. When the content ratio of the liquid medium is within this range, the manufactured color filter can be provided with excellent durability while the discharge properties of the color filter ink from the droplet discharge head are made particularly excellent. Adequate color saturation can also be maintained in the manufactured color filter.

The color filter ink may include components other than those described above. Dispersing agents and the like are included as examples of components other than those described above that constitute the color filter ink.

Dispersing Agent

The color filter ink may include a dispersing agent. The ink can thereby be provided with particularly excellent droplet discharge stability. The dispersing agent also contributes to enhancing the dispersion properties of the pigment particles in the color filter ink when the color filter ink includes a pigment.

Examples of dispersing agents include cationic, anionic, nonionic, amphoteric, silicone-based, fluorine-based, and other surfactants.

More specific examples of dispersing agents include Disperbyk 101, Disperbyk 102, Disperbyk 103, Disperbyk P104, Disperbyk P104S, Disperbyk 220S, Disperbyk 106, Disperbyk 108, Disperbyk 109, Disperbyk 110, Disperbyk 111, Disperbyk 112, Disperbyk 116, Disperbyk 140, Disperbyk 142, Disperbyk 160, Disperbyk 161, Disperbyk 162, Disperbyk 163, Disperbyk 164, Disperbyk 166, Disperbyk 167, Disperbyk 168, Disperbyk 170, Disperbyk 171, Disperbyk 174, Disperbyk 180, Disperbyk 182, Disperbyk 183, Disperbyk 184, Disperbyk 185, Disperbyk 2000, Disperbyk 2001, Disperbyk 2050, Disperbyk 2070, Disperbyk 2095, Disperbyk 2150, Disperbyk LPN6919, Disperbyk 9075, and Disperbyk 9077 (all manufactured by Byk Chemie Japan); EFKA 4008, EFKA 4009, EFKA 4010, EFKA 4015, EFKA 4020, EFKA 4046, EFKA 4047, EFKA 4050, EFKA 4055, EFKA 4060, EFKA 4080, EFKA 4400, EFKA 4401, EFKA 4402, EFKA 4403, EFKA 4406, EFKA 4408, EFKA 4300, EFKA 4330, EFKA 4340, EFKA 4015, EFKA 4800, EFKA 5010, EFKA 5065, EFKA 5066, EFKA 5070, EFKA 7500, and EFKA 7554 (all manufactured by Ciba Specialty Chemicals); Solsperse 3000, Solsperse 9000, Solsperse 13000, Solsperse 16000, Solsperse 17000, Solsperse 18000, Solsperse 20000, Solsperse 21000, Solsperse 24000, Solsperse 26000, Solsperse 27000, Solsperse 28000, Solsperse 32000, Solsperse 32500, Solsperse 32550, Solsperse 33500 Solsperse 35100, Solsperse 35200, Solsperse 36000, Solsperse 36600, Solsperse 38500, Solsperse 41000, Solsperse 41090, and Solsperse 20000 (all manufactured by Nippon Lubrizol); Ajisper PA111, Ajisper PB711, Ajisper PB821, Ajisper PB822, and Ajisper PB824 (all manufactured by Ajinomoto Fine-Techno); Disparlon 1850, Disparlon 1860, Disparlon 2150, Disparlon 7004, Disparlon DA-100, Disparlon DA-234, Disparlon DA-325, Disparlon DA-375, Disparlon DA-705, Disparlon DA-725, and Disparlon PW-36 (all manufactured by Kusumoto Chemicals); Floren DOPA-14, Floren DOPA-15B, Floren DOPA-17, Floren DOPA-22, Floren DOPA-44, Floren TG-710, and Floren D-90 (all manufactured by Kyoei Kagaku); Anti-Terra-205 (manufactured by Byk Chemie Japan); Hinoact KF-1000, KF-1525, Hinoact 1300M, Hinoact T9050, Hinoact T6000, Hinoact T7000, Hinoact T8000, and Hinoact T8000E (all manufactured by Kawaken Fine Chemicals); and the like, and one or more types of compounds selected from the above examples may be combined and used.

It is particularly preferred that the color filter ink include as dispersing agents a dispersing agent having a predetermined acid value (also referred to hereinafter as an acid-value dispersing agent) and a dispersing agent having a predetermined amine value (also referred to hereinafter as an amine-value dispersing agent). The viscosity-reducing effects demonstrated by the acid-value dispersing agent for reducing the viscosity of the color filter ink, and the effects of the amine-value dispersing agent for stabilizing the viscosity of the color filter ink are thereby obtained at the same time. As a result, the pigment can be dispersed in the color filter ink with particularly excellent stability, and the color filter ink can be provided with particularly excellent droplet discharge stability.

Specific examples of acid-value dispersing agents include Disperbyk P104, Disperbyk P104S, Disperbyk 220S, Disperbyk 110, Disperbyk 111, Disperbyk 170, Disperbyk 171, Disperbyk 174, and Disperbyk 2095 (all manufactured by Byk Chemie Japan); EFKA 5010, EFKA 5065, EFKA 5066, EFKA 5070, EFKA 7500, and EFKA 7554 (all manufactured by Ciba Specialty Chemicals); Solsperse 3000, Solsperse 16000, Solsperse 17000, Solsperse 18000, Solsperse 36000, Solsperse 36600, and Solsperse 41000 (all manufactured by Nippon Lubrizol); Hinoact KF-1000 (manufactured by Kawaken Chine Chemicals); and the like.

Specific examples of amine-value dispersing agents include Disperbyk 102, Disperbyk 160, Disperbyk 161, Disperbyk 162, Disperbyk 163, Disperbyk 164, Disperbyk 166, Disperbyk 167, Disperbyk 168, Disperbyk 2150, Disperbyk LPN6919, Disperbyk 9075, and Disperbyk 9077 (all manufactured by Byk Chemie Japan); EFKA 4015, EFKA 4020, EFKA 4046, EFKA 4047, EFKA 4050, EFKA 4055, EFKA 4060, EFKA 4080, EFKA 4300, EFKA 4330, EFKA 4340, EFKA 4400, EFKA 4401, EFKA 4402, EFKA 4403, and EFKA 4800 (all manufactured by Ciba Specialty Chemicals); Ajisper PB711 (manufactured by Ajinomoto Fine Techno); Anti-Terra-205 (manufactured by Byk Chemie Japan); KF-1525, Hinoact 1300M, Hinoact T9050, Hinoact T6000, Hinoact T7000, Hinoact T8000, and Hinoact T8000E (all manufactured by Kawaken Fine Chemicals); and the like.

Using dispersing agents (acid-value dispersing agents and amine-value dispersing agents) such as those described above enables excellent pigment dispersion stability in the ink to be obtained without adversely affecting the coloration of the formed colored portion.

When an acid-value dispersing agent and an amine-value dispersing agent are used jointly, the acid value (acid value on a solid basis) of the acid-value dispersing agent is not particularly limited, but is preferably 5 to 370 KOH mg/g, more preferably 20 to 270 KOH mg/g, and more preferably 30 to 135 KOH mg/g. When the acid value of the acid-value dispersing agent is within the aforementioned range, particularly excellent dispersion stability of the pigment can be obtained in the case of joint use with an amine-value dispersing agent, and it is possible to more significantly demonstrate the effects of reducing and stabilizing the viscosity of the color filter ink that are obtained in the case of joint use with an acid-value dispersing agent. When a pigment is included in the color filter ink, the pigment can be dispersed with particularly excellent stability. The acid value of the dispersing agent can be calculated by a method based on DIN EN ISO 2114, for example.

The acid-value dispersing agent preferably does not have a predetermined amine value; i.e., the acid-value dispersing agent preferably has an amine value of zero.

When an amine-value dispersing agent and an acid-value dispersing agent are jointly used, the amine value (amine value on a solid basis) of the amine-value dispersing agent is not particularly limited, but is preferably 5 to 200 KOH mg/g, more preferably 25 to 170 KOH mg/g, and more preferably 30 to 130 KOH mg/g. When the amine value of the amine-value dispersing agent is within the aforementioned range, particularly excellent dispersion stability of the pigment can be obtained in the case of joint use with an acid-value dispersing agent, and it is possible to more significantly demonstrate the effects of reducing and stabilizing the viscosity of the color filter ink that are obtained in the case of joint use with an acid-value dispersing agent. The amine value of the dispersing agent can be calculated by a method based on DIN 16945, for example.

The amine-value dispersing agent preferably does not have a predetermined acid value; i.e., the amine-value dispersing agent preferably has an acid value of zero.

When an acid-value dispersing agent and an amine-value dispersing agent are jointly used, the relation $0.1 \leq X_A/X_B \leq 1$ is preferably satisfied, and the relation $0.15 \leq X_A/X_B \leq 0.5$ is more preferably satisfied, wherein $X_A$ (wt %) is the content ratio of the acid-value dispersing agent in the color filter ink, and $X_B$ (wt %) is the content ratio of the amine-value dispersing agent in the color filter ink. Satisfying such a relation makes it possible to more significantly demonstrate the synergistic effects of jointly using the acid-value dispersing agent and the amine-value dispersing agent, and to obtain particularly excellent discharge stability of droplets, and other effects.

The relation $0.01 \leq (A_V \times X_A)/(B_V \times X_B) \leq 1.9$ is preferably satisfied, and the relation $0.10 \leq (A_V \times X_A)/(B_V \times X_B) \leq 1.5$ is more preferably satisfied, wherein AV (KOH mg/g) is the acid value of the acid-value dispersing agent, BV (KOH mg/g) is the amine value of the amine-value dispersing agent, $X_A$ (wt %) is the content ratio of the acid-value dispersing agent, and $X_B$ (wt %) is the content ratio of the amine-value dispersing agent. Satisfying such a relation makes it possible to more significantly demonstrate the synergistic effects of jointly using the acid-value dispersing agent and the amine-value dispersing agent, and to obtain particularly excellent discharge stability of droplets, and other effects.

A dispersing agent other than the ones described above may be used as the dispersing agent. For example, a compound provided with a cyamelide backbone, for example, may be used as the dispersing agent. The use of such a compound as the dispersing agent makes it possible to obtain particularly excellent dispersion properties of the pigment in the dispersion medium (liquid medium) in which the resin material such as described above is dissolved, and to provide the color filter ink with particularly excellent discharge stability. Such excellent effects are obtained by the synergistic effects of using a resin material such as described above jointly with a compound provided with a cyamelide backbone, and not merely by using a compound provided with a cyamelide backbone as the dispersing agent.

A compound having the partial structure indicated by Formula (22) and Formula (23) below, for example, may be used as the dispersing agent. Using such a compound as the dispersing agent makes it possible to obtain particularly excellent dispersion properties of the colorant (pigment) in the color filter ink, and to provide the color filter ink with particularly excellent discharge stability.

Chemical Formula (22)

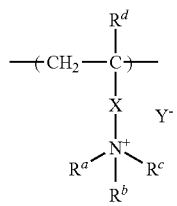

(22)

In Formula (22), $R^a$, $R^b$, and $R^c$ are each independently a hydrogen atom, or a cyclic or chain hydrocarbon group which may be substituted; or two or more of $R^a$, $R^b$, and $R^c$ bond with each other and form a cyclic structure; $R^d$ is a hydrogen atom or a methyl group; X is a bivalent linking group; and $Y^-$ is a counter anion.

Chemical Formula (23)

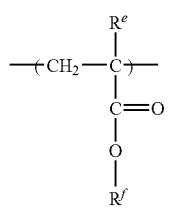

(23)

In Formula (23), $R^e$ is a hydrogen atom or a methyl group; $R^f$ is a cyclic or chain alkyl group which may have a substituted group, an aryl group which may have a substituted group, or an aralkyl group which may have a substituted group.

The content ratio of the dispersing agent in the color filter ink is preferably 0.5 to 15 wt %, and more preferably 0.5 to 8 wt %.

Other Components

The color filter ink of the present invention may include components other than those described above. Examples of such components include various cross-linking agents; thermoacid generators such as diazonium salt, iodonium salt, sulfonium salt, phosphonium salt, selenium salt, oxonium salt, ammonium salt, benzothiazolium salt, and other onium salts; diazonium salt, iodonium salt, sulfonium salt, phosphonium salt, selenium salt, oxonium salt, ammonium salt, and other photoacid generators; various polymerization initiators; acid crosslinking agents; surfactants; intensifiers; photostabilizers; various dyes; luminescent materials; leveling agents; adhesive improvers; various polymerization accelerants; various photostabilizers; glass, alumina, and other fillers; vinyl trimethoxysilane, vinyl triethoxysilane, vinyl tris(2-methoxy ethoxy)silane, N-(2-aminoethyl)-3-aminopropyl methyl dimethoxysilane, N-(2-aminoethyl)-3-aminopropyl trimethoxysilane, 3-aminopropyl triethoxysilane, 3-glycidoxy propyl trimethoxysilane, 3-glycidoxy propyl methyl dimethoxysilane, 2-(3,4-epoxy cyclohexyl)ethyl trimethoxysilane, 3-chloro propyl methyl dimethoxysilane, 3-chloro propyl trimethoxysilane, 3-methacryloxy propyl trimethoxysilane, 3-mercapto propyl trimethoxysilane, and other adhesion accelerants; 2,2-thiobis(4-methyl-6-t-butyl phenol), 2,6-di-t-butyl phenol, and other antioxidants; 2-(3-t-butyl-5-methyl-2-hydroxy phenyl)-5-chloro benzotriazole, alkoxy benzophenone, and other UV absorbers; sodium polyacrylate, and other anti-coagulants; and the like.

Examples of cross-linking agents that may be used include polycarboxylic acid anhydrides, polycarboxylic acids, polyfunctional epoxy monomers, polyfunctional acrylic monomers, polyfunctional vinyl ether monomers, and polyfunctional oxetane monomers. Specific examples of polycarboxylic acid anhydrides include phthalic anhydride, itaconic anhydride, succinic anhydride, citraconic anhydride, dodecenyl succinic anhydride, tricarballylic anhydride, maleic anhydride, hexahydrophthalic anhydride, dimethyl tetrahydrophthalic anhydride, himic anhydride, nadic anhydride, and other aliphatic or alicyclic dicarboxylic anhydrides; 1,2,3,4-butane tetracarboxylic acid dianhydride and cyclopentane tetracarboxylic acid dianhydride; benzophenone tetracarboxylic anhydride and other aromatic polycarboxylic acid anhydrides; ethylene glycol bis trimellitate, glycerin tris trimellitate, and other ester-containing organic anhydrides, among which an aromatic polycarboxylic acid anhydride is preferred. An epoxy resin curing agent composed of a commercially available carboxylic acid anhydride can also be suitably used. Specific examples of polycarboxylic acids include succinic acid, glutaric acid, adipic acid, butane tetracarboxylic acid, maleic acid, itaconic acid, and other aliphatic polycarboxylic acids; hexahydrophthalic acid, 1,2-cyclohexane dicarboxylic acid, 1,2,4-cyclohexane tricarboxylic acid, cyclopentane tetracarboxylic acid, and other aliphatic polycarboxylic acids; and phthalic acid, isophthalic acid, terephthalic acid, pyromellitic acid, trimellitic acid, 1,4,5,8-naphthalene tetracarboxylic acid, benzophenone tetracarboxylic acid, and other aromatic polycarboxylic acid, but among these, aromatic polycarboxylic acid is preferred. Specific examples of a polyfunctional epoxy monomer include the product name Celloxide 2021 manufactured by Daicel Chemical Industries, the product name Epolead GT401 manufactured by Daicel Chemical Industries, the product name Epolead PB3600 manufactured by Daicel Chemical Industries, bisphenol A, hydrogenated bisphenol A, and triglycidyl isocyanurate. Specific example of a polyfunctional acrylic monomer include pentaerythritolethoxy tetraacrylate, pentaerythritol tetraacrylate, pentaerythritol triacrylate, pentaerythritolethoxy tetraacrylate, ditrimethylolpropane tetraacrylate, trimethylolpropane triacrylate, trimethylolpropane ethoxy triacrylate, dipentaerythritol hexaacrylate trimethallyl isocyanurate, and triallyl isocyanurate. Examples of a polyfunctional vinyl ether monomer include 1,4-butanediol vinyl ether, 1,6-hexanediol divinyl ether, nonanediol divinyl ether, cyclohexanediol divinyl ether, cyclohexanedimethanol divinyl ether, triethylene glycol divinyl ether, trimethylolpropane trivinyl ether, and pentaerythritol tetravinyl ether. Examples of polyfunctional oxetane monomers include xylylene dioxetane, biphenyl-type oxetane, and novolac-type oxetane.

The surfactant flattens the colored portion by reducing the surface tension of the ink. Examples of such surfactants that can be used include acrylic-based surfactants, vinyl ether-based surfactants, silicone-based surfactants, fluorine-based surfactants, and the like, among which, an acrylic-based surfactant is preferably used. An acrylic surfactant can contribute to flattening the colored portion, has excellent affinity to the polymers X, Y such as described above, and can provide the formed colored portion with a high degree of brightness.

The thermoacid generator is a component for generating acid by applying heat, and particularly preferred among those described above are sulfonium salt and benzothiazolium.

More specific examples of thermoacid generators in terms of product names include Sunaid SI-45, Sunaid SI-47, Sunaid SI-60, Sunaid SI-60L, Sunaid SI-80, Sunaid SI-80L, Sunaid SI-100, Sunaid SI-100L, Sunaid SI-145, Sunaid SI-150, Sunaid SI-160, Sunaid SI-110L, Sunaid SI-180L (all product names, manufactured by Sanshin Chemical Industry Co., Ltd.), CI-2921, CI-2920, CI-2946, CI-3128, CI-2624, CI-2639, CI-2064 (all product names, manufactured by Nippon Soda Co., Ltd.), CP-66, CP-77 (product names, manufactured by Adeka Corporation), and FC-520 (product name, manufactured by 3M Company).

The photoacid generator is a component for generating acid by using light, and more specific examples include the product names Cyracure UVI-6970, Cyracure UVI-6974, Cyracure UVI-6990, Cyracure UVI-950 (all product names, manufactured by US Union Carbide), Irgacure 261 (product name, Ciba Specialty Chemicals), SP-150, SP-151, SP-170, Optomer SP-171 (all product names, manufactured by Adeka Corporation), CG-24-61 (product name, manufactured by Ciba Specialty Chemicals), Daicat II (product name, manufactured by Daicel Chemical Industries, Ltd.), UVAC 1591 (product name, manufactured by Daicel UCB Co., Ltd.), CI-2064, CI-2639, CI-2624, CI-2481, CI-2734, CI-2855, CI-2823, CI-2758 (product name, manufactured by Nippon Soda Co., Ltd.), PI-2074 (product name, manufactured by Rhone Poulenc, pentafluorophenyl borate tolyl cumyl iodonium), FFC509 (product name, manufactured by 3M Company), BBI-102, BBI-101, BBI-103, MPI-103, TPS-103, MDS-103, DTS-103, NAT-103, NDS-103 (product name, manufactured by Midori Kagaku Co., Ltd.), and CD-1012 (product name, manufactured by Sartomer Co., Inc.).

The viscosity (viscosity measured using an oscillation viscometer) of the color filter ink at 25° C. is not particularly limited, but is preferably 4 to 10 mPa·s, and more preferably 5 to 9.5 mPa·s. When the viscosity of the ink is within this range, blockage of the droplet discharge head and other problems can be more reliably prevented while the amount of fluctuation in the droplet quantity of the discharged color filter ink is made particularly small in droplet discharge by an inkjet method such as described hereinafter. The viscosity of the color filter ink can be measured using an oscillation viscometer, for example, particularly in accordance with JIS Z8809.

Color Filter Ink Manufacturing Method

Preferred embodiments of the method for manufacturing a color filter ink such as described above, and particularly of a method for manufacturing a color filter ink that includes a pigment as the colorant, will next be described.

The manufacturing method of the present embodiment has a preparatory dispersion step of obtaining a dispersing-agent-dispersed liquid in which a dispersing agent is dispersed in a solvent, by stirring a mixture of a dispersing agent and a solvent; a fine-dispersion step of adding a pigment to the dispersing-agent-dispersed liquid, adding inorganic beads in multi-stage fashion and performing a fine-dispersion process, and obtaining a pigment dispersion; and a polymer X, Y mixing step of mixing the pigment dispersion, and the polymer X and polymer Y that constitute the resin material.

Preparatory Dispersion Step

In the preparatory dispersion step, a dispersing-agent-dispersed liquid in which a dispersing agent is dispersed in a solvent is prepared by stirring a mixture that includes a dispersing agent and a solvent. The associated state of the dispersing agent can thereby be released (undone). The acid-value dispersing agent and amine-value dispersing agent described above have the characteristic of being readily attracted to each other electrically, but by performing the preparatory dispersion step prior to fine-dispersing the pigments (fine-dispersion step) according to the present embodiment, the acid-value dispersing agent and amine-value dispersing agent can be uniformly and stably adhered to the surfaces of the pigment particles in a state in which association is adequately released; aggregation of the dispersing agents with each other, aggregation of pigment particles with each other, and other effects can be reliably prevented; and particularly excellent pigment dispersion stability and droplet discharge stability can be obtained even when an acid-value dispersing agent and an amine-value dispersing agent are used as dispersing agents.

When the color filter ink is prepared so as to include the polymer Z and/or the polymer W by the method of the present embodiment, these polymers (polymer Z, polymer W) are preferably used in the present step. The dispersing agent and the polymer Z and polymer W are thereby adhered to the surfaces of the pigment particles (pigment particles having a relatively large grain size that are not fine-dispersed) added to the dispersing-agent-dispersed liquid in the fine-dispersion step described hereinafter, and excellent dispersion properties of the pigment particles (pigment particles having a relatively large grain size that are not fine-dispersed) in the dispersing-agent-dispersed liquid can be obtained. The fine-dispersion process in the fine-dispersion step can thereby be efficiently performed, the production properties of the color filter ink can be made particularly excellent, and particularly excellent long-term dispersion stability of the pigment particles (fine-dispersed pigment microparticles) and discharge stability of droplets can be obtained in the color filter ink ultimately obtained.

The content ratio (sum of the content ratios of the plurality of types of dispersing agents when a plurality of types of dispersing agents is included) of the dispersing agent in the dispersing-agent-dispersed liquid prepared in the present step is not particularly limited, but is preferably 10 to 40 wt %, and more preferably 12 to 32 wt %. When the content ratio of the dispersing agent is within this range, such effects as previously described are demonstrated more significantly.

The content ratio of the solvent in the dispersing-agent-dispersed liquid prepared in the present step is not particularly limited, but is preferably 40 to 80 wt %, and more preferably 53 to 75 wt %. When the content ratio of the solvent is within this range, such effects as previously described are demonstrated more significantly. A solvent having the same composition as the liquid medium constituting the desired color filter ink may be used as the solvent, or a solvent having a different composition may be used. In the present step, when a solvent having a different composition than the liquid medium constituting the desired color filter ink is used as the solvent, a liquid medium having the desired composition can be obtained in the color filter ink ultimately obtained by diluting with a predetermined liquid (solvent), and performing liquid (solvent) replacement involving vacuum processing, heat treatment, or the like in a subsequent step, for example.

In the present step, a dispersing-agent-dispersed liquid is obtained by stirring a mixture of the abovementioned components using various types of agitators.

Examples of agitators that can be used in the present step include a Dispermill or other single-shaft or twin-shaft mixer or the like.

The stirring time for which the agitator is used is not particularly limited, but is preferably 1 to 30 minutes, and more preferably 3 to 20 minutes. The associated state of the dispersing agent can thereby be more effectively released while adequately excellent production properties of the color filter ink are obtained, and particularly excellent dispersion stability of pigment particles in the color filter ink ultimately obtained, particularly excellent discharge stability of the color filter ink can be obtained.

The speed of the stirring vanes of the agitator in the present step is not particularly limited, but is preferably 500 to 4000 rpm, and more preferably 800 to 3000 rpm. The associated state of the dispersing agent can thereby be more effectively released while adequately excellent production properties of the color filter ink are obtained, and it is possible to obtain particularly excellent dispersion stability of pigment particles in the color filter ink ultimately obtained. Degradation, denaturation, and the like of the thermoplastic resin and other components due to heat and the like can also be reliably prevented.

Fine-Dispersion Step

A pigment such as described above is then added to the dispersing-agent-dispersed liquid obtained in the step described above, inorganic beads are added in multiple stages, and a fine-dispersion process is performed (fine-dispersion step).

Prior to adding the pigment, a preparatory dispersion step such as the one described above is thus provided in the present embodiment, and inorganic beads are added in multiple stages in the step (fine-dispersion step) of fine-dispersing the pigment. In the fine-dispersion step, adding the inorganic beads in multi-stage fashion makes it possible to form microparticles of the pigment with superior efficiency, and to make the pigment particles adequately small in the color filter ink ultimately obtained. Particularly when the present step is performed in a state in which the polymer Z and/or polymer W is included, or when an acid-value dispersing agent and an amine-value dispersing agent are jointly used, the effects of using such materials, and the effects of using a method having a preparatory dispersion step and a multi-stage fine-dispersion step act synergistically, the color filter ink ultimately obtained can be provided with extremely excellent dispersion stability of pigment and discharge stability of droplets, and the color filter ink can be used to manufacture a color filter having extremely excellent brightness and contrast.

In contrast, when the fine-dispersion step is not performed in multiple stages, it is difficult to make the pigment particles adequately small in the color filter ink ultimately obtained, and the production properties of the color filter ink can be severely reduced. Even when the fine-dispersion step is performed in multiple stages, such problems as the following can occur when the preparatory dispersion step such as described above is omitted. Specifically, when the preparatory dispersion step is omitted, since the associated state of the dispersing agent is not adequately released (not undone) when the pigment is added, it is difficult to uniformly adhere the dispersing agent and other components to the surfaces of the pigment particles in the fine-dispersion step. It is also difficult obtain adequately excellent dispersion properties of the pigment particles (pigment particles having relatively large grain size that are not fine-dispersed) in the solvent in the fine-dispersion step.

It is sufficient for the present step to be performed by adding the inorganic beads in multiple stages, and the inorganic beads may be added in three or more stages, but the inorganic beads are preferably added in two stages. The production properties of the color filter ink can thereby be made particularly excellent while the color filter ink ultimately obtained is provided with adequately excellent long-term dispersion stability of the pigment particles.

A method for adding the inorganic beads in two stages will be described below. Specifically, a typical example of a method will be described for performing a first treatment using first organic beads, and a second treatment using second organic beads in the fine-dispersion step.

The inorganic beads (first inorganic beads and second inorganic beads) used in the present step may be composed of any material insofar as the material is an inorganic material, but preferred examples of the inorganic beads include zirconia beads (e.g., Toray Ceram milling balls (trade name); manufactured by Toray) and the like.

First Treatment

In the present step, the pigments are first added to the dispersing-agent-dispersed liquid prepared in the preparatory dispersion step described above, and a first treatment is performed for primary fine-dispersion using first inorganic beads having a predetermined grain size.

The first inorganic beads used in the first treatment preferably have a larger grain size than the second inorganic beads used in the second treatment. The efficiency of microparticle formation (fine-dispersion) of the pigments in the overall fine-dispersion step can thereby be made particularly excellent.

The average grain size of the first inorganic beads is not particularly limited, but is preferably 0.5 to 3.0 mm, more preferably 0.5 to 2.0 mm, and more preferably 0.5 to 1.2 mm. When the average grain size of the first inorganic beads is within the aforementioned range, the efficiency of microparticle formation (fine-dispersion) of the pigments in the overall fine-dispersion step can be made particularly excellent. In contrast, when the average grain size of the first inorganic beads is less than the lower limit of the aforementioned range, severe reduction of the efficiency of microparticle formation (grain size reduction) of the pigment particles by the first treatment tends to occur according to the type and other characteristics of the pigments. When the average grain size of the first inorganic beads exceeds the upper limit of the aforementioned range, although the efficiency of microparticle formation (grain size reduction) of the pigment particles by the first treatment can be made relatively excellent, the efficiency of microparticle formation (grain size reduction) of the pigment particles by the second treatment is reduced, and the efficiency of microparticle formation (fine-dispersion) of the pigments is reduced in the fine-dispersion step as a whole.

The amount of the first inorganic beads used is not particularly limited, but is preferably 100 to 600 parts by weight, and more preferably 200 to 500 parts by weight with respect to 100 parts by weight of the dispersing-agent-dispersed liquid.

The amount of the pigments added to the dispersing-agent-dispersed liquid is not particularly limited, but is preferably 12 parts by weight or more, and more preferably 18 to 35 parts by weight with respect to 100 parts by weight of the dispersing-agent-dispersed liquid.

The first treatment may be performed by stirring using various types of agitators in a state in which the pigments and the first inorganic beads are added to the dispersing-agent-dispersed liquid.

Examples of agitators that can be used in the first treatment include a ball mill or other media-type dispersing device, a Dispermill or other single-shaft or twin-shaft mixer, or the like.

The stirring time (processing time of the first treatment) for which the agitator is used is not particularly limited, but is preferably 10 to 120 minutes, and more preferably 15 to 40 minutes. Microparticle formation (fine-dispersion) of the pigments can thereby be efficiently advanced without reducing the production properties of the color filter ink.

The speed of the stirring vanes of the agitator in the first treatment is not particularly limited, but is preferably 1000 to 5000 rpm, and more preferably 1200 to 3800 rpm. Microparticle formation (fine-dispersion) of the pigments can thereby be efficiently advanced without reducing the production properties of the color filter ink. Degradation, denaturation, and the like of the thermoplastic resin and other components due to heat and the like can also be reliably prevented.

Second Treatment

A second treatment using second inorganic beads is performed after the first treatment. A pigment dispersion is thereby obtained in which the pigment particles are adequately fine-dispersed.

The second treatment may be performed in a state in which the first inorganic beads are included, but the first inorganic beads are preferably removed prior to the second treatment. Microparticle formation (fine-dispersion) of the pigments in the second treatment can thereby be performed with particularly excellent efficiency. The first inorganic beads can be easily and reliably removed by filtration or the like, for example.

The second inorganic beads used in the second treatment preferably have a smaller grain size than the first inorganic beads used in the first treatment. The pigments can thereby be adequately formed into microparticles (fine-dispersed) in the color filter ink ultimately obtained, particularly excellent dispersion stability (long-term dispersion stability) of the pigment particles in the color filter ink over a long period of time can be obtained, and particularly excellent discharge stability of droplets can be obtained.

The average grain size of the second inorganic beads is not particularly limited, but is preferably 0.03 to 0.3 mm, and more preferably 0.05 to 0.2 mm. When the average grain size of the second inorganic beads is within the aforementioned range, the pigments can be formed into microparticles (fine-dispersed) with particularly excellent efficiency in the fine-dispersion step as a whole. In contrast, when the average grain size of the second inorganic beads is less than the lower limit of the aforementioned range, severe reduction of the efficiency of microparticle formation (grain size reduction) of the pigment particles by the second treatment tends to occur according to the type and other characteristics of the pigments. When the average grain size of the second inorganic beads exceeds the upper limit of the aforementioned range, microparticle formation (fine-dispersion) of the pigment particles can be difficult to adequately advance.

The amount of the second inorganic beads used is not particularly limited, but is preferably 100 to 600 parts by weight, and more preferably 200 to 500 parts by weight with respect to 100 parts by weight of the dispersing-agent-dispersed liquid.

The second treatment can be performed using various types of agitators.

Examples of agitators that can be used in the second treatment include a ball mill or other media-type dispersing device, a Dispermill or other single-shaft or twin-shaft mixer, or the like.

The stirring time (processing time of the second treatment) for which the agitator is used is not particularly limited, but is preferably 10 to 120 minutes, and more preferably 15 to 40 minutes. Microparticle formation (fine-dispersion) of the pigments can thereby be adequately advanced without reducing the production properties of the color filter ink.

The speed of the stirring vanes of the agitator in the second treatment is not particularly limited, but is preferably 1000 to 5000 rpm, and more preferably 1200 to 3800 rpm. Microparticle formation (fine-dispersion) of the pigments can thereby be efficiently advanced without reducing the production properties of the color filter ink. Degradation, denaturation, and the like of the dispersing agent and other components due to heat and the like can also be reliably prevented.

A case was described above in which the fine-dispersion process was performed in two stages, but three or more stages of processing may also be performed. In such a case, the inorganic beads used in the later stages preferably have a smaller diameter than the inorganic beads used in the first stages. In other words, the average grain size of the inorganic beads ($n^{th}$ inorganic beads) used in the $n^{th}$ process is preferably smaller than the average grain size of the inorganic beads ($(n-1)^{th}$ inorganic beads) used in the $(n-1)^{th}$ process. By satisfying such a relationship, the pigment particles can be formed into microparticles (fine-dispersed) with particularly excellent efficiency, and the diameter of the pigment particles can be reduced in the color filter ink ultimately obtained.

In the fine-dispersion step (e.g., the first treatment and the second treatment), the solvent may be used for dilution or the like, for example, as needed.

Polymer X, Y Mixing Step

The pigment dispersion obtained in the fine-dispersion step such as described above is mixed with the polymer X and polymer Y (polymer X, Y mixing step). The color filter ink is thereby obtained.

The present step is preferably performed in a state in which the second inorganic beads used in the second treatment have been removed. The second inorganic beads can be easily and reliably removed by filtration, for example.

The present step can be performed using various types of agitators.

Examples of agitators that can be used in the present step include a Dispermill or other single-shaft or twin-shaft mixer, or the like.

The stirring time (processing time of the present step) for which the agitator is used is not particularly limited, but is preferably 1 to 60 minutes, and more preferably 15 to 40 minutes.

The speed of the stirring vanes of the agitator in the present step is not particularly limited, but is preferably 1000 to 5000 rpm, and more preferably 1200 to 3800 rpm.

In the present step, a liquid having a different composition than the solvent used in the aforementioned step may be added. A color filter ink having the desired characteristics can thereby be reliably obtained while dispersion of the dispersing agent in the aforementioned preparatory dispersion step, and fine-dispersion of the pigment particles in the fine-dispersion step are appropriately performed.

In the present step, at least a portion of the solvent used in the aforementioned step may be removed prior to mixing of the pigment dispersion and the polymer X and polymer Y, or after mixing of the pigment dispersion and the polymer X and polymer Y. The composition of the solvent in the preparatory dispersion step and the fine-dispersion step, and the composition of the liquid medium in the color filter ink ultimately obtained can thereby be made to differ from each other. As a result, a color filter ink having the desired characteristics can be reliably obtained while dispersion of the dispersing agent in the aforementioned preparatory dispersion step, and fine-dispersion of the pigment particles in the fine-dispersion step are appropriately performed. The solvent can be removed by placing the liquid to be removed in a reduced-pressure atmosphere, heating, or another method, for example.

Ink Set

The color filter ink such as that described above is used in the manufacture of a color filter using an inkjet method. A color filter ordinarily has colored portions having a plurality of colors (ordinarily, RGB corresponding to the three primary colors of light) in correlation with a full color display. A plurality of types of color filter ink that correspond to the plurality of colors of colored portions is used in the formation of the colored portions. In other words, an ink set provided with a plurality of colors of color filter ink is used in the manufacture of a color filter. In the present invention, it is sufficient insofar as a color filter ink such as described above is used to form at least one type of colored portion in the manufacturing of a color filter, but the color filter ink is preferably used to form all of the colors of colored portions.

More specifically, the color filter ink set of the present invention is preferably provided with red ink that includes a red colorant (particularly a red pigment), green ink that includes a green colorant (particularly a green pigment), and blue ink that includes a blue colorant (particularly a blue pigment). The color filter manufactured using the color filter ink set can thereby be provided with a particularly wide color reproduction range. The balance of luminance between colors in the color filter can also be easily adjusted, and an image having excellent quality can be suitably displayed.

Color Filter

Following is a description of an example of a color filter manufactured using the color filter ink (ink sets) described above.

FIG. 1 is a sectional view showing a preferred embodiment of the color filter of the present invention.

A color filter 1 is provided with a substrate 11 and colored portions 12 formed using the color filter ink described above, as shown in FIG. 1. The colored portions 12 are provided with a first colored portion 12A, a second colored portion 12B, and a third colored portion 12C, having mutually different colors. A partition wall 13 is disposed between adjacent colored portions 12.

Substrate

The substrate 11 is a plate-shaped member having optical transparency, and has a function for holding the colored portions 12 and the partition wall 13.

It is preferred that the substrate 11 be essentially composed of a transparent material. A clearer image can thereby be formed by light transmitted through the color filter 1.

The substrate 11 is preferably one having excellent heat resistance and mechanical strength. Deformations or the like caused by, e.g., heat applied during the manufacture of the color filter 1 can thereby be reliably prevented. Examples of a constituent material of the substrate 11 that satisfies such conditions include glass, silicon, polycarbonate, polyester, aromatic polyamide, polyamidoimide, polyimide, norbornene-based ring-opening polymers, and hydrogenated substances.

Colored Portions

The colored portions 12 are formed using a color filter ink (color filter ink set) such as that described above.

Since the colored portions 12 are formed using a color filter ink (color filter ink set) such as that described above, they are formed by the desired quantity of ink, have the desired shape, and have little variation in characteristics between pixels, and unintentional color mixing (mixing of a plurality of color filter inks) and the like is reliably prevented. For this reason, the color filter 1 is highly reliable in that the occurrence of unevenness of color and saturation, and the like is suppressed. The color filter 1 also has excellent contrast and excellent coloration properties of the colored portions 12.

Each colored portion 12 is disposed inside a cell 14, which is an area enclosed by a later-described partition wall 13.

The first colored portion 12A, the second colored portion 12B, and the third colored portion 12C have mutually different colors. For example, the first colored portion 12A can be a red filter area (R), second colored portion 12B can be a green filter area (G), and the third colored portion 12C can be a blue filter area (B).

The colored portions 12A, 12B, 12C as a single set of different colors constitute a single pixel. A prescribed number of the colored portions 12 are disposed in the lateral and longitudinal directions in the color filter 1. For example, when the color filter 1 is a color filter for high definition, 1366×768 pixels are disposed; when the color filter is a color filter for full high definition, 1920×1080 pixels are disposed; and when the color filter is a color filter for super high definition, 7680×4320 pixels are disposed. The color filter 1 may be provided with, e.g., spare pixels outside of the effective area.

Partition Wall

A partition wall (bank) 13 is disposed between adjacent colored portions 12. Adjacent colored portions 12 can thereby be reliably prevented from color mixing, and as a result, a sharp image can be reliably displayed.

The partition wall 13 may be composed of a transparent material, but is preferably composed of material having light-blocking properties. An image with excellent contrast can thereby be displayed. The color of the partition wall (light-blocking portion) 13 is not particularly limited, but black is preferred. Accordingly, the contrast of a displayed image is particularly good.

The height of the partition wall 13 is not particularly limited, but is preferably greater than the thickness of the colored portions 12. Color mixing between adjacent colored portions 12 can thereby be reliably prevented. The specific thickness of the partition wall 13 is preferably 0.1 to 10 μm, and more preferably 0.5 to 3.5 μm. Color mixing between adjacent colored portions 12 can thereby be reliably prevented, and image display devices and electronic devices provided with the color filter 1 can be provided with excellent visual angle characteristics.

The partition wall 13 may be composed of any material, but is preferably composed principally of a curable resin material, for example. Accordingly, a partition wall 13 having a desired shape can be easily formed using a method described hereinafter. In the case that the partition wall 13 functions as a light-blocking portion, carbon black or another light-absorbing material may be included as a constituent element of the partition wall.

Method for Manufacturing Color Filter

Next, an example of the method for manufacturing the color filter 1 will be described.

Figure 4:
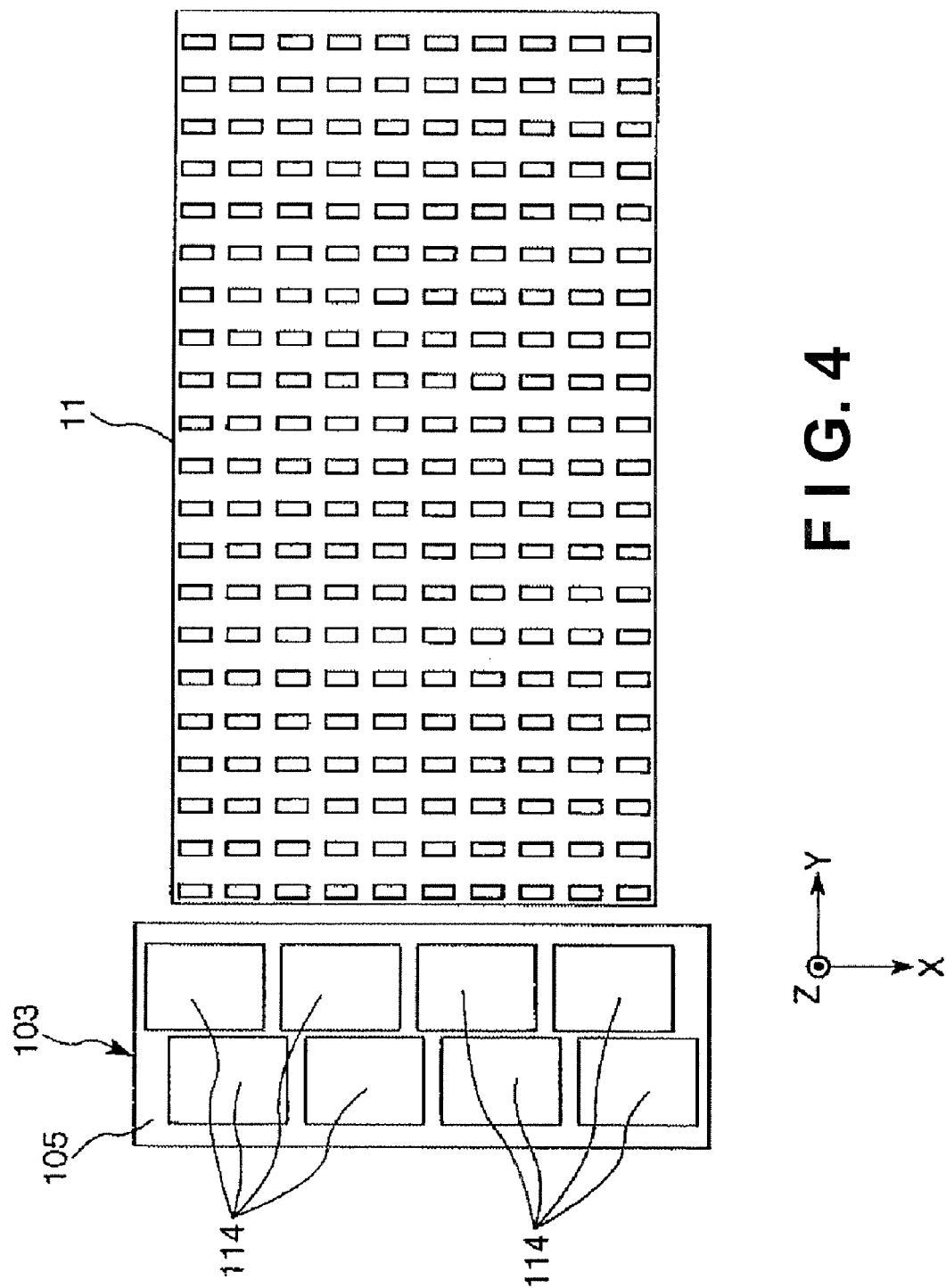
FIG. 4 is a view of droplet discharge means in the droplet discharge device shown in FIG. 3, as seen from the stage side.
Figure 5:
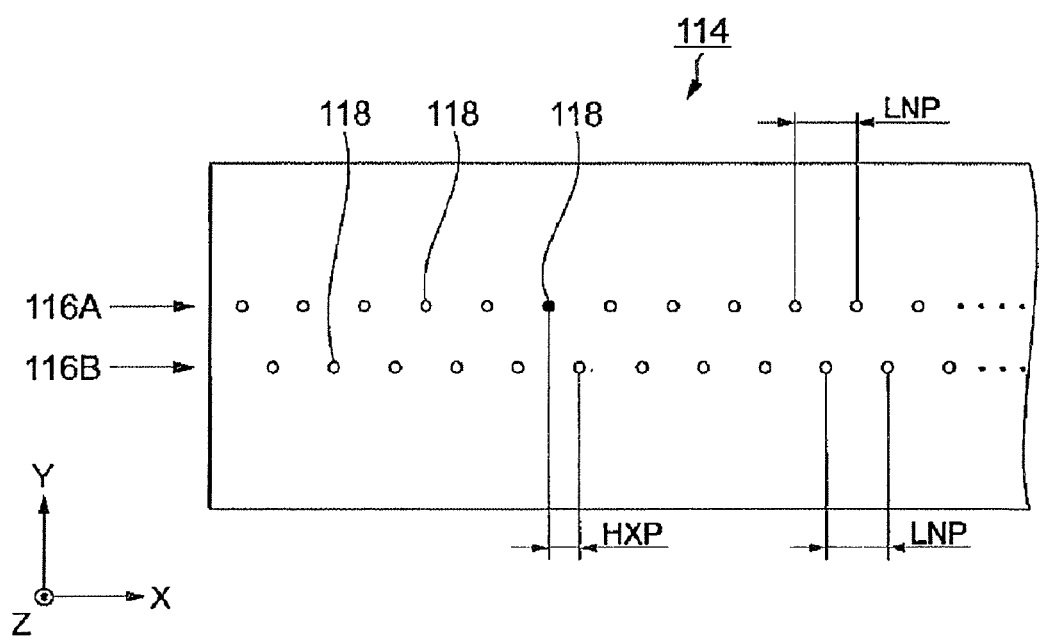
FIG. 5 is a view showing the bottom surface of the droplet discharge head in the droplet discharge device shown in FIG. 3
Figure 6:
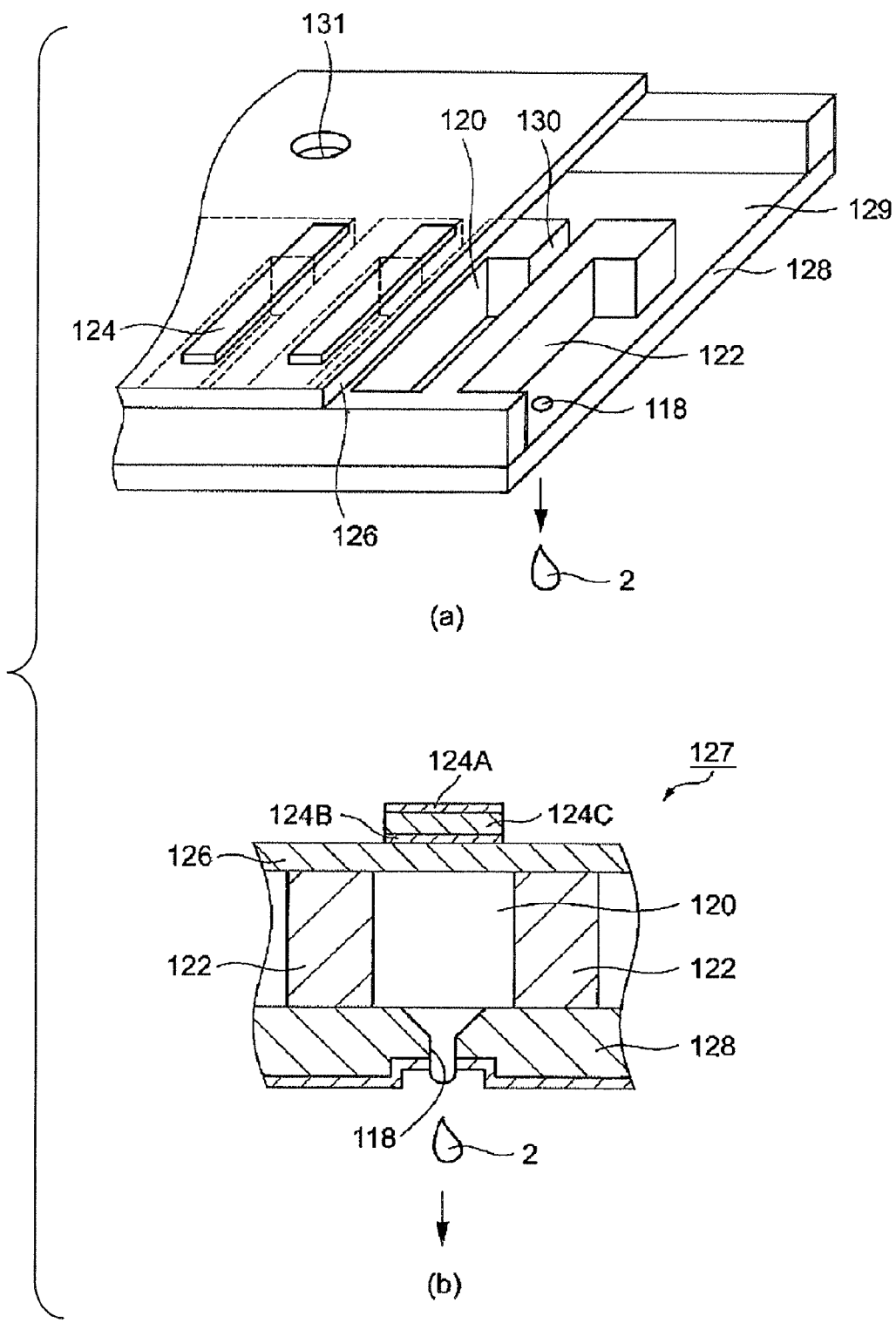

FIG. 2 is a cross-sectional view showing a method for manufacturing a color filter; FIG. 3 is a perspective view showing the droplet discharge device used in the manufacture of the color filter; FIG. 4 is a view of droplet discharge means in the droplet discharge device shown in FIG. 3, as seen from the stage side; FIG. 5 is a view showing the bottom surface of the droplet discharge head in the droplet discharge device shown in FIG. 3; and FIG. 6 is a view showing the droplet discharge head in the droplet discharge device shown in FIG. 3, wherein FIG. 6(a) is a cross-sectional perspective view and FIG. 6(b) is a cross-sectional view.

The present embodiment has a substrate preparation step (1a) for preparing a substrate 11, a partition wall formation step (1b, 1c) for forming a partition wall 13 on the substrate 11, an ink application step (1d) for applying color filter ink 2 into an area surrounded by the partition wall 13 by using an inkjet method, and a colored portion formation step (1e) for forming solid colored portions 12 by removing the liquid medium from the color filter ink 2 and curing the resin material, as shown in FIG. 2.

Substrate Preparation Step

First, a substrate 11 is prepared (1a). It is preferred that the substrate 11 to be prepared in the present step undergo a washing treatment. The substrate 11 to be prepared in the present step may be washed by chemical treatment using a silane-coupling agent or the like, a plasma treatment, ion plating, sputtering, gas phase reaction, vacuum deposition, or another suitable washing treatment.

Partition Wall Formation Step

Next, a radiation-sensitive composition is applied to substantially the entire surface of one of the surfaces of the substrate 11 to form (1b) a photoresist layer 3. A prebaking treatment may be performed as required after the radiation-sensitive composition has been applied to the substrate 11. The prebaking treatment may be carried out under the conditions of, e.g., a heating temperature of 50 to 150° C. and a heating time of 30 to 600 seconds.

Next, a partition wall 13 is formed (1c) by irradiating the surface via a photomask, performing a post exposure bake (PEB), and carrying out a development treatment using an alkali development fluid. PEB can be carried out under the following example conditions: a heating temperature of 50 to 150° C., a heating time of 30 to 600 seconds, and a radiation intensity of 1 to 500 mJ/cm$^2$. The development treatment can be performed using, e.g., fluid overflow, dipping, vibration soaking, or another method, and the development treatment time can be set to 10 to 300 seconds, for example. After the development treatment, a post baking treatment may be performed as required. The post baking treatment can be carried out under the following example conditions: a heating temperature of 150 to 280° C. and a heating time of 3 to 120 minutes.

Ink Application Step

Next, the color filter ink 2 is applied (1d) to the cells 14 surrounded by the partition wall 13 using the inkjet method.

The present step is carried out using a plurality of types of color filter inks 2 that correspond to the plurality of colors of the colored portions 12 to be formed. In this case, a partition wall 13 is provided, and mixing of two or more color filter inks 2 can therefore be reliably prevented.

The color filter ink 2 as described above includes the resin material (polymer X, polymer Y), and has excellent droplet discharge stability. The droplet discharge quantity can therefore be easily and reliably controlled while flight deflection and other problems are reliably prevented from occurring even when the color filter 1 being manufactured is large, or when a large number of color filters 1 are continuously manufactured. As a result, color mixing, uneven color/saturation, reduced contrast, and other problems can be reliably prevented in the manufactured color filter 1.

The color filter ink 2 is discharged using a droplet discharge device such as that shown in FIGS. 3 to 6.

The droplet discharge device 100 used in the present step is provided with a tank 101 for holding the color filter ink 2, a tube 110, and a discharge scan unit 102 to which the color filter ink 2 is fed from the tank 101 via the tube 110, as shown in FIG. 3. The discharge scan unit 102 is provided with droplet discharge means 103 in which a plurality of droplet discharge heads (inkjet heads) 114 is mounted on a carriage 105, a first position controller 104 (movement means) for controlling the position of the droplet discharge means 103, a stage 106 for holding the substrate 11 (hereinafter simply referred to as "substrate 11") on which the partition wall 13 is formed in an aforementioned step, a second position controller 108 (movement means) for controlling the position of the stage 106, and control means 112. The tank 101 and the plurality of droplet discharge heads 114 in the droplet discharge means 103 are connected by the tube 110, and the color filter ink 2 is fed by compressed air from the tank 101 to each of the plurality of droplet discharge heads 114.

The first position controller 104 moves the droplet discharge means 103 along the X-axis direction and Z-axis direction orthogonal to the X-axis direction, in accordance with a signal from the control means 112. The first position controller 104 also has a function for rotating the droplet discharge means 103 about the axis parallel to the Z-axis. In the present embodiment, the Z-axis direction is the direction parallel to the perpendicular direction (i.e., the direction of gravitational acceleration). The second position controller 108 moves the stage 106 along the Y-axis direction, which is orthogonal to both the X-axis direction and the Z-axis direction, in accordance with a signal from the control means 112. The second position controller 108 also has a function for rotating the stage 106 about the axis parallel to the Z-axis.

The stage 106 has a surface parallel to both the X-axis direction and the Y-axis direction. The stage 106 is configured so as to be capable of securing or holding the substrate 11 on the planar surface thereof, the substrate having the cells 14 in which the color filter ink 2 is to be applied.

As described above, the droplet discharge means 103 is moved in the X-axis direction by the first position controller 104. On the other hand, the stage 106 is moved in the Y-axis direction by the second position controller 108. In other words, the relative position of the droplet discharge heads 114 in relation to the stage 106 is changed by the first position controller 104 and the second position controller 108 (the substrate 11 held on the stage 106 and the droplet discharge means 103 move in a relative fashion).

The control means 112 is configured so as to receive from an external information processor discharge data that express the relative position in which the color filter ink 2 is to be discharged.

The droplet discharge means 103 has a plurality of droplet discharge heads 114, which have substantially the same structure as each other, and a carriage 105 for holding the droplet discharge heads 114, as shown in FIG. 4. In the present embodiment, the number of droplet discharge heads 114 held in the droplet discharge means 103 is eight. Each of the droplet discharge heads 114 has a bottom surface on which a plurality of later-described nozzles 118 is disposed. The shape of the bottom surface of each of the droplet discharge heads 114 is a polygon having two short sides and two long sides. The bottom surface of the droplet discharge heads 114 held in the droplet discharge means 103 faces the stage 106 side, and the long-side direction and the short-side direction of the droplet discharge heads 114 are parallel to the X-axis direction and the Y-axis direction, respectively.

The droplet discharge heads 114 have a plurality of nozzles 118 aligned in the X-axis direction, as shown in FIG. 5. The plurality of nozzles 118 is disposed so that a nozzle pitch HXP in the X-axis direction in the droplet discharge heads 114 has a prescribed value. The specific value of the nozzle pitch HXP is not particularly limited, but may be 50 to 90 μm, for example. In this case, "the nozzle pitch HXP in the X-axis direction in the droplet discharge heads 114" corresponds to the pitch between a plurality of nozzle images obtained by projecting all of the nozzles 118 in the droplet discharge heads 114 on the X axis along the Y-axis direction.

In the present embodiment, the plurality of nozzles 118 in the droplet discharge heads 114 forms a nozzle row 116A and a nozzle row 116B, both of which extend in the X-axis direction. The nozzle row 116A and the nozzle row 116B are disposed in parallel across an interval. In the present embodiment, 90 nozzles 118 are aligned in a row in the X-axis direction with a fixed interval LNP in each nozzle row 116A and nozzle row 116B. The specific value of LNP is not particularly limited, but may be 100 to 180 μm, for example.

The position of the nozzle row 116B is offset in the positive direction of the X-axis direction (to the right in FIG. 5) by half the length of the nozzle pitch LNP in relation to the position of the nozzle row 116A. For this reason, the nozzle pitch HXP in the X-axis direction of the droplet discharge heads 114 is half the length of the nozzle pitch LNP of the nozzle row 116A (or the nozzle row 116B).

Therefore, the nozzle line density in the X-axis direction of the droplet discharge heads 114 is twice the nozzle line density of the nozzle row 116A (or the nozzle row 116B). In the present specification, "the nozzle line density in the X-axis direction" corresponds to the number per unit length of the plurality of nozzle images obtained by projecting a plurality of nozzles on the X-axis along the Y-axis direction. Naturally, the number of nozzle rows included in the droplet discharge heads 114 is not limited to two rows. The droplet discharge heads 114 may include M number of nozzle rows. In this case, M is a natural number of 1 or higher. In this case, the plurality of nozzles 118 in each of the M number of nozzle rows is aligned at a pitch having a length that is M times that of the nozzle pitch HXP. In the case that M is a natural number of 2 or higher, another (M−1) number of nozzle rows are offset in the X-axis direction without overlapping, by a length i times that of the nozzle pitch HXP, in relation to a single nozzle row among the M number of nozzle rows. Here, i is a natural number from 1 to (M−1).

In the present embodiment, since the nozzle row 116A and the nozzle row 116B are each composed of 90 nozzles 118, a single droplet discharge head 114 has 180 nozzles 118. However, five nozzles at each end of the nozzle row 116A are set as "reserve nozzles." Similarly, five nozzles at each end of the nozzle row 116B are set as "reserve nozzles." The color filter ink 2 is not discharged from these 20 "reserve nozzles." For this reason, 160 nozzles 118 among the 180 nozzles 118 in the droplet discharge heads 114 function as nozzles for discharging the color filter ink 2.

In the droplet discharge means 103, the plurality of droplet discharge heads 114 is disposed in two rows along the X-axis direction, as shown in FIG. 4. One of the rows of droplet discharge heads 114 and the other row of droplet discharge heads 114 are disposed so that a portion of the droplet discharge heads overlap as viewed from the Y-axis direction, with consideration given to the reserve nozzles. The nozzles 118 for discharging the color filter ink 2 are thereby configured so as to be continuous in the X-axis direction at the nozzle pitch HXP across the length of the dimension in the X-axis direction of the substrate 11 in the droplet discharge means 103.

In the droplet discharge means 103 of the present embodiment, the droplet discharge heads 114 are disposed so as to cover the entire length of the dimension in the X-axis direction of the substrate 11. However, the droplet discharge means in the present invention may cover a portion of the length of the dimension in the X-axis direction of the substrate 11.

Each of the droplet discharge heads 114 is an inkjet head, as shown in the diagram. More specifically, each of the droplet discharge heads 114 is provided with a vibration plate 126 and a nozzle plate 128. A fluid reservoir 129 in which the color filter ink 2 fed from the tank 101 via a hole 131 is constantly filled is positioned between the vibration plate 126 and the nozzle plate 128.

A plurality of partition walls 122 is disposed between the vibration plate 126 and the nozzle plate 128. The portions enclosed by the vibration plate 126, the nozzle plate 128, and a pair of partition walls 122 are cavities 120. Since the cavities 120 are disposed in correspondence with the nozzles 118, the number of cavities 120 and the number of nozzles 118 is the same. The color filter ink 2 is fed to the cavities 120 from the fluid reservoir 129 via supply ports 130 positioned between pairs of partition walls 122.

An oscillator 124 is positioned on the vibration plate 126 in correspondence with each of the cavities 120. The oscillator 124 includes a piezoelement 124C, and a pair of electrodes 124A, 124B that sandwich the piezoelement 124C. The color filter ink 2 is discharged from the corresponding nozzle 118 by applying a drive voltage between the pair of electrodes 124A, 124B. The shape of the nozzles 118 is adjusted so that the color filter ink 2 is discharged in the Z-axis direction from the nozzles 118.

The nozzle plate 128 is composed of a stainless steel substrate, a silica film formed primarily by a silica compound provided so as to cover the substrate, and a fluid-repellent film that includes a fluoroalkyl compound, the fluid-repellent film being provided so as to cover the silica film.

The silica film has the function of bonding the fluid-repellent film and the stainless steel substrate to each other, and also of protecting the stainless steel substrate.

The control means 112 (see FIG. 3) may be configured so as to independently apply signals to each of the plurality of oscillators 124. In other words, the volume of the color filter ink 2 discharged from the nozzles 118 can be controlled for each nozzle 118 in accordance with a signal from the control means 112. The control means 112 can also set the nozzles 118 that will perform a discharge operation during a coating scan, as well as the nozzles 118 that will not perform a discharge operation.

In the present specification, the portion that includes a single nozzle 118, a cavity 120 that corresponds to the nozzle 118, and the oscillator 124 that corresponds to the cavity 120 will be referred to as a "discharge portion 127". In accordance with this designation, a single droplet discharge head 114 has the same number of discharge portions 127 as the number of nozzles 118.

The color filter ink 2 corresponding to the plurality of colored portions 12 of the color filter 1 is applied to the cells 14 using such a droplet discharge device 100. The color filter ink 2 can be selectively applied with good efficiency in the cells 14 by using such a device. As described above, the color filter ink 2 has excellent stable discharge properties, and flight deflection, loss of stability in the droplet discharge quantity, and other problems are much less likely to occur, even when droplet discharge is carried out over a long period of time. Therefore, it is possible to reliably prevent problems such as the mixing (color mixing) of a plurality of types of ink used in the formation of colored portions having different colors, and variability in the color saturation between the plurality of colored portions in which the same color saturation is normally required. In the configuration of the diagrams, the droplet discharge device 100 has a tank 101 for holding the color filter ink 2, a tube 110, and other components for only one color, but these members may have a plurality of colors the correspond to the plurality of colored portions 12 of the color filter 1. Also, in the manufacture of the color filter 1, a plurality of droplet discharge devices 100 corresponding to a plurality of color filter inks 2 may be used.

In the present invention, the droplet discharge heads 114 may use an electrostatic actuator in place of the piezoelement as the drive element. The droplet discharge heads 114 may have a configuration in which an electrothermal converter is used and color filter ink is discharged using the thermal expansion of material produced by an electrothermal converter.

Colored Portion Formation Step (Curing Step)

Next, the liquid medium is removed from the color filter ink 2 in the cells 14, and solid colored portions 12 are formed by curing the resin material (1e). The color filter 1 is obtained in this manner.

The present step is ordinarily carried out by heating. Performing the present step by heating enables the formed colored portion 12 to have particularly excellent adhesion to the substrate 11. It is also possible to reliably prevent the liquid medium from remaining in the formed colored portion 12. As a result, the color filter 1 can be provided with particularly excellent durability and reliability. The production properties of the color filter 1 are also enhanced.

The heating temperature (temperature of the heated substrate 11) in the present step is not particularly limited, but is preferably 100 to 280° C., and more preferably 110 to 250° C. Curing of the resin material can thereby be efficiently promoted while preventing unwanted degradation, decomposition, and other problems with the constituent materials of the colored portion 12, and the liquid medium can also be suitably removed from the color filter ink 2.

The heating time in the present step is also not particularly limited, but is preferably 30 to 190 minutes, and more preferably 40 to 130 minutes.

The present step may also include multiple heat treatments at different temperatures. Specifically, the present step may include a first heat treatment for heating the substrate 11 at a relatively low temperature, and a second heat treatment for heating the substrate 11 at a temperature higher than that of the first heat treatment.

Unwanted degradation, decomposition, and the like of the constituent materials of the colored portion 12 can thereby be prevented, the production properties of the color filter 1 can be enhanced, and the liquid medium can be effectively prevented from remaining in the formed colored portion 12.

The surface of the colored portion 12 can also be made more flat by performing a first heat treatment for heating the substrate 11 at a relatively low temperature, and a second heat treatment for heating the substrate 11 at a temperature higher than that of the first heat treatment in the present step.

In such a case, heating the substrate 11 at a relatively low temperature in the first heat treatment makes it possible to gradually remove the liquid medium while preventing convection of the color filter ink 2, and to eliminate or reduce the fluidity of the color filter ink while the surface of the color filter ink 2 is kept flat. Heating at a relatively low temperature also makes it possible to prevent unwanted curing of the resin material.

In the second heat treatment, the liquid medium that could not be removed by the first heat treatment can be completely removed. When the resin material is reacted and the color filter ink 2 is cured in the present step, the color filter ink 2 that was fixed in a flat surface state in the first heat treatment can be efficiently cured in the flat surface state thereof.

When the first heat treatment and second heat treatment are performed in the present step as described above, the treatment temperature (temperature of the heated substrate 11) in the first heat treatment is not particularly limited, but is preferably 30 to 100° C., and more preferably 40 to 80° C. The liquid medium can thereby be suitably removed from the color filter ink 2 while convention of the color filter ink 2 is reliably prevented.

The amount of time for the first heat treatment is also not particularly limited, but is preferably 3 to 50 minutes, and more preferably 5 to 40 minutes.

The treatment temperature (temperature of the heated substrate 11) in the second heat treatment is not particularly limited, but is preferably 120 to 280° C., and more preferably 150 to 250° C. The liquid medium that could not be removed by the first heat treatment can thereby be completely removed. When the resin material (curable resin material) is reacted and the color filter ink 2 is cured in the present step, the color filter ink 2 that was fixed in a flat surface state in the first heat treatment can be efficiently cured in the flat surface state thereof.

The amount of time for the second heat treatment is also not particularly limited, but is preferably 25 to 150 minutes, and more preferably 30 to 100 minutes.

In the present step, such treatments as those involving irradiation of active energy rays, and treatments in which the substrate 11 to which the color filter ink 2 has been applied is placed under a reduced-pressure environment, for example, may also be performed.

The curing reaction of the resin material can be made to proceed with good efficiency by irradiating active energy rays; the curing reaction of the resin material can be reliably promoted even when the heating temperature is relatively low; the occurrence of adverse effects on the substrate 11 and other components can reliably prevented; and other effects can be obtained. Examples of the active energy rays that may be used include light rays of various wavelengths, e.g., UV rays, X-rays, g-rays, i-rays, and excimer lasers.

The substrate 11 on which the color filter ink 2 has been applied can be placed under a reduced-pressure environment (reduced-pressure treatment), whereby the liquid medium can be reliably removed even when the heating temperature is relatively low, and the occurrence of adverse effects on the substrate 11 and the like can be more reliably prevented. The joint use of heat treatment and reduced-pressure treatment also enables the colored portion to be formed more efficiently.

Image Display Device

Preferred embodiments of the liquid crystal display device, which is an image display device (electrooptic device) having the color filter 1, will next be described.

FIG. 7 is a cross-sectional view showing a preferred embodiment of the liquid crystal display device. As shown in the diagram, the liquid crystal display device 60 has a color filter 1, a substrate (opposing substrate) 66 arranged on the surface on which the colored portions 12 of the color filter 1 are disposed, a liquid crystal layer 62 composed of a liquid crystal sealed in the gaps between the color filter 1 and the substrate 66, a polarizing plate 67 disposed on the surface (lower side in FIG. 7) opposite from the surface that faces the liquid crystal layer 62 of the substrate 11 of the color filter 1, and a polarizing plate 68 disposed on the side (upper side in FIG. 7) opposite from the surface that faces liquid crystal layer 62 of the substrate 66. A shared electrode 61 is disposed on the surface (the surface opposite from the surface facing the substrate 11 of the colored portions 12 and the partition wall 13) on which the colored portions 12 and the partition wall 13 of the color filter 1 are disposed. Pixel electrodes 65 are disposed in the form of a matrix in positions that correspond to the colored portions 12 of the color filter 1 on the substrate (opposing substrate) 66, facing the liquid crystal layer 62 and color filter 1. An alignment film 64 is disposed between the shared electrode 61 and the liquid crystal layer 62, and an alignment film 63 is disposed between the substrate 66 (pixel electrodes 65) and the liquid crystal layer 62.

The substrate 66 is a substrate having optical transparency with respect to visible light, and is a glass substrate, for example.

The shared electrode 61 and the pixel electrodes 65 are composed of a material having optical transparency with respect to visible light, and are ITO or the like, for example.

Although not depicted in the diagram, a plurality of switching elements (e.g., TFT: thin film transistors) is disposed so as to correspond to the pixel electrodes 65. The pixel electrodes 65 corresponding to the colored portions 12 can be used to control the transmission properties of light in areas that correspond to the colored portions 12 (pixel electrodes 65) by controlling the state of the voltage applied between the shared electrode 61 and the pixel electrodes.

In the liquid crystal display device 60, light emitted from the backlight, which is not depicted, is incident from the polarizing plate 68 side (the upper side in FIG. 7). The light that passes through the liquid crystal layer 62 and enters the colored portions 12 (12A, 12B, 12C) of the color filter 1 is emitted from the polarizing plate 67 (lower side of FIG. 7) as light having a color that corresponds to the colored portions 12 (12A, 12B, 12C).

As described above, the colored portions 12 are formed using the color filter ink 2 (color filter ink set) of the present invention and therefore have reduced variability in the characteristics between colors and between pixels. As a result, an image having reduced unevenness of color and saturation, and the like between regions can be stably displayed in the liquid crystal display device 60.

Electronic Device

A liquid crystal display device or another image display device (electrooptic device) 1000 having a color filter 1 such as that described above can be used in a display unit of a variety of electronic equipment.

FIG. 8 is a perspective view showing the configuration of a mobile (or notebook) personal computer to which the electronic equipment of the present invention has been applied.

In the diagram, a personal computer 1100 is composed of a main unit 1104 provided with a keyboard 1102, and a display unit 1106. The display unit 1106 is rotatably supported by the main unit 1104 via a hinge structure.

In the personal computer 1100, the display unit 1106 is provided with an image display device 1000.

Figure 9:
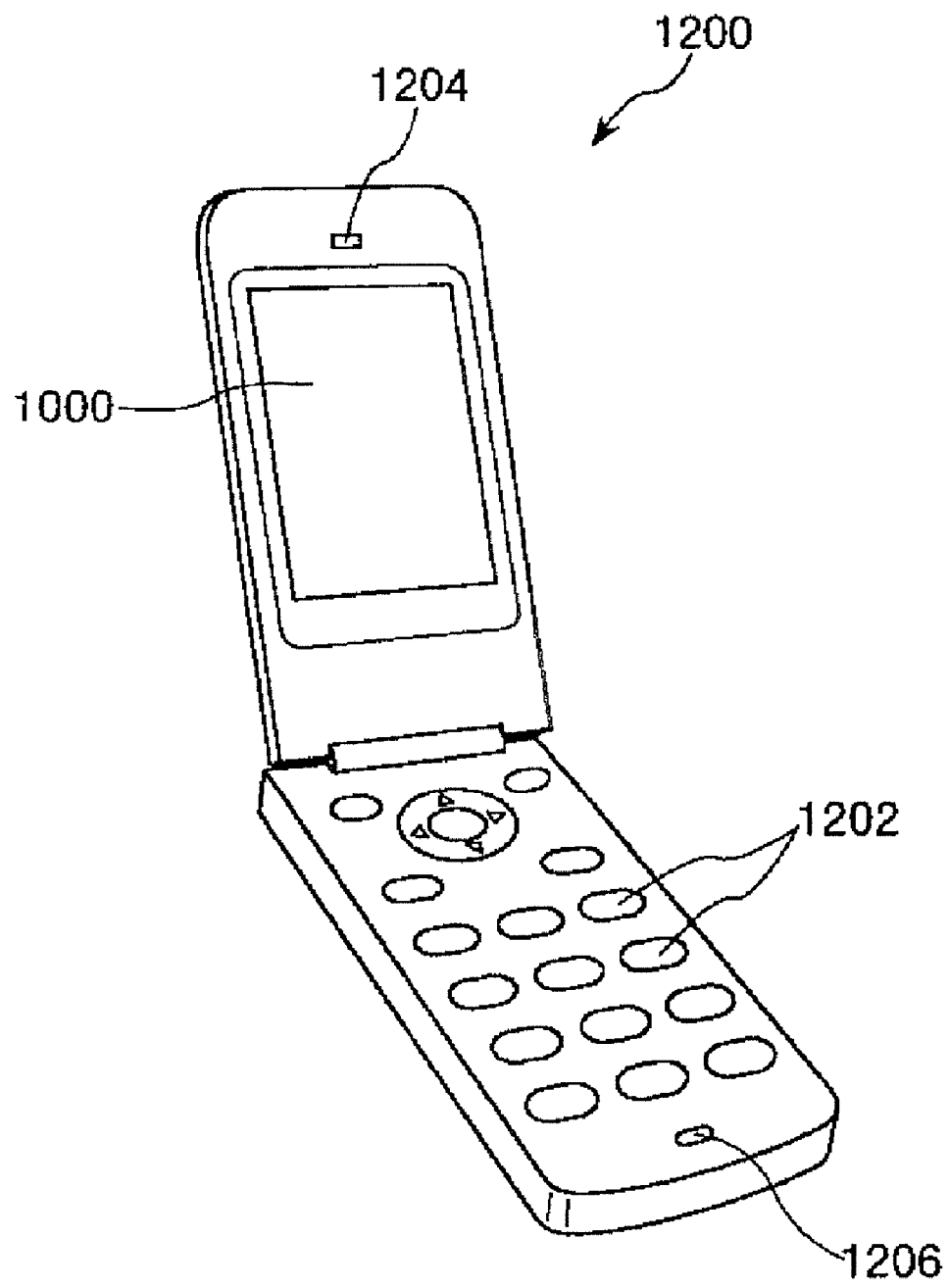
FIG. 9 is a perspective view showing the configuration of a portable telephone (including PHS) to which the electronic device of the present invention has been applied.

FIG. 9 is a perspective view showing the configuration of a portable telephone (including PHS) to which the electronic device of the present invention has been applied.

In the diagram, the portable telephone 1200 has a plurality of operating buttons 1202, an earpiece 1204, and a mouthpiece 1206, as well as an image display device 1000 provided to the display unit.

FIG. 10 is a perspective view showing the configuration of a digital still camera in which the electronic device of the present invention has been applied. In the diagram, connection to external apparatuses is displayed in a simplified manner.

In this case, an ordinary camera exposes a silver-salt photography film to the optical image of a photographed object, but in contrast, a digital still camera 1300 photoelectrically converts the optical image of a photographed image and generates an imaging signal (image signal) with the aid of a CCD (Charge Coupled Device) or another imaging element.

An image display device 1000 is disposed in the display portion on the back surface of a case (body) 1302 in the digital still camera 1300, is configured to perform display operation on the basis of a pickup signal from the CCD, and functions as a finder for displaying the photographed object as an electronic image.

A circuit board 1308 is disposed inside the case. The circuit board 1308 has a memory that can store (record) the imaging signal.

A photo-detection unit 1304 that includes an optical lens (imaging optical system), a CCD, and the like is disposed on the front surface side (back surface side in the configuration of the diagram) of the case 1302.

A photographer confirms the image of the object to be photographed displayed on the display unit, and the imaging signal of the CCD when a shutter button 1306 is pressed is transferred and stored in the memory of the circuit board 1308.

In the digital still camera 1300, a video signal output terminal 1312 and a data communication I/O terminal 1314 are disposed on the side surface of the case 1302. A television monitor 1430 is connected to the video signal output terminal 1312 as required, and a personal computer 1440 is connected to the data communication I/O terminal 1314 as required, as shown in the diagram. An imaging signal stored in the memory of the circuit board 1308 is configured to be outputted by a prescribed operation to the television monitor 1430 and the personal computer 1440.

The electronic device of the present invention may be applied to the above-described personal computer (mobile personal computer), portable telephone, and digital still camera, and other examples include televisions (e.g., liquid crystal display devices), video cameras, view finder-type and direct-view monitor-type video tape recorders, laptop personal computers, car navigation devices, pagers, electronic assistants (including those with a communication function), electronic dictionaries, calculators, electronic game devices, word processors, work stations, videophones, security television monitors, electronic binoculars, POS terminals, apparatuses having a touch panel (e.g., cash dispensers for financial institutions, and automatic ticketing machines), medical equipment (e.g., electronic thermometers, sphygmomanometers, blood glucose sensors, electrocardiograph display devices, ultrasound diagnostic devices, and endoscopic display devices), fish finders, various measuring apparatuses, instruments (e.g., instruments in vehicles, aircraft, and ships), flight simulators, and various other monitors, and projectors, and other projection display devices. Among these, televisions have display units that are tending to become markedly larger in recent years, but in electronic devices having such a large display unit (e.g., a display unit having a diagonal length of 80 cm or more), unevenness of color and saturation, and other problems particularly readily occur when a color filter manufactured using a conventional color filter ink is used. However, in accordance with the present invention, the occurrence of such problems can be reliably prevented. In other words, the effect of the present invention is more markedly demonstrated when application is made to an electronic device having a large display unit such as that described above.

The present invention above was described based on preferred embodiments, but the present invention is not limited to these embodiments.

For example, in the embodiments described above, color filter ink corresponding to the colored portions of various colors was applied inside the cells, the liquid medium was thereafter removed in a single process from the color filter ink of each color in the cells, and the resin material was cured. In other words, a process was described in which the colored portion formation step (curing step) was carried out a single time, but the ink application step and the colored portion formation step may be repeated for each color.

It is also possible to substitute or to add as another configuration the parts constituting a color filter, image display device, and electronic device with any part that demonstrates the same function. For example, in the color filter of the present invention, a protective film for covering the colored portions may be provided to the surface opposite from the surface facing the substrate of the colored portions. Damage, degradation, and the like of the colored portions can thereby be more effectively prevented.

The color filter ink of the present invention may be manufactured by any method, and is not limited to being manufactured using a method such as described above.

In the embodiments described above, the case in which an ink set for a color filter is provided with three types (three colors) of color filter inks corresponding to the three primary colors of light was mainly described, but the number and type (color) of color filter inks constituting the ink set for a color filter is not limited to the arrangement described above. For example, in the present invention, the ink set for a color filter may be one provided with four or more types of color filter inks.

EXAMPLES

Specific examples of the present invention will next be described.

1. Polymer Synthesis

Synthesis Example 1

As the medium (solvent), 314 parts by weight of diethylene glycol monobutyl ether acetate was placed in a reaction container (flask) provided with an agitator, a reflux condenser, a dropping funnel, a nitrogen introduction tube, and a temperature gauge, and heated to 90° C. Next, 20 parts by weight of 2,2'-azobis(isobutyronitrile) (AIBN) as a radical initiator and 30 parts by weight of diethylene glycol monobutyl ether acetate (solvent) were added, and a solution in which 180 parts by weight of the monomer component (compound) x1 indicated by Formula (1) above, 90 parts by weight of the monomer component (compound) x2 indicated by Formula (2) above, 15 parts by weight of the monomer component (compound) x3 indicated by Formula (3) above, 15 parts by weight of the monomer component (compound) x4 indicated by Formula (4) above, and 50 parts by weight of 2,2'-azobis (isobutyronitrile) (AIBN) were dissolved in 200 parts by weight of diethylene glycol monobutyl ether acetate was dropped into the flask over 5 hours using a dropping pump, and then matured for 4 hours. The solution was then cooled to room temperature, and a polymer X1 was obtained as the polymer X indicated by Formula (10) above and containing the monomer components x1, x2, x3, x4.

Synthesis Examples 2 Through 10

The same operation as synthesis example 1 described above was carried out, except that ratios of monomer components constituting the polymer were varied as shown in Table 1 by varying the type of medium (solvent) and the ratios of components used to synthesize the polymer. As a result, seven types of polymers (polymers X2 through X18) were obtained.

Synthesis Examples 11 Through 14

The same operation as synthesis example 1 described above was carried out, except that ratios of monomer components constituting the polymer were varied as shown in Table 1 by varying the type of medium (solvent) and the ratios of components used to synthesize the polymer. As a result, four types of polymers (polymers X'1 through X'4) were obtained.

Synthesis Example 15

As the medium (solvent), 314 parts by weight of diethylene glycol monobutyl ether acetate was placed in a reaction container (flask) provided with an agitator, a reflux condenser, a dropping funnel, a nitrogen introduction tube, and a temperature gauge, and heated to 90° C. Next, 20 parts by weight of 2,2'-azobis(isobutyronitrile) (AIBN) as a radical initiator and 30 parts by weight of diethylene glycol monobutyl ether acetate (solvent) were added, and a solution in which 200 parts by weight of the monomer component (compound) y1 indicated by Formula (5) above, 100 parts by weight of the monomer component (compound) y2 indicated by Formula (6), and 50 parts by weight of 2,2'-azobis (isobutyronitrile) (AIBN) were dissolved in 200 parts by weight of diethylene glycol monobutyl ether acetate was dropped into the flask over 5 hours using a dropping pump, and then matured for 4 hours. The solution was then cooled to room temperature, and a polymer Y1 was obtained as the polymer Y indicated by Formula (11) above and containing the monomer components y1, y2.

Synthesis Examples 16 Through 21

The same operation as synthesis example 9 described above was carried out, except that ratios of monomer components constituting the polymer were varied as shown in Table 1 by varying the type of medium (solvent) and the ratios of components used to synthesize the polymer. As a result, six types of polymers (polymers Y2 through Y7) were obtained.

Synthesis Examples 22 and 23

The same operation as synthesis example 9 described above was carried out, except that ratios of monomer components constituting the polymer were varied as shown in Table 1 by varying the type of medium (solvent) and the ratios of components used to synthesize the polymer. As a result, two types of polymers (polymers Y'1, Y'2) were obtained.

Synthesis Example 24

As mediums (solvents), 55 parts by weight of methoxybutyl acetate and 191 parts by weight of methoxy butanol were placed in a reaction container (flask) provided with an agitator, a reflux condenser, a dropping funnel, a nitrogen introduction tube, and a temperature gauge, and heated to 80° C. Next, a solution in which 276 parts by weight of the monomer component (compound) z1 indicated by Formula (12) above, 51 parts by weight of the monomer component (compound) z2 indicated by Formula (13), and 39 parts by weight of a radical initiator were dissolved in 360 parts by weight of methoxybutyl acetate was dropped into the flask over 5 hours using a dropping pump, and then matured for 3 hours.

Then, 26 parts by weight of glycidyl methacrylate and 2 parts by weight of methoquinone were added to the flask, and reaction was carried out for 10 hours at 110° C. The solution was then cooled to room temperature, and a polymer Z1 was obtained as the polymer Z indicated by Formula (15) above and containing the monomer components z1, z2, z3.

Synthesis Examples 25 and 26

The same operation as synthesis example 15 described above was carried out, except that ratios of monomer components constituting the polymer were varied as shown in Table 1 by varying the type of medium (solvent) and the ratios of components used to synthesize the polymer. As a result, two types of polymers (polymers Z2 and Z3) were obtained.

Synthesis Example 27

As the medium (solvent), 180 parts by weight of diethylene glycol monobutyl ether acetate was placed in a reaction container (flask) provided with an agitator, a reflux condenser, a dropping funnel, a nitrogen introduction tube, and a temperature gauge, and heated to 85° C. Next, a solution in which 188 parts by weight of the monomer component (compound) w1 indicated by Formula (16) above, 34 parts by weight of the monomer component (compound) w2 indicated by Formula (17) above, 74 parts by weight of the monomer component (compound) w3 indicated by Formula (18) above, 74 parts by weight of the monomer component (compound) w4 indicated by Formula (19) above, and 64 parts by weight of azobis dimethylvaleronitrile as a radical initiator were dissolved in 386 parts by weight of diethylene glycol monobutyl ether acetate was dropped into the flask over 5 hours using a dropping pump, and then matured for 3 hours. The solution was then cooled to room temperature, and a polymer W1 was obtained as the polymer W indicated by Formula (20) above and containing the monomer components w1, w2, w3, w4.

Synthesis Example 28 and 29

The same operation as synthesis example 20 described above was carried out, except that ratios of monomer components constituting the polymer were varied as shown in Table 1 by varying the type of medium (solvent) and the ratios of components used to synthesize the polymer. As a result, two types of polymers (polymers W2 and W3) were obtained.

Table 1 shows the ratios of the monomer components that constitute the polymers synthesized in synthesis examples 1 through 29, as well as the weight-average molecular weight of each polymer. In all of the polymers synthesized as described above, the degree of dispersion (Weight-average molecular weight Mw/Number-average molecular weight Mn) was in the range of 1 to 3.

TABLE 1

| | MONOMER COMPONENT (PARTS BY WEIGHT) | | | | | | | | | | | | | |
|---|---|---|---|---|---|---|---|---|---|---|---|---|---|---|
| | x1 | x2 | x3 | x4 | y1 | y2 | z1 | z2 | z3 | w1 | w2 | w3 | w4 | Mw |
| Polymer X1 | 60 | 30 | 5 | 5 | — | — | — | — | — | — | — | — | — | 3600 |
| Polymer X2 | 40 | 49 | 7 | 4 | — | — | — | — | — | — | — | — | — | 4200 |
| Polymer X3 | 80 | 10 | 4 | 6 | — | — | — | — | — | — | — | — | — | 4700 |
| Polymer X4 | 55 | 15 | 15 | 15 | — | — | — | — | — | — | — | — | — | 2400 |
| Polymer X5 | 88 | 8 | 2 | 2 | — | — | — | — | — | — | — | — | — | 9600 |
| Polymer X6 | 34 | 30 | 18 | 18 | — | — | — | — | — | — | — | — | — | 1900 |
| Polymer X7 | 32 | 58 | 5 | 5 | — | — | — | — | — | — | — | — | — | 3300 |
| Polymer X8 | 94 | 4 | 1 | 1 | — | — | — | — | — | — | — | — | — | 19000 |
| Polymer X9 | 28 | 62 | 5 | 5 | — | — | — | — | — | — | — | — | — | 3200 |
| Polymer X10 | 52 | 4 | 22 | 22 | — | — | — | — | — | — | — | — | — | 1700 |
| Polymer X'1 | — | 60 | 20 | 20 | — | — | — | — | — | — | — | — | — | 2400 |
| Polymer X'2 | 76 | — | 12 | 12 | — | — | — | — | — | — | — | — | — | 3200 |
| Polymer X'3 | 63 | 61 | — | 6 | — | — | — | — | — | — | — | — | — | 3600 |
| Polymer X'4 | 62 | 32 | 6 | — | — | — | — | — | — | — | — | — | — | 3000 |
| Polymer Y1 | — | — | — | — | 67 | 33 | — | — | — | — | — | — | — | 3300 |
| Polymer Y2 | — | — | — | — | 40 | 60 | — | — | — | — | — | — | — | 2800 |
| Polymer Y3 | — | — | — | — | 80 | 20 | — | — | — | — | — | — | — | 4600 |

TABLE 1-continued

| | MONOMER COMPONENT (PARTS BY WEIGHT) | | | | | | | | | | | | | |
|---|---|---|---|---|---|---|---|---|---|---|---|---|---|---|
| | x1 | x2 | x3 | x4 | y1 | y2 | z1 | z2 | z3 | w1 | w2 | w3 | w4 | Mw |
| Polymer Y4 | — | — | — | — | 35 | 65 | — | — | — | — | — | — | — | 3600 |
| Polymer Y5 | — | — | — | — | 65 | 35 | — | — | — | — | — | — | — | 4300 |
| Polymer Y6 | — | — | — | — | 28 | 72 | — | — | — | — | — | — | — | 2500 |
| Polymer Y7 | — | — | — | — | 92 | 8 | — | — | — | — | — | — | — | 3000 |
| Polymer Y'1 | — | — | — | — | — | 100 | — | — | — | — | — | — | — | 3700 |
| Polymer Y'2 | — | — | — | — | 100 | — | — | — | — | — | — | — | — | 3800 |
| Polymer Z1 | — | — | — | — | — | — | 78 | 10 | 12 | — | — | — | — | 12000 |
| Polymer Z2 | — | — | — | — | — | — | 60 | 22 | 18 | — | — | — | — | 10000 |
| Polymer Z3 | — | — | — | — | — | — | 85 | 10 | 5 | — | — | — | — | 9400 |
| Polymer W1 | — | — | — | — | — | — | — | — | — | 51 | 9 | 20 | 20 | 6800 |
| Polymer W2 | — | — | — | — | — | — | — | — | — | 42 | 15 | 13 | 30 | 12000 |
| Polymer W3 | — | — | — | — | — | — | — | — | — | 55 | 5 | 35 | 5 | 9100 |

2. Preparation of Color Filter Ink (Color Filter Ink Set)

Example 1 (Ex. 1)

Added to an agitator (single-shaft mixer) having a capacity of 400 cc were Disperbyk 111 as an acid-value dispersing agent, Disperbyk 166 as an amine-value dispersing agent, the polymer W1, and diethylene glycol monobutyl ether acetate as a liquid medium; and a dispersing-agent-dispersed liquid was obtained by stirring the mixture for 10 minutes in a Dispermill and performing preparatory dispersion (preparatory dispersion step). The speed of the stirring vanes of the agitator at this time was set to 2000 rpm.

Pigments were then added as described below to the dispersing-agent-dispersed liquid obtained by the preparatory dispersion step, inorganic beads were added in multiple stages, and the fine-dispersion step of performing the fine-dispersion process was performed.

First, pigments were added to the obtained dispersing-agent-dispersed liquid, and the mixture was stirred for 10 minutes. At this time, the speed of the stirring vanes of the agitator was set to 2000 rpm. A mixture of C. I. pigment red 177 and a pigment derivative indicated by Formula (7) above, a mixture of C. I. pigment red 254 and a pigment derivative indicated by Formula (8) above, and a powder of a sulfonated pigment derivative having the chemical structure indicated by Formula (9) above were used as the pigments. At this time, the mixture of the pigments and the dispersing-agent-dispersed liquid was diluted by diethylene glycol monobutyl ether acetate as a liquid medium (dispersion medium) to give a pigment content ratio of 16 wt %.

Inorganic beads (first inorganic beads: zirconia beads; "Toray Ceram milling balls" (trade name); manufactured by Toray) having an average grain size of 0.8 mm were then added, the mixture was stirred for 30 minutes at room temperature, and the first stage of dispersion processing (first treatment) was performed. At this time, the speed of the stirring vanes of the agitator was set to 2000 rpm.

The inorganic beads (first inorganic beads) were then removed by filtration using a filter ("PALL HDCII Membrane Filter"; manufactured by PALL), after which inorganic beads (second inorganic beads: zirconia beads; "Toray Ceram milling balls" (trade name); manufactured by Toray) having an average grain size of 0.1 mm were added, the mixture was further stirred for 30 minutes, and the second stage of dispersion processing (second treatment) was performed. At this time, the speed of the stirring vanes of the agitator was set to 2000 rpm. The mixture was also diluted at this time by diethylene glycol monobutyl ether acetate as a liquid medium (dispersion medium) to give a pigment content ratio of 13 wt % in the obtained pigment dispersion.

The inorganic beads (second inorganic beads) were then removed by filtration using a filter ("PALL HDCII Membrane Filter"; manufactured by PALL), and a pigment dispersion was obtained.

The polymer X1 and polymer Y1 were then added to and mixed with the pigment dispersion obtained as described above (polymer X and Y mixing step). The present step was performed by placing the abovementioned materials in a 400 cc agitator (single-shaft mixer) and stirring the mixture for 10 minutes in a Dispermill. At this time, the speed of the stirring vanes of the agitator was set to 2000 rpm. The desired red color filter ink (R ink) was thereby obtained. The pigment content of the R ink thus obtained was 7.3 wt %.

A green color filter ink (G ink) and a blue color filter ink (B ink) were prepared in the same manner as the red color filter ink described above, except that the type of pigment and the usage amount of each component were varied. An ink set composed of the three colors R, G, B was thereby obtained. The average grain size of the pigment constituting the R ink, the average grain size of the pigment constituting the G ink, and the average grain size of the pigment constituting the B ink were 70 nm, 70 nm, and 70 nm, respectively. C. I. pigment green 58 and a powder of a sulfonated pigment derivative having the chemical structure indicated by Formula (9) above were used as the pigment of the G ink, and the pigment content of the G ink ultimately obtained was 10.1 wt %. C. I. pigment blue 15:6 was used as the pigment of the B ink, and the pigment content of the B ink ultimately obtained was 4.9 wt %.

Examples 2 Through 11 (Ex. 2-11)

Color filter inks (ink sets) and a blank ink set were prepared in the same manner as Example 1, except that the types and usage amounts of materials used to prepare the color filter inks were varied as shown in Tables 2 and 3.

Comparative Examples 1 Through 8 (CE 1-8)

Color filter inks (ink sets) were prepared in the same manner as Example 1, except that the types and usage amounts of materials used to prepare the color filter inks were varied as shown in Tables 3 and 4.

Comparative Example 9 (CE 9)

Color filter inks (ink sets) were prepared in the same manner as in Example 1, except that a commercially available trisphenol methane-type epoxy resin (EPPN-502H, manufactured by Nippon Kayaku) was used instead of the polymer X and polymer Y.

In all of the examples and comparative examples described above, the polymers Z and W were used in the preparatory dispersion step when used, and the polymers X, Y, X', Y' were used in the polymer X and Y mixing step.

The types, usage amounts, and the like of the constituent components of the color filter inks in the examples and comparative examples are shown in Tables 2 through 4. In the tables, "PR177" refers to C. I. pigment red 177, "PR254" refers to C. I. pigment red 254, "PR177D" refers to the mixture of C. I. pigment red 177 and the pigment derivative indicated by Formula (7), "PR254D" refers to the mixture of C. I. pigment red 254 and the pigment derivative indicated by Formula (8), "SPD" refers to the powder composed of the pigment derivative indicated by Formula (9), "PG58 refers to C. I. pigment green 58, "PG36" refers to C. I. pigment green 36, "PB 15:6" refers to C. I. pigment blue 15:6, "PY150" refers to C. I. pigment yellow 150, "PV23" refers to C. I. pigment violet 23, "DA1" refers to Disperbyk 111 (acid value: 50 KOHmg/g), "DA2" refers to Disperbyk 2095 (acid value: 13 KOHmg/g), "DA3" refers to Disperbyk P104 (acid value: 360 KOHmg/g), "DA4" refers to Disperbyk 166 (amine value: 115 KOHmg/g), "DA5" refers to Disperbyk 9075 (amine value: 12 KOHmg/g), "DA6" refers to Solsperse 41000, "DA7" refers to Disperbyk LPN6919, "DA8" refers to Hinoact T8000E, "S1" refers to diethylene glycol monobutyl ether acetate, "S2" refers to 1,3-butylene glycol diacetate, "S3" refers to 2-(2-methoxy-1-methylethoxy)-1-methyl ethyl acetate, "S4" refers to bis(2-butoxyethyl)ether, "S5" refers to 3-ethoxy ethyl propionate, "S6" refers to methoxybutyl acetate, "S7" refers to methoxy butanol, and "R1 refers to a trisphenol methane-type epoxy resin (EPPN-502H, manufactured by Nippon Kayaku). The acid values of the dispersing agents were calculated by a method in accordance with DIN EN ISO 2114, and the amine values were calculated by a method in accordance with DIN 16945. The "viscosity" column shows the viscosity at 25° C. of the color filter ink as measured using an oscillation viscometer in accordance with JIS Z8809.

The content ratio of the pigment derivative indicated by Formula (7) in the mixture of C. I. pigment red 177 and the pigment derivative indicated by Formula (7) that was used in the examples and comparative examples was 0.1 to 10 wt %. The content ratio of the pigment derivative indicated by Formula (8) in the mixture of C. I. pigment red 254 and the pigment derivative indicated by Formula (8) that was used in the examples and comparative examples was 0.1 to 10 wt %.

TABLE 2

| | | | COMPOSITION | | | | | | | |
|---|---|---|---|---|---|---|---|---|---|---|
| | | | COLORANT | | RESIN COMPOSITION | | | | | |
| | | | | CONTENT RATIO (PARTS BY WEIGHT) | | CONTENT RATIO (PARTS BY WEIGHT) | | CONTENT RATIO (PARTS BY WEIGHT) | | CONTENT RATIO (PARTS BY WEIGHT) |
| Ex. 1 | R ink | PR254D/PR177D/SPD | 5.1/1.5/0.7 | X1 | 2.3 | Y1 | 2.3 | W1 | 3.7 |
| | G ink | PG58/SPD | 9.1/1.0 | X1 | 2.0 | Y1 | 2.0 | W1 | 4.9 |
| | B ink | PB15:6 | 4.9 | X1 | 3.5 | Y1 | 3.5 | W1 | 0.8 |
| Ex. 2 | R ink | PR254D/PR177D/SPD | 3.6/1.1/0.5 | X2 | 2.7 | Y2 | 2.2 | W2 | 3.9 |
| | G ink | PG58/SPD | 6.4/0.7 | X2 | 2.4 | Y2 | 1.9 | W2 | 5.3 |
| | B ink | PB15:6 | 3.4 | X2 | 4.0 | Y2 | 3.2 | W2 | 1.0 |
| Ex. 3 | R ink | PR254D/PR177D/SPD | 3.3/1.0/0.5 | X3 | 3.7 | Y3 | 2.0 | W3 | 3.5 |
| | G ink | PG58/SPD | 5.8/0.7 | X3 | 2.8 | Y3 | 1.5 | W3 | 5.3 |
| | B ink | PB15:6 | 3.1 | X3 | 4.7 | Y3 | 2.6 | W3 | 0.9 |
| Ex. 4 | R ink | PR254D/PR177D/SPD | 6.1/1.8/0.8 | X4 | 3.1 | Y1 | 1.0 | Z2 | 3.4 |
| | G ink | PG58/SPD | 10.9/1.2 | X4 | 2.6 | Y1 | 0.9 | Z2 | 4.4 |
| | B ink | PB15:6/PV23 | 5.6/0.3 | X4 | 4.6 | Y1 | 1.5 | Z2 | 0.8 |
| Ex. 5 | R ink | PR254D/PR177D/SPD | 6.2/1.8/0.8 | X1 | 4.6 | Y1 | 1.0 | Z3 | 3.4 |
| | G ink | PG58/SPD | 11.0/1.2 | X1 | 3.9 | Y1 | 0.9 | Z3 | 4.4 |
| | B ink | PB15:6 | 6.0 | X1 | 6.9 | Y1 | 1.5 | Z3 | 0.8 |
| Ex. 6 | R ink | PR254D/PR177D/SPD | 5.1/1.5/0.7 | X5 | 2.3 | Y2 | 2.3 | Z1 | 3.7 |
| | G ink | PG58/SPD | 9.1/1.0 | X5 | 2.0 | Y2 | 2.0 | Z1 | 4.9 |
| | B ink | PB15:6 | 4.9 | X5 | 3.5 | Y2 | 3.5 | Z1 | 0.8 |
| Ex. 7 | R ink | PR254D/PR177D/PY150 | 5.1/1.5/0.7 | X6 | 3.3 | Y4 | 5.0 | — | — |
| | G ink | PG36/PY150 | 9.1/1.0 | X6 | 3.6 | Y4 | 5.3 | — | — |
| | B ink | PB15:6/PV23 | 4.7/0.2 | X6 | 3.1 | Y4 | 4.7 | — | — |

| | | | COMPOSITION | | | | |
|---|---|---|---|---|---|---|---|
| | | | DISPERSING AGENT | LIQUID MEDIUM | | | |
| | | | CONTENT RATIO (PARTS BY WEIGHT) | | CONTENT RATIO (PARTS BY WEIGHT) | VISCOSITY (Mpa·s) | $C_x/C_y$ |
| Ex. 1 | R ink | DA1/DA4 | 0.6/3.1 | S1 | 80.7 | 9.5 | 1.0 |
| | G ink | DA1/DA4 | 1.3/3.6 | S1 | 76.1 | 9.8 | 1.0 |
| | B ink | DA1/DA4 | 0.2/0.6 | S1 | 86.5 | 9.9 | 1.0 |
| Ex. 2 | R ink | DA1/DA4 | 0.8/3.1 | S2 | 82.1 | 10.1 | 1.2 |
| | G ink | DA1/DA4 | 1.3/3.9 | S2 | 78.1 | 8.5 | 1.3 |
| | B ink | DA1/DA4 | 0.2/0.7 | S2 | 87.5 | 10.4 | 1.3 |

TABLE 2-continued

| | | | | | | | |
|---|---|---|---|---|---|---|---|
| Ex. 3 | R ink | DA1/DA4 | 0.6/2.9 | S3 | 82.5 | 9.3 | 1.9 |
| | G ink | DA1/DA4 | 1.3/3.9 | S3 | 78.7 | 9.6 | 1.9 |
| | B ink | DA1/DA4 | 0.2/0.7 | S3 | 87.8 | 8.7 | 1.8 |
| Ex. 4 | R ink | DA1/DA4 | 0.6/2.8 | S1 + S4 | 80.4 | 8.4 | 3.1 |
| | G ink | DA1/DA4 | 1.1/3.2 | S1 + S4 | 75.7 | 8.6 | 2.9 |
| | B ink | DA1/DA4 | 0.2/0.5 | S1 + S4 | 86.5 | 9.1 | 3.1 |
| Ex. 5 | R ink | DA6/DA7/DA8 | 0.8/0.8/1.8 | S1 | 78.8 | 10.0 | 4.6 |
| | G ink | DA6/DA7/DA8 | 1.0/1.0/2.3 | S1 | 74.3 | 11.2 | 4.3 |
| | B ink | DA6/DA7/DA8 | 0.1/0.1/0.5 | S1 | 84.1 | 11.4 | 4.6 |
| Ex. 6 | R ink | DA3/DA5 | 1.9/1.8 | S2 + S6 + S7 | 80.7 | 10.5 | 1.0 |
| | G ink | DA3/DA5 | 2.5/2.4 | S2 + S6 + S7 | 76.1 | 9.5 | 1.0 |
| | B ink | DA3/DA5 | 0.4/0.4 | S2 + S6 + S7 | 86.5 | 10.1 | 1.0 |
| Ex. 7 | R ink | DA2/DA5 | 3.1/0.6 | S4 | 80.7 | 9.8 | 0.7 |
| | G ink | DA2/DA5 | 3.6/1.3 | S4 | 76.1 | 10.7 | 0.7 |
| | B ink | DA2/DA5 | 0.6/0.2 | S4 | 86.5 | 11.1 | 0.7 |

TABLE 3

| | | | COMPOSITION | | | | | | |
|---|---|---|---|---|---|---|---|---|---|
| | | | COLORANT | | RESIN COMPOSITION | | | | |
| | | | | CONTENT RATIO (PARTS BY WEIGHT) | | CONTENT RATIO (PARTS BY WEIGHT) | | CONTENT RATIO (PARTS BY WEIGHT) | | CONTENT RATIO (PARTS BY WEIGHT) |
| Ex. 8 | R ink | PR254D/PR177D/SPD | 3.6/1.1/0.5 | X7 | 7.7 | Y5 | 1.1 | — | — |
| | G ink | PG58/SPD | 6.4/0.7 | X7 | 8.4 | Y5 | 1.2 | — | — |
| | B ink | PB15:6 | 3.4 | X7 | 7.1 | Y5 | 1.1 | — | — |
| Ex. 9 | R ink | PR254D/PR177D/SPD | 5.1/1.5/0.7 | X9 | 3.8 | Y1 | 3.8 | — | — |
| | G ink | PG58/SPD | 9.1/1.0 | X9 | 4.0 | Y1 | 4.0 | — | — |
| | B ink | PB15:6 | 4.9 | X9 | 3.9 | Y1 | 3.9 | — | — |
| Ex. 10 | R ink | PR254D/PR177D/SPD | 5.1/1.5/0.7 | X8 | 2.3 | Y6 | 2.3 | W1 | 3.7 |
| | G ink | PG58/SPD | 9.1/1.0 | X8 | 2.0 | Y6 | 2.0 | W1 | 4.9 |
| | B ink | PB15:6 | 4.9 | X8 | 3.5 | Y6 | 3.5 | W1 | 0.8 |
| Ex. 11 | R ink | PR254D/PR177D/SPD | 5.1/1.5/0.7 | X10 | 2.3 | Y7 | 2.3 | W2 | 3.7 |
| | G ink | PG58/SPD | 9.1/1.0 | X10 | 2.0 | Y7 | 2.0 | W2 | 4.9 |
| | B ink | PB15:6 | 4.9 | X10 | 3.5 | Y7 | 3.5 | W2 | 0.8 |
| CE. 1 | R ink | PR254/PR177/PY150 | 5.1/1.5/0.7 | — | — | Y1 | 8.3 | — | — |
| | G ink | PG36/PY150 | 9.1/1.0 | — | — | Y1 | 8.9 | — | — |
| | B ink | PB15:6/PV23 | 4.7/0.2 | — | — | Y1 | 7.8 | — | — |
| CE. 2 | R ink | PR254/PR177/PY150 | 5.1/1.5/0.7 | X1 | 8.3 | — | — | — | — |
| | G ink | PG36/PY150 | 9.1/1.0 | X1 | 8.9 | — | — | — | — |
| | B ink | PB15:6/PV23 | 4.7/0.2 | X1 | 7.8 | — | — | — | — |
| CE. 3 | R ink | PR254/PR177/PY150 | 5.1/1.5/0.7 | X'1 | 4.2 | Y1 | 4.1 | — | — |
| | G ink | PG36/PY150 | 9.1/1.0 | X'1 | 4.5 | Y1 | 4.4 | — | — |
| | B ink | PB15:6/PV23 | 4.7/0.2 | X'1 | 3.9 | Y1 | 3.9 | — | — |

| | | | COMPOSITION | | | |
|---|---|---|---|---|---|---|
| | | | DISPERSING AGENT | LIQUID MEDIUM | | |
| | | | CONTENT RATIO (PARTS BY WEIGHT) | CONTENT RATIO (PARTS BY WEIGHT) | VISCOSITY (Mpa·s) | $C_x/C_y$ |
| Ex. 8 | R ink | DA2/DA5 | 3.1/0.8 | S5 | 82.1 | 9.6 | 7 |
| | G ink | DA2/DA5 | 3.9/1.3 | S5 | 78.1 | 8.9 | 7 |
| | B ink | DA2/DA5 | 0.7/0.2 | S5 | 87.5 | 9.7 | 6.5 |
| Ex. 9 | R ink | DA1/DA4 | 0.7/3.7 | S1 | 80.7 | 9.9 | 1.0 |
| | G ink | DA1/DA4 | 1.5/4.3 | S1 | 76.1 | 11.1 | 1.0 |
| | B ink | DA1/DA4 | 0.2/0.6 | S1 | 86.5 | 10.5 | 1.0 |
| Ex. 10 | R ink | DA1/DA4 | 0.6/3.1 | S1 | 80.7 | 8.5 | 1.0 |
| | G ink | DA1/DA4 | 1.3/3.6 | S1 | 76.1 | 10.1 | 1.0 |
| | B ink | DA1/DA4 | 0.2/0.6 | S1 | 86.5 | 9.5 | 1.0 |
| Ex. 11 | R ink | DA1/DA4 | 0.6/3.1 | S2 | 80.7 | 9.4 | 1.0 |
| | G ink | DA1/DA4 | 1.3/3.6 | S2 | 76.1 | 9.2 | 1.0 |
| | B ink | DA1/DA4 | 0.2/0.6 | S2 | 86.5 | 9.3 | 1.0 |
| CE. 1 | R ink | DA1/DA4 | 0.6/3.1 | S1 | 80.7 | 9.5 | 0 |
| | G ink | DA1/DA4 | 1.3/3.6 | S1 | 76.1 | 9.1 | 0 |
| | B ink | DA1/DA4 | 0.2/0.6 | S1 | 86.5 | 9.2 | 0 |
| CE. 2 | R ink | DA1/DA4 | 0.6/3.1 | S1 | 80.7 | 10.5 | — |
| | G ink | DA1/DA4 | 1.3/3.6 | S1 | 76.1 | 10.1 | — |
| | B ink | DA1/DA4 | 0.2/0.6 | S1 | 86.5 | 9.5 | — |
| CE. 3 | R ink | DA1/DA4 | 0.6/3.1 | S1 | 80.7 | 8.9 | 0 |
| | G ink | DA1/DA4 | 1.3/3.6 | S1 | 76.1 | 8.9 | 0 |
| | B ink | DA1/DA4 | 0.2/0.6 | S1 | 86.5 | 8.7 | 0 |

TABLE 4

| | | COLORANT | | RESIN COMPOSITION | | | | | | |
|---|---|---|---|---|---|---|---|---|---|---|
| | | | CONTENT RATIO (PARTS BY WEIGHT) | | CONTENT RATIO (PARTS BY WEIGHT) | | CONTENT RATIO (PARTS BY WEIGHT) | | CONTENT RATIO (PARTS BY WEIGHT) | |
| CE. 4 | R ink | PR254/PR177/PY150 | 5.1/1.5/0.7 | X'2 | 4.2 | Y1 | 4.1 | — | — | |
| | G ink | PG36/PY150 | 9.1/1.0 | X'2 | 4.5 | Y1 | 4.4 | — | — | |
| | B ink | PB15:6/PV23 | 4.7/0.2 | X'2 | 3.9 | Y1 | 3.9 | — | — | |
| CE. 5 | R ink | PR254/PR177/PY150 | 5.1/1.5/0.7 | X'3 | 4.2 | Y1 | 4.1 | — | — | |
| | G ink | PG36/PY150 | 9.1/1.0 | X'3 | 4.5 | Y1 | 4.4 | — | — | |
| | B ink | PB15:6/PV23 | 4.7/0.2 | X'3 | 3.9 | Y1 | 3.9 | — | — | |
| CE. 6 | R ink | PR254/PR177/PY150 | 5.1/1.5/0.7 | X'4 | 4.2 | Y1 | 4.1 | — | — | |
| | G ink | PG36/PY150 | 9.1/1.0 | X'4 | 4.5 | Y1 | 4.4 | — | — | |
| | B ink | PB15:6/PV23 | 4.7/0.2 | X'4 | 3.9 | Y1 | 3.9 | — | — | |
| CE. 7 | R ink | PR254/PR177/PY150 | 5.1/1.5/0.7 | X1 | 4.2 | Y'1 | 4.1 | — | — | |
| | G ink | PG36/PY150 | 9.1/1.0 | X1 | 4.5 | Y'1 | 4.4 | — | — | |
| | B ink | PB15:6/PV23 | 4.7/0.2 | X1 | 3.9 | Y'1 | 3.9 | — | — | |
| CE. 8 | R ink | PR254/PR177/PY150 | 5.1/1.5/0.7 | X1 | 4.2 | Y'2 | 4.1 | — | — | |
| | G ink | PG36/PY150 | 9.1/1.0 | X1 | 4.5 | Y'2 | 4.4 | — | — | |
| | B ink | PB15:6/PV23 | 4.7/0.2 | X1 | 3.9 | Y'2 | 3.9 | — | — | |
| CE. 9 | R ink | PR254/PR177/PY150 | 5.1/1.5/0.7 | R1 | 8.3 | — | — | — | — | |
| | G ink | PG36/PY150 | 9.1/1.0 | R1 | 8.9 | — | — | — | — | |
| | B ink | PB15:6/PV23 | 4.7/0.2 | R1 | 7.8 | — | — | — | — | |

| | | COMPOSITION | | | | | |
|---|---|---|---|---|---|---|---|
| | | DISPERSING AGENT | | LIQUID MEDIUM | | | |
| | | | CONTENT RATIO (PARTS BY WEIGHT) | | CONTENT RATIO (PARTS BY WEIGHT) | VISCOSITY (Mpa·s) | $C_x/C_y$ |
| CE. 4 | R ink | DA1/DA4 | 0.6/3.1 | S1 | 80.7 | 9.5 | 0 |
| | G ink | DA1/DA4 | 1.3/3.6 | S1 | 76.1 | 9.6 | 0 |
| | B ink | DA1/DA4 | 0.2/0.6 | S1 | 86.5 | 9.8 | 0 |
| CE. 5 | R ink | DA1/DA4 | 0.6/3.1 | S1 | 80.7 | 10.1 | 0 |
| | G ink | DA1/DA4 | 1.3/3.6 | S1 | 76.1 | 10.4 | 0 |
| | B ink | DA1/DA4 | 0.2/0.6 | S1 | 86.5 | 10.3 | 0 |
| CE. 6 | R ink | DA1/DA4 | 0.6/3.1 | S1 | 80.7 | 9.2 | 0 |
| | G ink | DA1/DA4 | 1.3/3.6 | S1 | 76.1 | 11.1 | 0 |
| | B ink | DA1/DA4 | 0.2/0.6 | S1 | 86.5 | 10.9 | 0 |
| CE. 7 | R ink | DA1/DA4 | 0.6/3.1 | S1 | 80.7 | 9.4 | — |
| | G ink | DA1/DA4 | 1.3/3.6 | S1 | 76.1 | 9.8 | — |
| | B ink | DA1/DA4 | 0.2/0.6 | S1 | 86.5 | 9.9 | — |
| CE. 8 | R ink | DA1/DA4 | 1.6/3.1 | S1 | 80.7 | 10.5 | — |
| | G ink | DA1/DA4 | 1.3/3.6 | S1 | 76.1 | 10.1 | — |
| | B ink | DA1/DA4 | 0.2/0.6 | S1 | 86.5 | 10.2 | — |
| CE. 9 | R ink | DA1/DA4 | 0.6/3.1 | S1 | 80.7 | 9.4 | — |
| | G ink | DA1/DA4 | 1.3/3.6 | S1 | 76.1 | 9.7 | — |
| | B ink | DA1/DA4 | 0.2/0.6 | S1 | 86.5 | 10.7 | — |

3. Evaluation of Stability of Droplet Discharge (Evaluation of Discharge Stability)

3.1 Evaluation of Landing Position Accuracy

A droplet discharge device such as that shown in FIGS. 3 to 6 disposed in a chamber (thermal chamber) and the ink sets for a color filter of the examples and comparative examples were prepared, and 300,000 droplets (300,000 drops) of the inks were continuously discharged from the nozzles of a droplet discharge head in a state in which the drive waveform of the piezoelement had been optimized. The average value of the offset distance d from the center aim position of the center position of the landed droplets was calculated for the 300,000 droplets discharged from specified nozzles in the vicinity of the center of the droplet discharge head, and an evaluation was made based on the four ranges described below. The average value of the offset distance d obtained for the three colors of ink was used as the average value of the offset distance d. It is apparent that the smaller this value is the more effectively prevented the occurrence of flight deflection is.

A: The average value of the offset distance d is less than 0.06 μm

B: The average value of the offset distance d is 0.06 μm or more and less than 0.12 μm C: The average value of the offset distance d is 0.12 μm or more and less than 0.16 μm D: The average value of the offset distance d is 0.16 or more

3.2 Evaluation of Stability of Droplet Discharge Quantity

A droplet discharge device such as that shown in FIGS. 3 to 6 disposed in a chamber (thermal chamber), and the ink sets for a color filter of the examples and comparative examples were prepared, and 300,000 droplets (300,000 drops) of the inks were continuously discharged from the nozzles of a droplet discharge head in a state in which the drive waveform of the piezoelement had been optimized. The total weight of the discharged droplets was calculated for two specific nozzles at the left and right ends of the droplet discharge head, and the absolute value ΔW (ng) of the difference between the average discharge quantities of the droplets discharged from the two nozzles was calculated. The ratio ($\Delta W/W_T$) of the ΔW in relation to the target discharge quantity $W_T$ (ng) of the droplets was calculated, and an evaluation was made based on the four ranges described below. It is apparent that the smaller the value of $\Delta W/W_T$ is, the greater the stability of the droplet discharge quantity. The average value obtained for the three colors of ink was used as the value of $\Delta W/W_T$.

A: The value of $\Delta W/W_T$ is less than 0.065
B: The value of $\Delta W/W_T$ is 0.065 or higher and less than 0.450
C: The value of $\Delta W/W_T$ is 0.450 or higher and less than 0.780
D: The value of $\Delta W/W_T$ is 0.780 or higher 3.3 Evaluation of Intermittent Printing Performance A droplet discharge device such as that shown in FIGS. 3 to 6 disposed in a chamber (thermal chamber), and the ink sets for a color filter of the examples and comparative examples were prepared, and 15,000 droplets (15,000 drops) of the inks were continuously discharged from the nozzles of a droplet discharge head in a state in which the drive waveform of the piezoelement had been optimized, after which droplet discharge was stopped for 120 seconds (first sequence). Thereafter, droplets were continuously discharged in the same manner and the operation of stopping the discharge of droplets was repeated. The average weight $W_1$ (ng) of the droplets discharged in the first sequence and the average weight $W_{30}$ (ng) of the droplets discharged in the $20^{th}$ sequence were calculated for the specified nozzles in the vicinity of the center of the droplet discharge head. The ratio ($|W_1-W_{30}|/W_T$) of the absolute value of the difference between $W_1$ and $W_{20}$ in relation to the target discharge quantity $W_T$ (ng) of the droplets was calculated, and an evaluation was made based on the three ranges described below. It is apparent that the smaller the value of $|W_1-W_{30}|/W_T$ is, the greater the intermittent printing performance (stability of the droplet discharge quantity). The average value obtained for the three colors of ink was used as the value of $|W_1-W_{30}|/W_T$ A: The value of $|W_1-W_{30}|/W_T$ is less than 0.050
B: The value of $|W_1-W_{30}|/W_T$ is 0.050 or higher and less than 0.680
C: The value of $|W_1-W_{30}|/W_T$ is 0.680 or higher 3.4 Continuous Discharge Test The inks constituting the ink set for a color filter were discharged by continuously operating the droplet discharge device for 72 hours in an environment of 25° C. and 35% RH using a droplet discharge device such as that shown in FIGS. 3 to 6 disposed in a chamber (thermal chamber) and the ink sets for a color filter of the examples and comparative examples.

The rate ([(number of clogged nozzles)/(total number of nozzles)]×100) at which clogging of the nozzles constituting the droplet discharge head occurs after continuous operation was calculated, and it was investigated whether clogging can be eliminated using a cleaning member composed of a plastic material. The results were evaluated based on the four ranges described below. The average value obtained for the three colors of ink was used as the occurrence rate of nozzle clogging.

A: Nozzle clogging does not occur.
B: The occurrence rate of nozzle clogging is less than 0.5% (not including 0), and clogging can be eliminated by cleaning.
C: The occurrence rate of nozzle clogging is 0.5% or higher and less than 1.0%, and clogging can be eliminated by cleaning.
D: The occurrence rate of nozzle clogging is 1.0% or higher, and clogging cannot be eliminated by cleaning.

The evaluation described above was carried out in the same conditions for the examples and the comparative examples.

4. Evaluation of Storability of Color Filter Ink (Long-Term Stability Evaluation)

The color filter ink of the examples and comparative examples was left for 20 days in a 60° C. environment, after which the ink was visually observed and evaluated according to the five criteria shown below.

A: No change from the state prior to heating was observed.
B: Almost no aggregation/precipitation of pigment particles was observed.
C: Slight aggregation/precipitation of pigment particles was observed.
D: Aggregation/precipitation of pigment particles was plainly observed.
E: Severe aggregation/precipitation of pigment particles was observed.

5. Manufacture of Color Filters

Color filters were manufactured in the following manner using the color filter inks (ink sets) prepared in the examples and comparative examples.

First, a substrate (G5 size: 1100×1300 mm) composed of soda glass on which a silica ($SiO_2$) film for preventing elution of the sodium ions was formed on the two sides was prepared and washed.

Next, a radiation-sensitive composition for forming a partition wall containing carbon black was applied to the entire surface of one of the surfaces of the washed substrate to form a photoresist layer.

Next, a prebaking treatment was performed at a heating temperature of 110° C. and a heating time of 120 seconds.

The substrate was then irradiated via a photomask and subjected to post exposure baking (PEB), then developed using an alkali development fluid, and then subjected to a post baking treatment to thereby form a partition wall. PEB was carried out at a heating temperature of 110° C., a heating time of 120 seconds, and an irradiation intensity of 150 mJ/cm². The development treatment time was set to 60 seconds. The post baking treatment was carried out at a heating temperature of 150° C. for a heating time of 5 minutes. The thickness of the partition wall thus formed was 1.6 μm.

Next, the color filter ink was discharged into the cells as areas surrounded by the partition wall by using a droplet discharge device such as that shown in FIGS. 3 to 6. In this case, three color filter inks were used, and care was taken that the color filter ink of each color was not mixed. A quantity of color filter ink was applied in each cell so as to give an average thickness of 2.0 μm of the formed colored portion.

Heat treatment was then carried out for 20 minutes at 80° C. on a hot plate (first heat treatment).

Heat treatment was then carried out for 60 minutes at 230° C. (second heat treatment), and three colors (red (R), green (G), blue (B)) of colored portions were thereby formed. The colored portions were then rinsed using N-methyl-2-pyrrolidone and γ-butyrolactone, and a color filter such as shown in FIG. 1 was obtained.

The color filter inks (ink sets) of the examples and the comparative examples were used to manufacture 6000 color filters of each ink set using the method described above.

6. Evaluation of Color Filters

The color filters obtained in the manner described above were evaluated in the manner described below.

6.1 Flatness of Colored Portion

The $31^{st}$ color filters of the color filters manufactured using the color filter inks (ink sets) of the examples and comparative examples were prepared.

The difference ΔD between the maximum height and minimum height of the colored portions was found using a stylus profilometer (P-15, manufactured by Tencor) for the color filters, and ΔD was evaluated according to the three levels shown below.

A: ΔD less than 0.2 μm
B: ΔD 0.2 μm or greater and less than 0.5 μm
C: ΔD 0.5 μm or greater

6.2 Evaluation of Contrast Ratio

Liquid crystal display devices such as the one shown in FIG. 7 were manufactured under the same conditions using the $6000^{th}$ color filters of the color filters manufactured using the color filter inks (ink sets) of the examples and comparative examples.

Red monochromatic display, green monochromatic display, and blue monochromatic display were performed using the liquid crystal display devices, and the contrast ratio (CR) in relation to a case of non-hypochromic display was obtained using a contrast tester (CT-1, manufactured by Tsubosaka Electric) and evaluated as shown below.

The contrast ratio was evaluated according to the four criteria below for red monochromatic display.

A: CR was 2800 or higher.
B: CR was 2100 or higher and less than 2800.
C: CR was 1800 or higher and less than 2100.
D: CR was less than 1800.

The contrast ratio was evaluated according to the four criteria below for green monochromatic display.

A: CR was 3700 or higher.
B: CR was 3200 or higher and less than 3700.
C: CR was 2900 or higher and less than 3200.
D: CR was less than 2900.

The contrast ratio was evaluated according to the four criteria below for blue monochromatic display.

A: CR was 3000 or higher.
B: CR was 2600 or higher and less than 3000.
C: CR was 2300 or higher and less than 2600.
D: CR was less than 2300.

6.3 Unevenness of Color And Saturation

Red monochromatic display, green monochromatic display, blue monochromatic display, and white monochromatic display by the liquid crystal display devices were visually observed in a dark room, and the occurrence of uneven color and uneven saturation between different regions was evaluated based on the five levels described below.

A: Uneven color and uneven saturation were not observed.
B: Uneven color and uneven saturation were substantially not observed.
C: Some uneven color and uneven saturation was observed.
D: Uneven color and uneven saturation were plainly observed.
E: Markedly uneven color and uneven saturation were observed.

6.4 Difference In Characteristics Between Units

Of the color filters manufactured using the color filter inks (ink sets) of the examples and the comparative examples, the first to the $20^{th}$ and the $2980^{th}$ to the $2999^{th}$ color filters manufactured of each example and the comparative example were prepared, red monochromatic display, green monochromatic display, blue monochromatic display, and white monochromatic display were carried out in a dark room, and the colors were measured using a spectrophotometer (MCPD 3000, manufactured by Otsuka Electronics). The maximum color differences (color difference ΔE in the Lab display system) in the first to the $20^{th}$ and the $2980^{th}$ to the $2999^{th}$ color filters (total of 40 color filters) manufactured for each of the examples and comparative examples were calculated from the results and evaluated based on the five ranges described below.

A: Color difference (ΔE) is less than 1.8.
B: Color difference (ΔE) is 1.8 or more and less than 2.8.
C: Color difference (ΔE) is 2.8 or more and less than 3.8.
D: Color difference (ΔE) is 3.8 or more and less than 4.8.
E: Color difference (ΔE) is 4.8 or more.

6.5 Heat Cycle Testing

Among the color filters manufactured using the color filter inks (ink sets) of the examples and the comparative examples, liquid crystal display devices such as that shown in FIG. 7 were manufactured under the same conditions using the $21^{st}$ to $30^{th}$ color filters manufactured of each example and the comparative example.

Red monochromatic display, green monochromatic display, and blue monochromatic display by these liquid crystal display devices were visually observed in a dark room, and the occurrence of light leakage (white spots, luminescent spots) was checked.

Next, the color filters were removed from the liquid crystal display devices.

The color filters thus removed were left sitting for 1 hour at 20° C., then 2 hours at 70° C., subsequently 1 hour at 20° C., and then 2 hours at −20° C. The environment temperature was again restored to 20° C. to complete a single cycle (6 hours), and this cycle was repeated for a total of 40 times (total of 240 hours).

Liquid crystal display devices such as the one shown in FIG. 7 were then reassembled using these color filters.

Red monochromatic display, green monochromatic display and blue monochromatic display by these liquid crystal display devices were visually observed in a dark room, and the occurrence of light leakage (white spots, luminescent spots) was evaluated based on the following five levels.

A: There was no color filter in which light leakage (white spots, luminescent spots) occurred.

B: Light leakage (white spots, luminescent spots) was observed in 1 to 2 color filters.

C: Light leakage (white spots, luminescent spots) was observed in 3 to 5 color filters.

D: Light leakage (white spots, luminescent spots) was observed in 6 to 9 color filters.

E: Light leakage (white spots, luminescent spots) was observed in 10 color filters.

7. Evaluation of Heat Resistance

Each color filter ink was applied to a glass substrate having a thickness of 0.7 mm by spin coating. The amount of ink applied was set so as to give a dry film thickness of 1.6 μm.

The test samples were then heated for 1 hour at 230° C. in a clean oven.

The colors of the test samples subjected to heat treatment at 230° C. were then measured using a spectrophotometer (MCPD 3000, manufactured by Otsuka Electronics).

The test samples were then furthermore heated for 1 hour at 250° C. in a clean oven.

The colors of the test samples subjected to heat treatment at 250° C. were then measured using a spectrophotometer (MCPD 3000, manufactured by Otsuka Electronics).

The difference in color (color difference ΔE in the Lab display system) before and after the test samples were dipped in a solvent was found from these results and evaluated according to the following three levels.

○: Color difference (ΔE) less than 1
Δ: Color difference (ΔE) 1 or greater and less than 3
x: Color difference (ΔE) 3 or greater

8. Evaluation of Colored Film Formed Using Color Filter Ink

Numerous test samples (test plates) for use in the tests described below were created as described below using the color filter inks.

Each ink was first applied to a glass substrate having a thickness of 0.7 mm by spin coating. The amount of ink applied was set to give a dry film thickness of 1.6 μm.

The samples were then pre-baked for 10 minutes on a 90° C. hot plate. The samples were then post-baked by heating for 30 minutes at 200° C. in a clean oven, then further post-baked by heating for 30 minutes at 240° C., and test samples (test plates) having a colored film were obtained.

8.1 Evaluation of Solvent Resistance

The colors of the test samples of each color of the examples and comparative examples were then measured using a spectrophotometer (MCPD 3000, manufactured by Otsuka Electronics).

The test samples were then dipped for 10 minutes in a solvent at 50° C., and the colors were then measured in the same manner as before using a spectrophotometer (MCPD 3000, manufactured by Otsuka Electronics).

The difference in color (color difference ΔE in the Lab display system) before and after the test samples were dipped in a solvent was found from these results and evaluated according to the following two levels.

○: Color difference (ΔE) less than 3
x: Color difference (ΔE) 3 or greater

The solvents used were γ-butyrolactone (γ-BL), isopropyl alcohol (IPA), N-methyl-2-pyrrolidone (NMP), 0.5 N hydrochloric acid (HCl), and 0.5 N aqueous sodium hydroxide (NaOH).

8.2 Evaluation of Lightfastness

The colors of the test samples of each color of the examples and comparative examples were then measured using a spectrophotometer (MCPD 3000, manufactured by Otsuka Electronics).

The test samples were then irradiated with light using a xenon fade meter in a 40° C., 60% RH environment, and the colors of the test samples were then measured in the same manner as before using a spectrophotometer (MCPD 3000, manufactured by Otsuka Electronics). The irradiation conditions were 320 W/m$^2$×200 hours. The black panel temperature at this time was 50° C.

The difference in color (color difference ΔE in the Lab display system) before and after the test samples were irradiated with light was found from these results and evaluated according to the following three levels.

○: Color difference (ΔE) less than 1
Δ: Color difference (ΔE) 1 or greater and less than 3
x: Color difference (ΔE) 3 or greater

8.3 Evaluation of Adhesion To Substrate

Eleven cuts in each of the orthogonal longitudinal and transverse directions were made at intervals of 1 mm by a cutter in each of the test sample colored films of each color of the examples and comparative examples. Cellophane tape was then lightly adhered in a pattern by hand, and then rapidly peeled off, and the state of the cuts was observed and evaluated according to the five levels shown below.

A: Slight peeling at the intersection of the cut, the surface area of the defect being less than 5% of the total surface area of the square B: Peeling at the intersection of the cut, the surface area of the defect being 5% or more, and less than 15% of the total surface area of the square C: Wide peeling due to the cut, the surface area of the defect being 15% or more, and less than 35% of the total surface area of the square D: Peeling wider than four points due to the cut, the surface area of the defect being 35% or more and less than 65% of the total surface area of the square E: The peeled surface area is 65% or more of the total surface area of the square

8.4 Evaluation of ITO Film Adhesion

The test samples of each color obtained in the examples and comparative examples were first dipped for 5 minutes in isopropyl alcohol, and then dried in isopropyl alcohol vapor and rinsed.

ITO (indium tin oxide) films were then formed to a thickness of 120 nm in a 6×10$^{-3}$ Torr vacuum at a substrate set temperature of 200° C.

After testing heat resistance at 180° C. for 60 minutes, the surface roughness (Ra) of the ITO films was measured by AFM and evaluated according to the three levels shown below. A Nippon Veeco NanoScope IIIa was used for AFM.

○: Absolutely no wrinkles, cracks, or other defects were observed in the ITO film Δ: Several wrinkles, cracks, and other defects were observed in the ITO film x: Wrinkles, cracks, and other defects were observed over the entire surface of the ITO film

TABLE 5

| | | DISCHARGE STABILITY EVALUATION | | | | |
|---|---|---|---|---|---|---|
| | | LANDING POSITION ACCURACY | STABILITY OF DROPLET DISCHARGE AMOUNT | INTERMITTENT PRINTING PERFORMANCE | CONTINUOUS DISCHARGE TEST | STORAGE STABILITY |
| Ex. 1 | R | A | A | A | A | A |
| | G | A | A | A | A | A |
| | B | A | A | A | A | A |
| Ex. 2 | R | A | A | A | A | A |
| | G | A | A | A | A | A |
| | B | A | A | A | A | A |
| Ex. 3 | R | A | A | A | A | A |
| | G | A | A | A | A | A |
| | B | A | A | A | A | A |
| Ex. 4 | R | A | A | A | A | A |
| | G | A | A | A | A | A |
| | B | A | A | A | A | A |
| Ex. 5 | R | A | A | A | A | A |
| | G | A | A | A | A | A |
| | B | A | A | A | A | A |
| Ex. 6 | R | A | A | A | A | A |
| | G | A | A | A | A | A |
| | B | A | A | A | A | A |
| Ex. 7 | R | B | B | B | B | B |
| | G | B | B | B | B | B |
| | B | B | B | A | B | B |

| | | COLOR FILTER EVALUATION | | | | |
|---|---|---|---|---|---|---|
| | | FLATNESS OF COLORED PORTION | CONTRAST RATIO | UNEVENNESS OR COLOR, SATURATION | VARIATION OF CHARACTERISTICS BETWEEN UNITS | HEAT CYCLE TESTING |
| Ex. 1 | R | A | A | A | A | A |
| | G | A | A | | | |
| | B | A | A | | | |
| Ex. 2 | R | A | A | A | A | A |
| | G | A | A | | | |
| | B | A | A | | | |
| Ex. 3 | R | A | A | A | A | A |
| | G | A | A | | | |
| | B | A | A | | | |
| Ex. 4 | R | A | A | A | A | A |
| | G | A | A | | | |
| | B | A | A | | | |
| Ex. 5 | R | A | A | A | A | A |
| | G | A | A | | | |
| | B | A | A | | | |
| Ex. 6 | R | A | A | B | A | B |
| | G | A | A | | | |
| | B | A | A | | | |
| Ex. 7 | R | A | B | B | B | B |
| | G | A | B | | | |
| | B | A | B | | | |

TABLE 6

| | | DISCHARGE STABILITY EVALUATION | | | | |
|---|---|---|---|---|---|---|
| | | LANDING POSITION ACCURACY | STABILITY OF DROPLET DISCHARGE AMOUNT | INTERMITTENT PRINTING PERFORMANCE | CONTINUOUS DISCHARGE TEST | STORAGE STABILITY |
| Ex. 8 | R | B | B | B | B | B |
| | G | B | B | B | B | B |
| | B | B | B | B | B | B |
| Ex. 9 | R | B | B | B | B | B |
| | G | C | C | B | B | C |
| | B | B | B | B | B | B |
| Ex. 10 | R | A | A | A | A | A |
| | G | A | A | A | A | A |
| | B | A | A | A | A | A |

TABLE 6-continued

| | | | | | | |
|---|---|---|---|---|---|---|
| Ex. 11 | R | A | A | A | A | A |
| | G | A | A | A | A | A |
| | B | A | A | A | A | A |
| CE 1 | R | D | D | C | D | E |
| | G | D | D | C | D | E |
| | B | D | D | C | D | E |
| CE 2 | R | C | C | C | C | C |
| | G | C | C | C | C | D |
| | B | C | C | B | C | C |
| CE 3 | R | D | D | C | D | E |
| | G | D | D | C | D | E |
| | B | D | D | C | D | E |

| | | COLOR FILTER EVALUATION | | | | |
|---|---|---|---|---|---|---|
| | | FLATNESS OF COLORED PORTION | CONTRAST RATIO | UNEVENNESS OF COLOR, SATURATION | VARIATION OF CHARACTERISTICS BETWEEN UNITS | HEAT CYCLE TESTING |
| Ex. 8 | R | A | B | B | B | B |
| | G | A | B | | | |
| | B | A | B | | | |
| Ex. 9 | R | A | B | B | B | A |
| | G | A | C | | | |
| | B | A | B | | | |
| Ex. 10 | R | A | A | C | B | C |
| | G | A | A | | | |
| | B | A | A | | | |
| Ex. 11 | R | A | B | C | A | C |
| | G | A | B | | | |
| | B | A | B | | | |
| CE 1 | R | C | D | E | E | A |
| | G | C | D | | | |
| | B | C | D | | | |
| CE 2 | R | B | D | D | C | E |
| | G | B | D | | | |
| | B | B | C | | | |
| CE 3 | R | A | D | E | E | B |
| | G | A | D | | | |
| | B | A | D | | | |

TABLE 7

| | | DISCHARGE STABILITY EVALUATION | | | | |
|---|---|---|---|---|---|---|
| | | LANDING POSITION ACCURACY | STABILITY OF DROPLET DISCHARGE AMOUNT | INTERMITTENT PRINTING PERFORMANCE | CONTINUOUS DISCHARGE TEST | STORAGE STABILITY |
| CE 4 | R | D | D | C | D | C |
| | G | D | D | C | D | C |
| | B | D | D | C | D | C |
| CE 5 | R | B | B | B | B | B |
| | G | C | C | C | C | B |
| | B | B | B | B | B | B |
| CE 6 | R | B | B | B | B | B |
| | G | C | C | B | C | B |
| | B | B | B | B | B | B |
| CE 7 | R | C | C | C | C | C |
| | G | C | C | C | C | D |
| | B | C | C | B | C | C |
| CE 8 | R | D | D | C | D | C |
| | G | D | D | C | D | C |
| | B | D | D | B | D | C |

TABLE 7-continued

| | | | | | | |
|---|---|---|---|---|---|---|
| CE 9 | R | D | D | C | D | D |
| | G | D | D | C | D | D |
| | B | D | D | C | D | D |

| | | COLOR FILTER EVALUATION | | | | |
|---|---|---|---|---|---|---|
| | | FLATNESS OF COLORED PORTION | CONTRAST RATIO | UNEVENNESS OF COLOR, SATURATION | VARIATION OF CHARACTERISTICS BETWEEN UNITS | HEAT CYCLE TESTING |
| CE 4 | R | B | D | E | E | B |
| | G | B | D | | | |
| | B | B | D | | | |
| CE 5 | R | B | C | D | C | D |
| | G | B | D | | | |
| | B | B | D | | | |
| CE 6 | R | C | D | E | D | B |
| | G | C | D | | | |
| | B | C | D | | | |
| CE 7 | R | A | C | D | C | E |
| | G | A | D | | | |
| | B | A | C | | | |
| CE 8 | R | B | D | E | E | D |
| | G | B | D | | | |
| | B | B | D | | | |
| CE 9 | R | C | D | E | E | E |
| | G | C | D | | | |
| | B | C | D | | | |

TABLE 8

| | | HEAT RESISTANCE | SOLVENT RESISTANCE | | | | | LIGHT-FASTNESS | ADHESION TO SUBSTRATE | ADHESION OF ITO FILM |
|---|---|---|---|---|---|---|---|---|---|---|
| | | | γ-BL | IPA | NMP | HCl | NaOH | | | |
| Ex. 1 | R | ○ | ○ | ○ | ○ | ○ | ○ | ○ | A | ○ |
| | G | ○ | ○ | ○ | ○ | ○ | ○ | ○ | A | ○ |
| | B | ○ | ○ | ○ | ○ | ○ | ○ | ○ | A | ○ |
| Ex. 2 | R | ○ | ○ | ○ | ○ | ○ | ○ | ○ | A | ○ |
| | G | ○ | ○ | ○ | ○ | ○ | ○ | ○ | A | ○ |
| | B | ○ | ○ | ○ | ○ | ○ | ○ | ○ | A | ○ |
| Ex. 3 | R | ○ | ○ | ○ | ○ | ○ | ○ | ○ | A | ○ |
| | G | ○ | ○ | ○ | ○ | ○ | ○ | ○ | A | ○ |
| | B | ○ | ○ | ○ | ○ | ○ | ○ | ○ | A | ○ |
| Ex. 4 | R | ○ | ○ | ○ | ○ | ○ | ○ | ○ | A | ○ |
| | G | ○ | ○ | ○ | ○ | ○ | ○ | ○ | A | ○ |
| | B | ○ | ○ | ○ | ○ | ○ | ○ | ○ | A | ○ |
| Ex. 5 | R | ○ | ○ | ○ | ○ | ○ | ○ | ○ | A | ○ |
| | G | ○ | ○ | ○ | ○ | ○ | ○ | ○ | A | ○ |
| | B | ○ | ○ | ○ | ○ | ○ | ○ | ○ | A | ○ |
| Ex. 6 | R | ○ | ○ | ○ | ○ | ○ | ○ | ○ | A | ○ |
| | G | ○ | ○ | ○ | ○ | ○ | ○ | ○ | A | ○ |
| | B | ○ | ○ | ○ | ○ | ○ | ○ | ○ | A | ○ |
| Ex. 7 | R | ○ | ○ | ○ | ○ | ○ | ○ | ○ | B | ○ |
| | G | ○ | ○ | ○ | ○ | ○ | ○ | ○ | B | ○ |
| | B | ○ | ○ | ○ | ○ | ○ | ○ | ○ | B | ○ |

TABLE 9

| | | HEAT RESISTANCE | SOLVENT RESISTANCE | | | | | LIGHT-FASTNESS | ADHESION TO SUBSTRATE | ADHESION OF ITO FILM |
|---|---|---|---|---|---|---|---|---|---|---|
| | | | γ-BL | IPA | NMP | HCl | NaOH | | | |
| Ex. 8 | R | ○ | ○ | ○ | ○ | ○ | ○ | ○ | B | ○ |
| | G | ○ | ○ | ○ | ○ | ○ | ○ | ○ | B | ○ |
| | B | ○ | ○ | ○ | ○ | ○ | ○ | ○ | B | ○ |
| Ex. 9 | R | ○ | ○ | ○ | ○ | ○ | ○ | ○ | B | ○ |
| | G | ○ | ○ | ○ | ○ | ○ | ○ | ○ | B | ○ |
| | B | ○ | ○ | ○ | ○ | ○ | ○ | ○ | B | ○ |
| Ex. 10 | R | ○ | ○ | ○ | ○ | ○ | ○ | ○ | A | ○ |
| | G | ○ | ○ | ○ | ○ | ○ | ○ | ○ | A | ○ |
| | B | ○ | ○ | ○ | ○ | ○ | ○ | ○ | A | ○ |

TABLE 9-continued

| | | HEAT RESISTANCE | SOLVENT RESISTANCE | | | | | LIGHT-FASTNESS | ADHESION TO SUBSTRATE | ADHESION OF ITO FILM |
|---|---|---|---|---|---|---|---|---|---|---|
| | | | γ-BL | IPA | NMP | HCl | NaOH | | | |
| Ex. 11 | R | ○ | ○ | ○ | ○ | ○ | ○ | ○ | A | ○ |
| | G | ○ | ○ | ○ | ○ | ○ | ○ | ○ | A | ○ |
| | B | ○ | ○ | ○ | ○ | ○ | ○ | ○ | A | ○ |
| CE 1 | R | Δ | X | X | X | X | X | X | A | Δ |
| | G | Δ | X | X | X | X | X | Δ | A | Δ |
| | B | X | X | X | X | X | X | Δ | A | Δ |
| CE 2 | R | Δ | ○ | ○ | ○ | ○ | ○ | X | E | Δ |
| | G | Δ | ○ | ○ | ○ | ○ | ○ | Δ | E | Δ |
| | B | X | ○ | ○ | ○ | ○ | ○ | Δ | E | Δ |
| CE 3 | R | Δ | ○ | ○ | ○ | ○ | ○ | X | B | Δ |
| | G | Δ | ○ | ○ | ○ | ○ | ○ | Δ | B | Δ |
| | B | X | ○ | ○ | ○ | ○ | ○ | Δ | B | Δ |

TABLE 10

| | | HEAT RESISTANCE | SOLVENT RESISTANCE | | | | | LIGHT-FASTNESS | ADHESION TO SUBSTRATE | ADHESION OF ITO FILM |
|---|---|---|---|---|---|---|---|---|---|---|
| | | | γ-BL | IPA | NMP | HCl | NaOH | | | |
| CE 4 | R | Δ | X | X | X | X | X | Δ | B | Δ |
| | G | Δ | X | X | X | X | X | ○ | B | X |
| | B | X | X | X | X | X | X | ○ | B | Δ |
| CE 5 | R | Δ | X | X | X | X | X | Δ | D | Δ |
| | G | Δ | X | X | X | X | X | ○ | D | X |
| | B | X | X | X | X | X | X | ○ | D | Δ |
| CE 6 | R | Δ | ○ | ○ | ○ | ○ | ○ | Δ | B | Δ |
| | G | Δ | ○ | ○ | ○ | ○ | ○ | ○ | B | X |
| | B | X | ○ | ○ | ○ | ○ | ○ | ○ | B | Δ |
| CE 7 | R | Δ | ○ | ○ | ○ | ○ | ○ | Δ | E | Δ |
| | G | Δ | ○ | ○ | ○ | ○ | ○ | ○ | E | X |
| | B | X | ○ | ○ | ○ | ○ | ○ | ○ | E | Δ |
| CE 8 | R | Δ | ○ | ○ | ○ | ○ | ○ | Δ | D | Δ |
| | G | Δ | ○ | ○ | ○ | ○ | ○ | Δ | D | X |
| | B | X | ○ | ○ | ○ | ○ | ○ | ○ | D | Δ |
| CE 9 | R | Δ | X | X | X | X | X | Δ | E | Δ |
| | G | Δ | X | X | X | X | X | ○ | E | X |
| | B | X | X | X | X | X | X | Δ | E | Δ |

As is apparent from Tables 5 through 10, the stability of droplet discharge (discharge stability) and the storage stability (long-term storability) were excellent in the present invention, and the manufactured color filters had excellent contrast ratio and durability, and minimal color mixing and unevenness of color and saturation. There was also minimal variation of characteristics between color filter units in the present invention. The formed colored portions also had adequate hardness in the present invention. It was also confirmed that the colored films (colored portions) formed using the color filter ink in the present invention had excellent solvent resistance, heat resistance, lightfastness, adhesion to the substrate, and adhesion to an ITO film.

In contrast, satisfactory results were not obtained in the comparative examples.

The similar results as described above were also obtained when a commercially available liquid crystal television was disassembled, the liquid crystal display device unit was replaced by a unit manufactured as described above, and the same evaluations as described above were performed.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A color filter ink adapted to be used to manufacture a color filter by an inkjet method, the color filter ink comprising:
   a colorant;
   a liquid medium that dissolves and/or disperses the colorant; and
   a resin material including
      a polymer X having a monomer component x1 represented by a chemical formula (1) below, a monomer component x2 represented by a chemical formula (2) below, a monomer component x3 represented by a chemical formula (3) below, and a monomer component x4 represented by a chemical formula (4) below, and
      a polymer Y having a monomer component y1 represented by a chemical formula (5) below and a monomer component y2 represented by a chemical formula (6) below:

Chemical Formula (1)

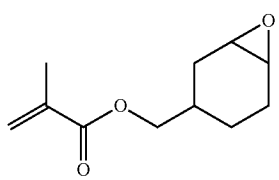
(1)

Chemical Formula (2)

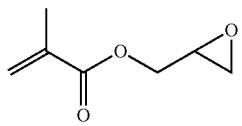
(2)

Chemical Formula (3)

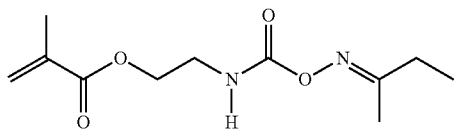
(3)

Chemical Formula (4)

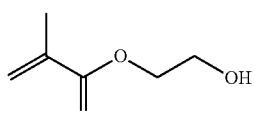
(4)

Chemical Formula (5)

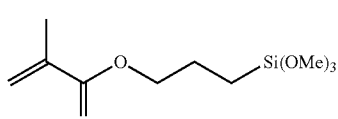
(5)

Chemical Formula (6)

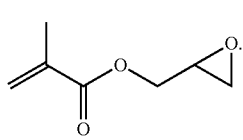
(6)

2. The color filter ink according to claim 1, wherein
   the content ratio of the monomer component x1 with respect to all components constituting the polymer X is 30 to 90 wt %,
   the content ratio of the monomer component x2 with respect to all components constituting the polymer X is 5 to 60 wt %,
   the content ratio of the monomer component x3 with respect to all components constituting the polymer X is 2 to 20 wt %, and
   the content ratio of the monomer component x4 with respect to all components constituting the polymer X is 2 to 20 wt %.

3. The color filter ink according to claim 1, wherein
   the content ratio of the monomer component y1 with respect to all components constituting the polymer Y is 30 to 90 wt %, and
   the content ratio of the monomer component y2 with respect to all components constituting the polymer Y is 10 to 70 wt %.

4. The color filter ink according to claim 1, wherein
   the resin material satisfies the relationship $0.9 \leq C_X/C_Y \leq 6.0$, wherein a value $C_X$ (wt %) represents the content ratio of the polymer X in the color filter ink, and a value $C_Y$ (wt %) represents the content ratio of the polymer Y in the color filter ink.

5. The color filter ink according to claim 1, wherein the weight-average molecular weight of the polymer X is 1,000 to 50,000.

6. The color filter ink according to claim 1, wherein the weight-average molecular weight of the polymer Y is 1,000 to 50,000.

7. The color filter ink according to claim 1, wherein
   the liquid medium includes one or more compounds selected from the group consisting of 1,3-butylene glycol diacetate, bis(2-butoxyethyl)ether, 2-(2-methoxy-1-methylethoxy)-1-methylethyl acetate, and diethylene glycol monobutylether acetate.

8. The color filter ink according to claim 1, wherein
   the colorant includes one or more types selected from the group consisting of C. I. pigment red 254, C. I. pigment red 177, C. I. pigment green 58, C. I. pigment blue 15:6, C. I. pigment violet 23, C. I. pigment yellow 138, C. I. pigment yellow 150, and their derivatives.

9. A color filter ink set including a plurality of different types of color filter ink with at least one of the types being the color filter ink according to claim 1.

10. A color filter manufactured using the color filter ink according to claim 1.

11. A color filter manufactured using the color filter ink set according to claim 9.

12. An image display device having the color filter according to claim 10.

13. The image display device according to claim 12, wherein
    the image display device is a liquid crystal panel.

14. An electronic device having the image display device according to claim 12.

* * * * *